§

US011350560B1

(12) United States Patent
Buell et al.

(10) Patent No.: US 11,350,560 B1
(45) Date of Patent: Jun. 7, 2022

(54) MECHANICAL TRANSPLANTER

(71) Applicant: Hoy Ayers Buell, Arroya Grande, CA (US)

(72) Inventors: Hoy Ayers Buell, Arroyo Grande, CA (US); Sandeep Patel, Livermore, CA (US); Robert A Wilk, Livermore, CA (US); Glen Noel Ward, Grass Valley, CA (US); Gustave E Ferre, Grass Valley, CA (US)

( * ) Notice: Subject to any disclaimer, the term of this patent is extended or adjusted under 35 U.S.C. 154(b) by 186 days.

(21) Appl. No.: 16/509,069

(22) Filed: Jul. 11, 2019

Related U.S. Application Data

(60) Provisional application No. 62/696,554, filed on Jul. 11, 2018.

(51) Int. Cl.
*A01C 11/00* (2006.01)

(52) U.S. Cl.
CPC .................................. *A01C 11/006* (2013.01)

(58) Field of Classification Search
CPC ......... A01C 11/00; A01C 11/02; A01C 11/04; A01C 11/025; A01C 11/006
See application file for complete search history.

(56) References Cited

U.S. PATENT DOCUMENTS

| | | | |
|---|---|---|---|
| 2,092,589 A | 9/1937 | Scarlett | |
| 2,337,749 A | 12/1943 | Hand | |
| 2,363,749 A | 11/1944 | Rude | |
| 2,656,801 A | 10/1953 | Hansen et al. | |
| 4,597,343 A * | 7/1986 | Nambu | A01C 11/02 |
| | | | 111/105 |
| 5,121,701 A | 6/1992 | Reed et al. | |
| 5,431,116 A | 7/1995 | Gao | |
| 5,596,938 A | 1/1997 | Shaw | |
| 5,676,072 A | 10/1997 | Williames | |
| 6,327,986 B1 | 12/2001 | Williames | |
| 6,591,766 B2 * | 7/2003 | Williames | A01C 11/025 |
| | | | 111/105 |
| 7,363,868 B1 | 4/2008 | Sena | |
| 7,905,186 B2 * | 3/2011 | Faulring | A01G 9/0299 |
| | | | 111/105 |
| 7,954,439 B2 | 6/2011 | Faulting et al. | |
| 8,122,838 B2 | 2/2012 | Faulting | |
| 9,661,800 B2 | 5/2017 | Buell | |

(Continued)

OTHER PUBLICATIONS

Williames; Williames Selective Transplanters, article from the internet www.williames.com/transplanters/ copyright 2016.

*Primary Examiner* — Jamie L McGowan
(74) *Attorney, Agent, or Firm* — Ronald R. Kilponen

(57) ABSTRACT

An independently automated mechanical transplanter assemblage for ejecting plants into the soil is shown and described. The mechanical transplanter includes a plurality of mechanical transplanter units mounted to a frame. Each mechanical transplanter unit will include a plant tray indexing vertically and horizontally for presenting plants to a grabber having a plurality of forks. The grabber and forks thereon will be able to swing into a horizontal position for advancing in a linear motion to grip and retract plants from cells in a tray. The grabber will also be configured to swing the forks into an approximate vertical plane for ejecting each independently held plant down a funnel into a planting shoe for delivery into an open row in the soil. Other embodiments of the device are also disclosed.

2 Claims, 53 Drawing Sheets

(56) References Cited

U.S. PATENT DOCUMENTS

2015/0342112 A1* 12/2015 Buell .................... A01C 11/02
 111/105
2018/0352725 A1* 12/2018 Doucet ............... A01C 11/006
2020/0375089 A1* 12/2020 Crouse ............... A01C 11/025

* cited by examiner

MECHANICAL TRANSPLANTER

CROSS REFERENCE TO RELATED APPLICATIONS

This application claims the benefit of U.S. Provisional Application No. 62/696,554 filed on Jul. 11, 2018 entitled "MECHANICAL TRANSPLANTER". The above identified Provisional Application for Patent is herein incorporated by reference in its entirety to provide continuity of disclosure.

FIELD

The present version of these embodiments relate generally to the field of automatic mechanical planters for plants and cuttings.

BACKGROUND

These embodiments relate to mechanical planting of plants and cuttings, and more particularly to devices that can automate what has been traditionally been a manual operation in the planting of plants into the ground or soil for crop production. While this description will reference "plants" it should be understood to incorporate all things that are planted into the ground to include cuttings, flowers and others.

Farming is very important for all nations and economies. Farming consumes water resources and generally requires much unskilled hand labor. Hand labor is getting more and more difficult to find and that which is found, is becoming expensive. It would be useful if some of this hand labor could be eliminated for repetitive operations in the farming industry. This would result in less over head for the farmers and growers and quite possibly a better quality product.

Generally crops are started in greenhouse operations in cell feed trays. This allows the growing season to be extended and gets the plants to a size where they can more easily be replanted in the soil. The seeds or cuttings are planted indoors and are cared for until they reach a pre determined size. For the farms that do commercial plantings, the numbers of plants that require replanting can be extremely numerous. The quicker they can get the plants in the ground the quicker the plants will mature and produce product. Hand labor can be unreliable and inconsistent where mechanical devices, once dialed in, are more reliable and efficient.

Plants or cuttings can also grow too much indoors. This results in complex rooting which can make the removal of plants from the tray cells difficult and result in plant losses.

There are also visual cues that can indicate if a plant has a good chance of becoming productive. This visual inspection can be learned but requires concentration and experience. It can be difficult to find labor that can do this inspection in a consistent speedy manner. It would be helpful if there was some type of vision or inspection or sensor system available that would screen those plants that did not have a good chance of becoming productive. It is not efficient to put resources into a plant that does not have a good chance of producing saleable product.

An inspection system can also be used to determine if there is or is not a plant growing in a feeder tray cell before an attempt is made to pull the plant or plant ball from the cell. The inspection system can be used to tell the system to "skip" a cell that does not have growth for transplanting.

So there is pressure to get the plants grown, pressure to get them to a certain size by a certain planting date, then pressure to get them removed from the tray cells and into the ground or planted. Any time saved in any of these operations contributes to the overall efficiency and profitability of the farm or any entity involved in the growing process. Mechanical efficiency, once dialed in, can be much more efficient and less expensive than manual labor.

For the foregoing reasons, there is a need for a mechanical transplanter for plants.

SUMMARY

In view of the foregoing disadvantages inherent in the traditional methods of hand planting plants there is a need for a mechanical transplanter which can plant more efficiently than traditional methods.

A first objective of these embodiments is to provide a device that can more efficiently place or eject plants into the ground.

Another objective of these embodiments is to provide a device that can identify poor or rejected plants or if there is a plant loaded before they are ejected into the ground.

It is yet another objective of these embodiments to provide a device that will function reliably.

Another objective is to provide a device that if it does suffer mechanical issues can be replaced quickly with another device.

It is a still further object of these embodiments to provide a device that can be added to currently existing equipment to replace the hand labor.

Another objective of these embodiments is to allow the hand planting without difficulty in the case when mechanical equipment fails and replacement equipment is not available.

These together with other objectives of these embodiments, along with various features of novelty which characterize these embodiments, are pointed out with particularity in this application forming a part of this disclosure. For a better understanding of these embodiments, the operating advantages and the specific objectives attained by its uses, reference should be had to the accompanying drawings and descriptive matter in which there is illustrated a preferred embodiment.

DETAILED DESCRIPTION

Figure 1:
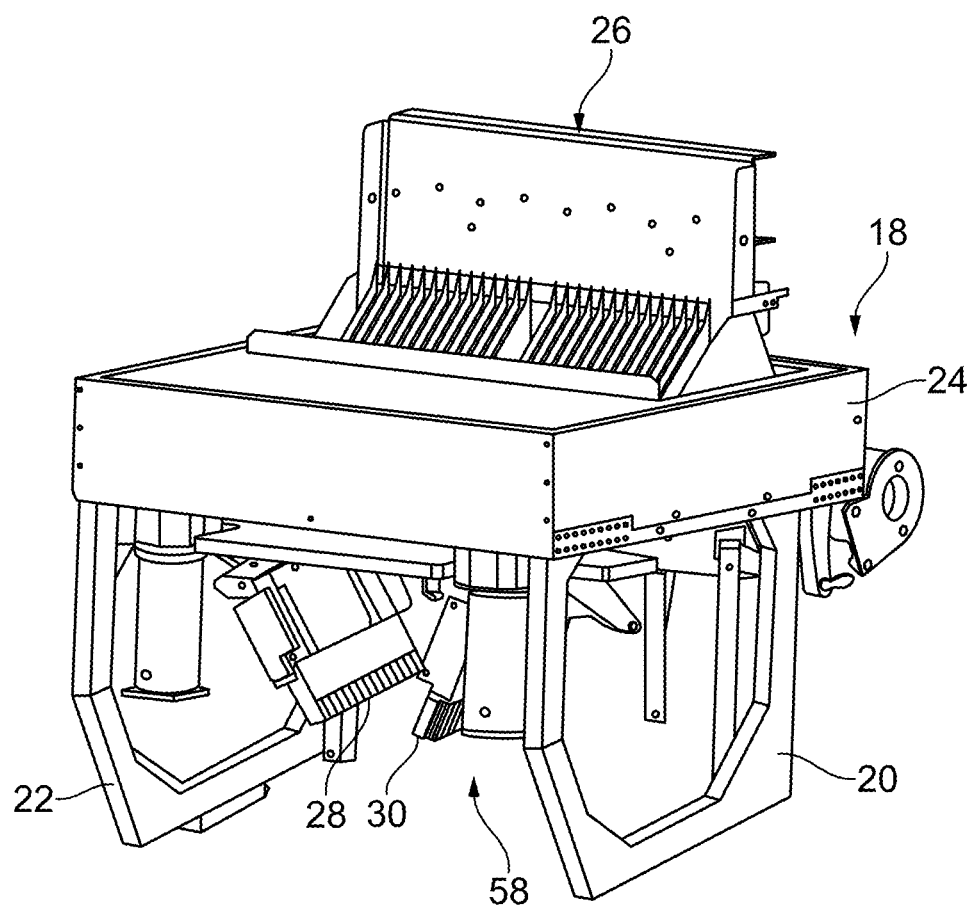
FIG. 1 shows a front perspective view of one embodiment of a mechanical transplanter.

Referring to the drawings in detail wherein like elements are indicated by like numerals, there is shown in FIG. 1 one embodiment of a mechanical transplanter 18. The transplanter 18 has a left frame 22 and a right frame 20. A cover 24 covers elements below, the cover 24 is needed to keep sunlight off of the roots of plants (not shown) as sunlight can adversely effect the plant roots and growth. Also shown in FIG. 1 is a feeder 26. Feeder 26 receives trays full of plants having stems and leaves and organizes the plants 38 such that they can be plucked by the right and left grabbers 30, 28. FIG. 1 shows the grabbers 28, 30 in the first position 58.

Figure 2:
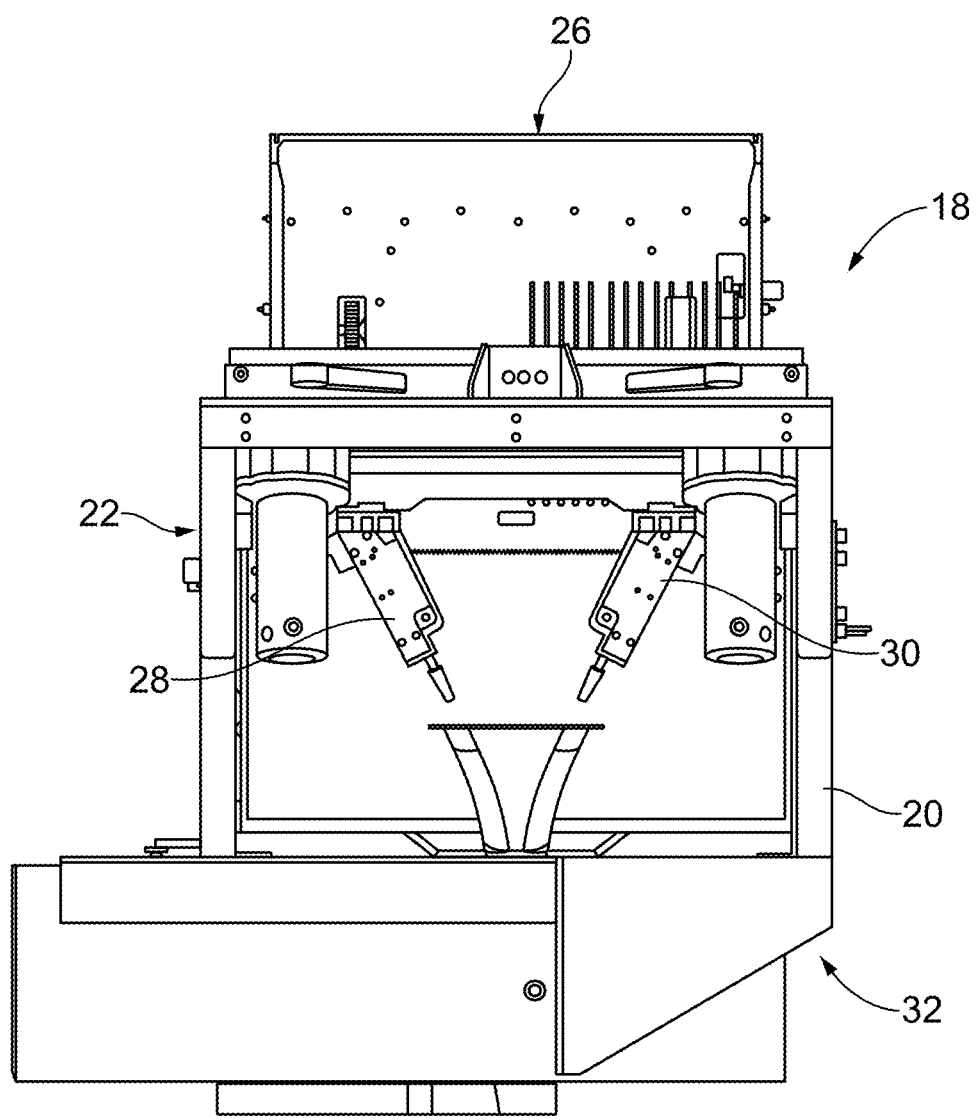
FIG. 2 shows a front view of one embodiment of a mechanical transplanter.

FIG. 2 shows a front view of the mechanical transplanter 18. FIG. 2 shows how the transplanter 18 interacts with existing technology.

Figure 3:
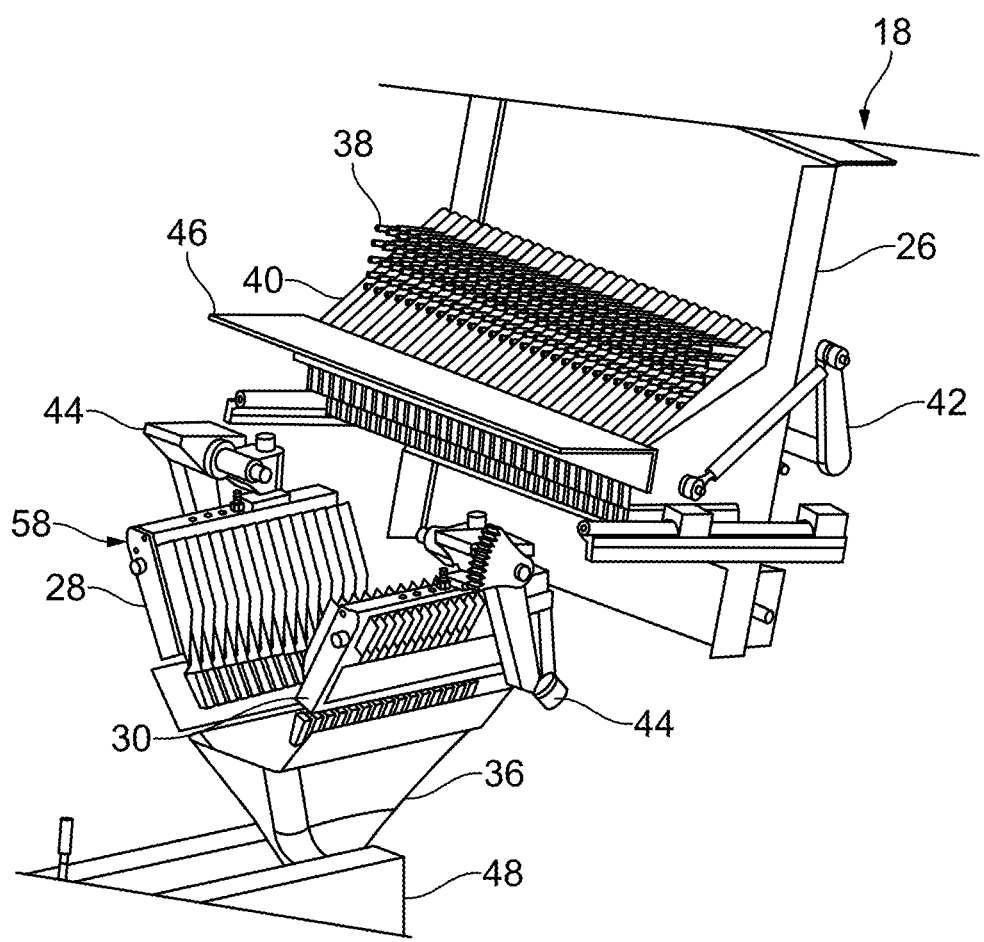
FIG. 3 shows a front perspective view of one embodiment of several important elements with elements missing showing a grabber in a first position.

FIG. 3 shows a front perspective view of some elements with others removed to better view and explain how they function together. The feeder 26 is seen to have a feeder drive 42 which translates the feeder 26 horizontally towards and away from the grabbers 28, 30. The grabbers 28, 30 are shown in the first position 58 from which the plants 38 are dispensed into the funnel 36.

The plants 38 get loaded into the feeder 26 such that the stems and leaves are in an approximately horizontal position away from the feeder 26. The feeder 26 has partitions 40 into which the stems and leaves are located. As can be seen, the partitions 40 angle to allow the stems and leaves to be configured in an untangled position relative to one another. This aids in the removal of the plants 38 from the tray 43 cells 41.

Figure 4:
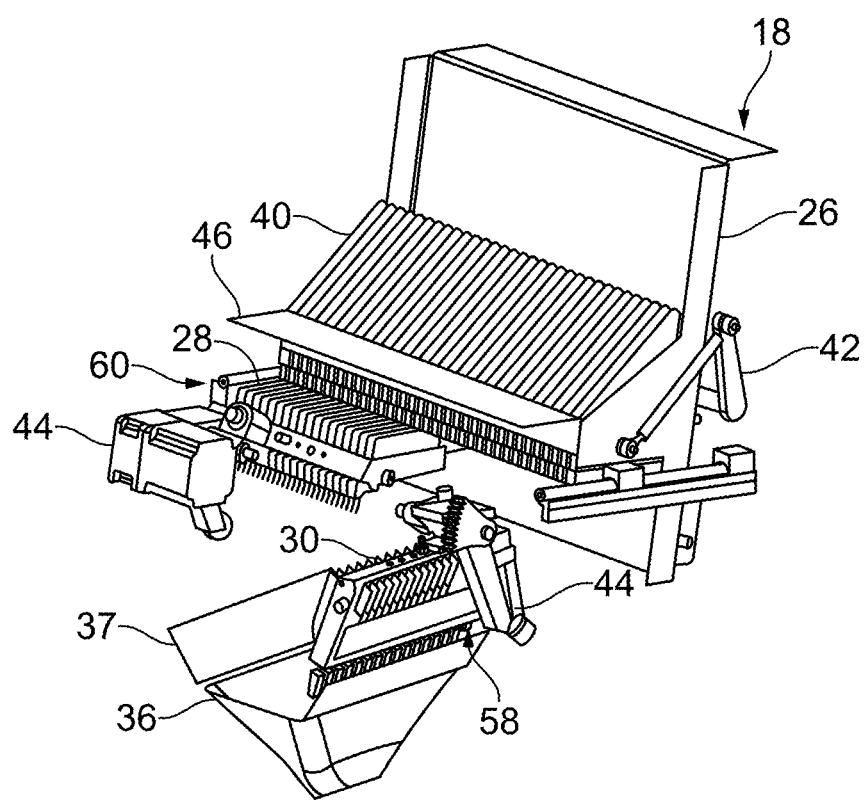
FIG. 4 shows a front perspective view of one embodiment of several important elements with elements missing showing a grabber in a second position FIG. 5 a front perspective view of one embodiment of several important elements with elements missing showing an overall view of how the device interacts with existing structure.

FIG. 4 shows a front perspective view similar to that of FIG. 3. For explanation purposes, left grabber 28 will be used to explain how the device functions. It should be understood that right grabber 30 would function in nearly the same manner. In FIG. 4, the left grabber 28 is shown in the second position 60. The left grabber 28 is rotated from an angled vertical position to that of approximately horizontal and from this position is translated such that the fork 92 bottom 112 can engage the plants 38 to pluck them from the tray 43 cells 41. It is here that the vision system 70 is utilized to indicate to the left grabber 28 if there are any plants 38 that may not meet the standards. The vision system can aid in grasping and can indicate even if there is or is not a plant 38 present in the cell 41. Once the plants 38 are grasped by the left grabber 28, the grabber translates horizontally and vertically to return to the first position 58 as exemplified in FIG. 4 by right grabber 30.

Figure 5:
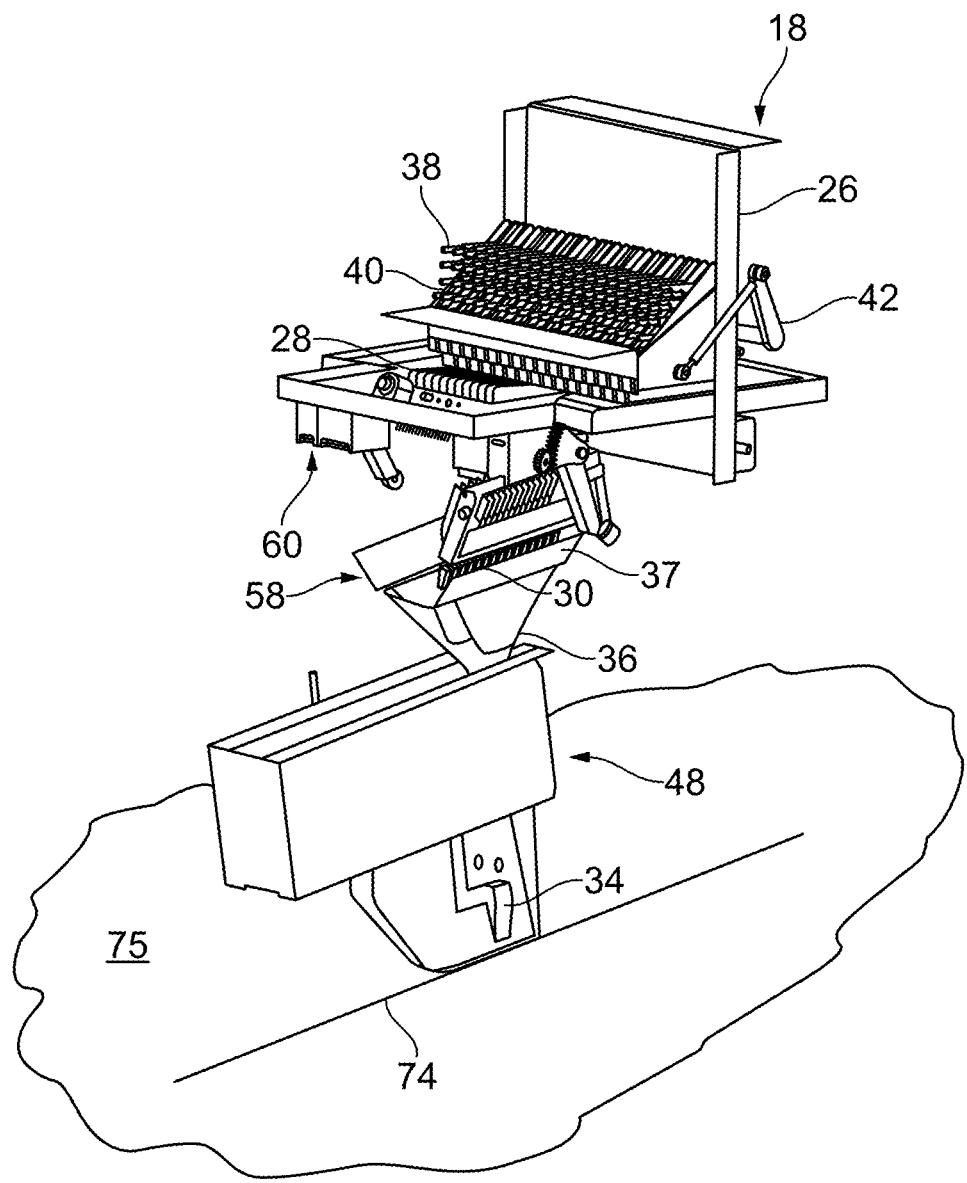

FIG. 5 shows another front perspective view of the device with several components missing to further the discussion of how the elements function and are arranged. This FIG. 5 shows the left grabber 28 in the second position 60 and the right grabber 30 in the first position 58. Also more visible in this figure are the funnel 36 and funnel plate 37 which feed into the shoe assembly 48 and eventually in to the row 74 in the soil 75.

Figure 6:
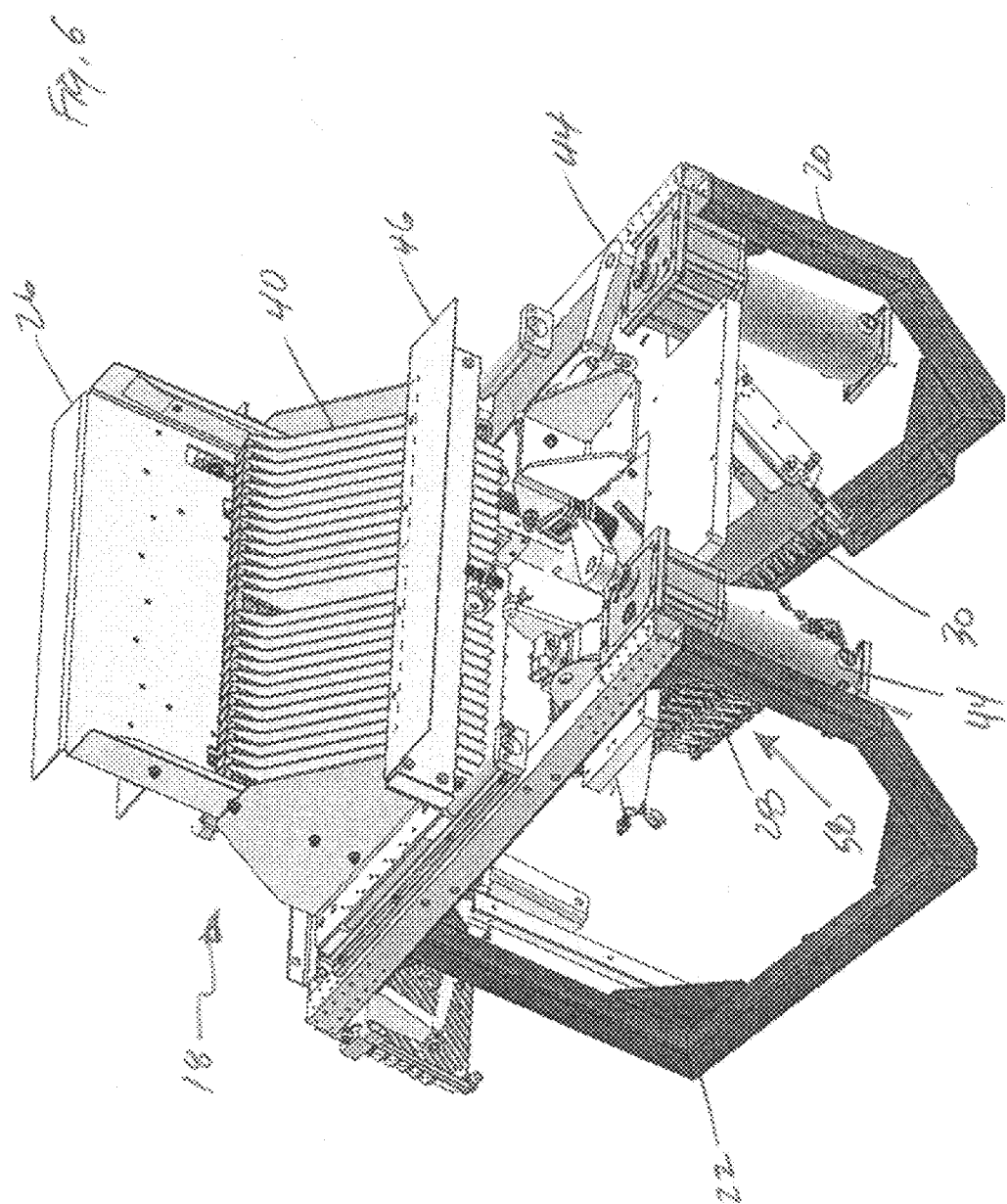
FIG. 6 shows a front left side perspective view of one embodiment of the device with cover pieces removed to see the internal elements.

FIG. 6 shows another front perspective view of the mechanical transplanter 18 from the opposite side as that shown in FIGS. 3 and 4 and with various additional elements shown. This shows the grabber drive 44 on the right grabber 30, also can be seen the grabber drive 44 on the left grabber 28.

Figure 7:
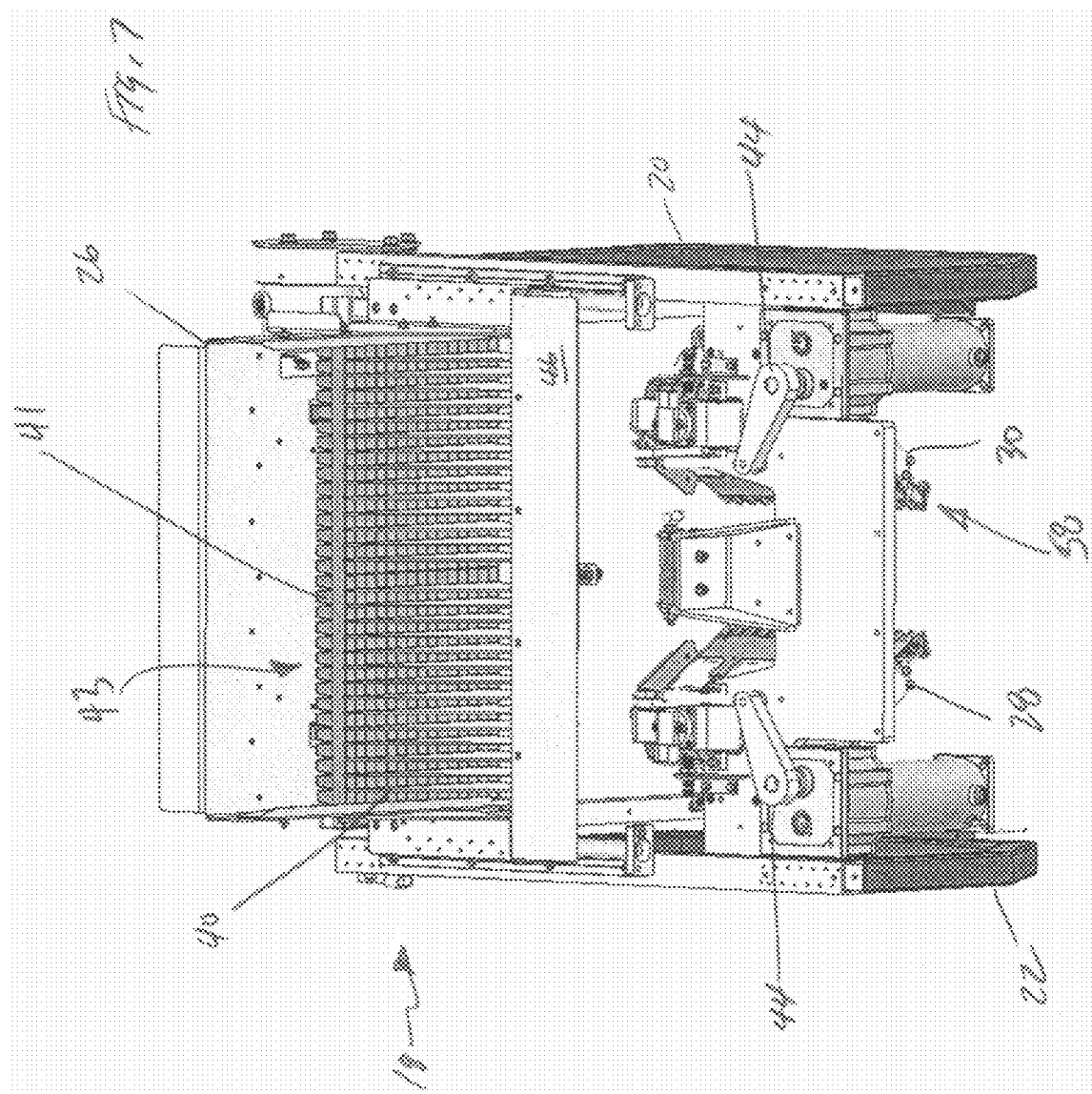
FIG. 7 shows a front perspective view of one embodiment of the device with cover pieces removed to see the internal elements.

FIG. 7 shows a front perspective view of the mechanical transplanter 18. This view shows the cells 41 in the tray 43 more clearly. Also shown is plate 46 which helps retain the partitions 40 in a parallel configuration to one another.

Figure 8:
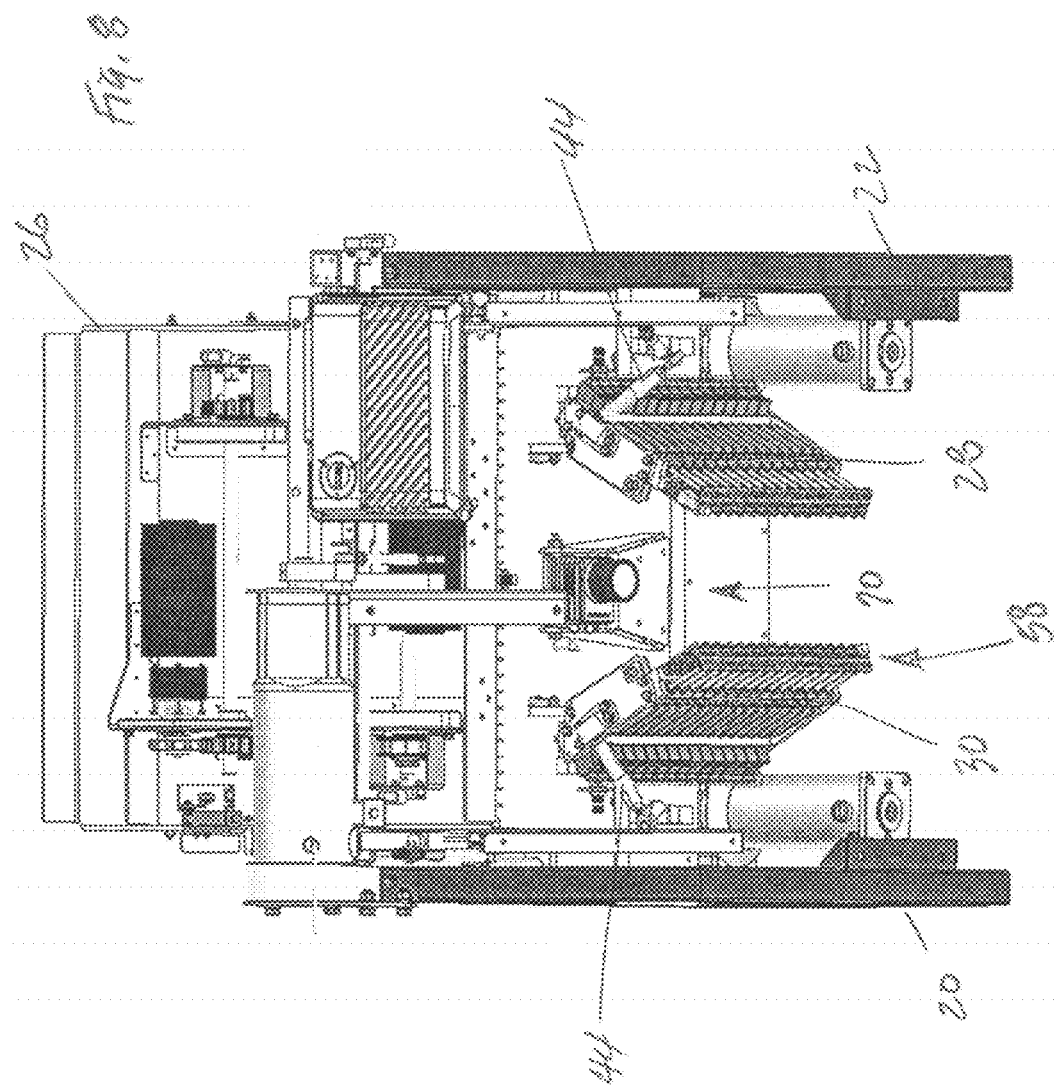
FIG. 8 shows a rear bottom perspective view of one embodiment of the device showing one embodiment of the inspection, vision or sensor system.

FIG. 8 shows a bottom rear perspective view of the mechanical transplanter 18. In this view is shown the vision system 70. As noted, the vision system 70 can be used to determine if there is a plant in an individual cell 41 before the grabbers 28, 30 remove the plants 38 from the cells 41.

The vision system 70 can also be used to do a quality check on the plants 38 once removed from the cells 41. This check would help determine if the plant 38 had a good chance of flourishing or if another plant from another cell 41 should be pulled. It makes little sense to place a plant 38 that is not healthy or mis-formed.

Figure 9:
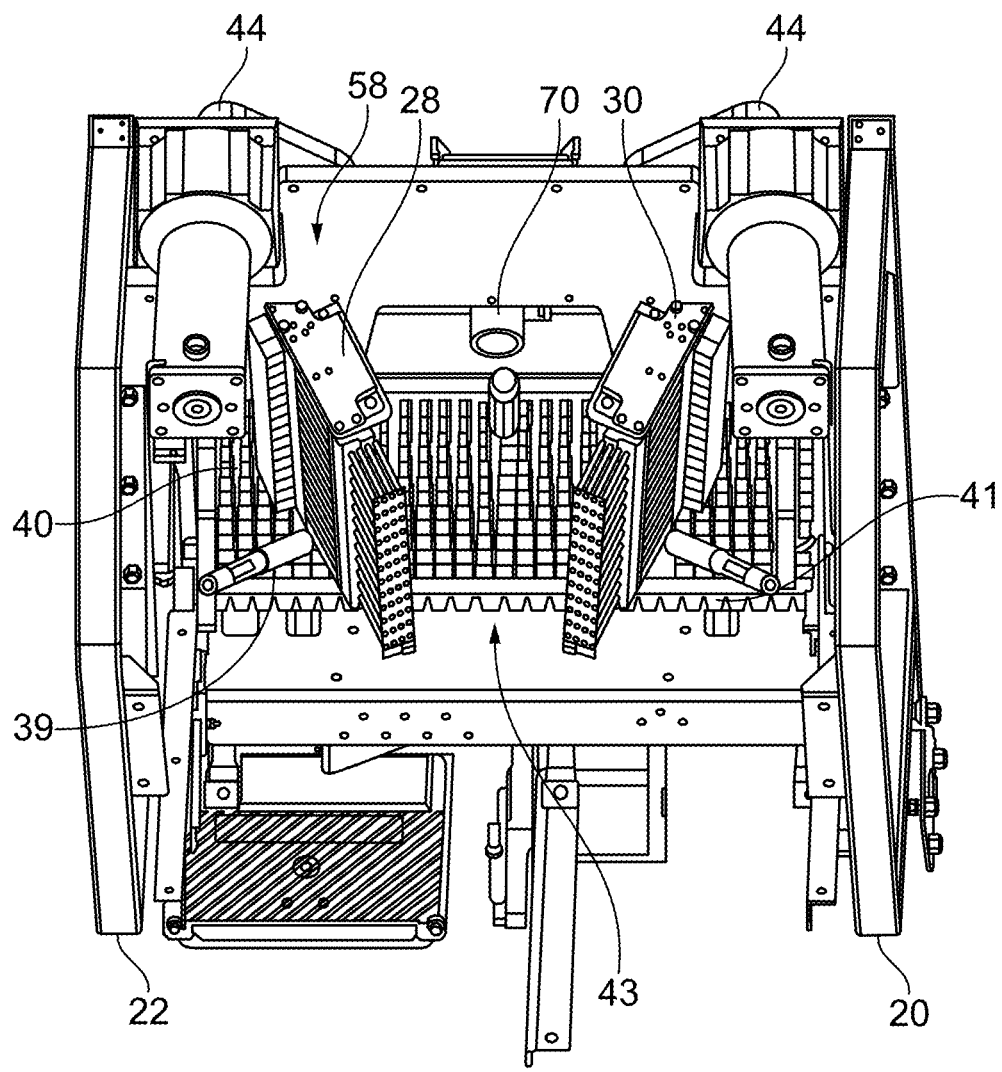
FIG. 9 shows a front bottom perspective view of one embodiment of the device showing the arrangement of elements with grabbers in the first position.

FIG. 9 is a bottom front perspective view of a mechanical transplanter 18. In this view, the cells 41 in the tray 43 can more clearly be seen in a position extending below the bottom edge 39 of the partitions 40. When the cells 41 of the tray 43 are located below the bottom edge 39 of the partitions 40, the left and right grabbers 28, 30 can pluck the plants 38 from the cells 41. As a row of plants 38 are plucked from the cells 41, the tray 43 indexes in a vertical direction towards the soil 75 (not shown this Fig.). Once all the plants 38 are removed from the cells 41 in the tray 43, the tray 43 drops onto a storage area (not shown) from where it is later collected for replanting.

Figure 10:
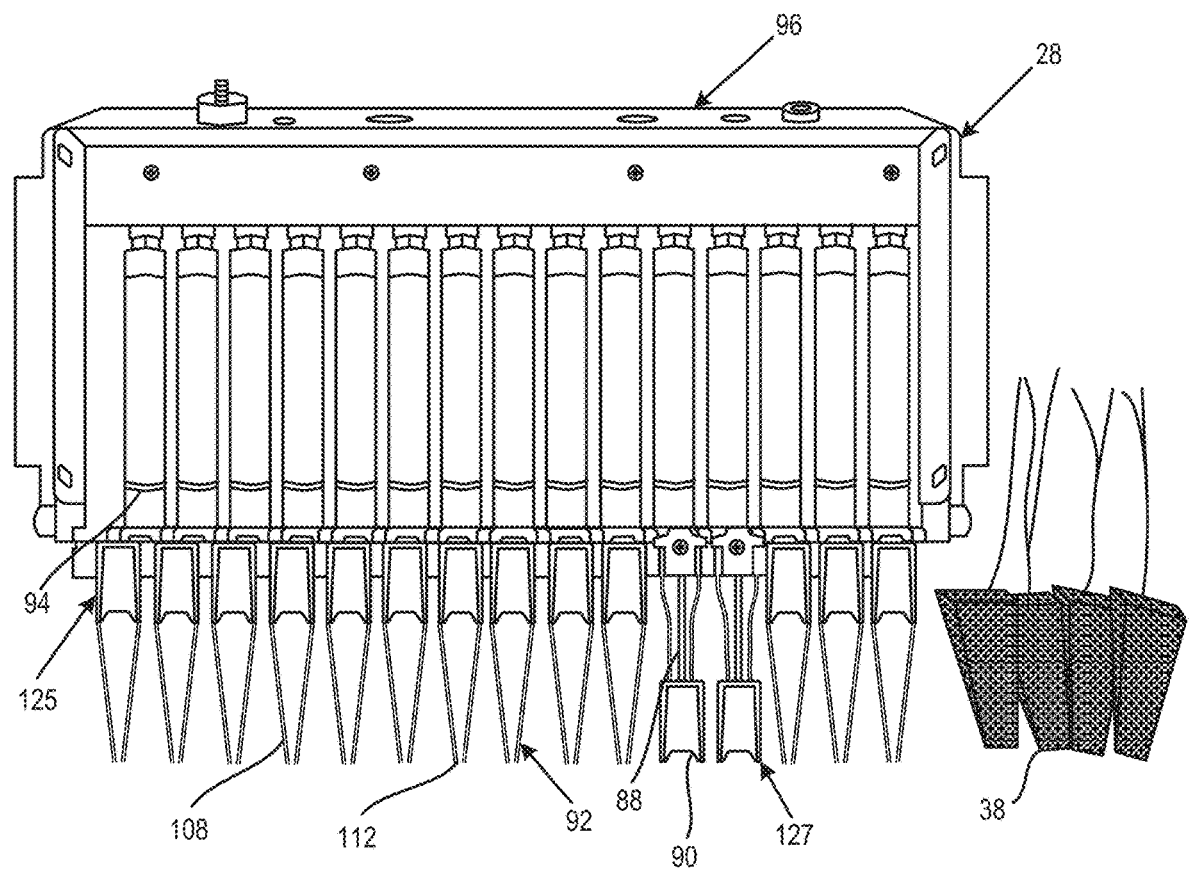
FIG. 10 shows a front side view of one embodiment of a grabber.
Figure 11:
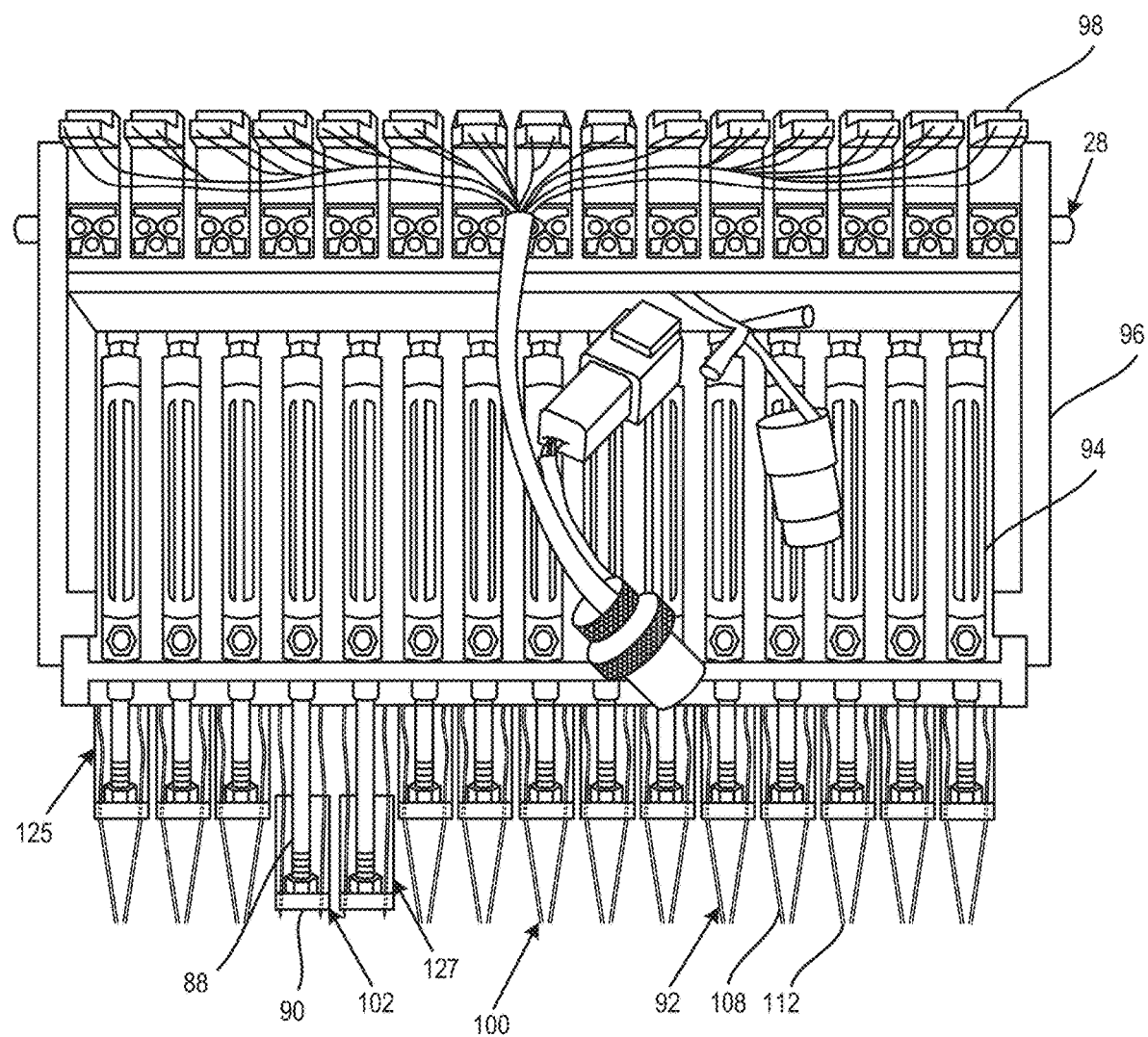
FIG. 11 shows a back side view of one embodiment of the grabber of FIG. 10.

FIG. 10 shows a first side view of, as an example, the left grabber 28. FIG. 11 shows a second side view of left grabber 28.

In FIG. 11 can be seen the frame 96 that houses the elements that make up the device that both grasps the plants 38 from the individual cells 41 and also ejects with force, the plants 38 into the funnel 36 and ultimately into the soil 75. This embodiment utilizes an air cylinder 94 with controls 98. The air cylinder 94 is affixed to a pair of forks 92. The forks 92 have tines 108, generally two on each fork 92. This embodiment shows two forks 92 affixed to the each cylinder 94. Each cylinder 94 also has a rod 88 which translates into and out of the cylinder 94. A plunger block 90 is affixed to one end of the rod 88. It should be understood that other methods of ejecting the plants 38 into the funnel 38 and soil 75 could be used such as a solenoid & other mechanical, electrical or non-mechanical methods or means. This ejection of the plants 38 can be timed with other elements to optimize planting time and spacing and other parameters.

FIGS. 10 and 11 also show the translation of the plunger block 19 from a position close to the bottom of the air cylinder 94 to one away from the air cylinder 94. Both views show the tines 108 of the forks 92 engaging the plants 38. This is approximately the position that the plants 38 are in when plucked from the cells 41 of the tray 43. When the left grabber 28 would translate and rotate from the second position 60 to the first position 58, the air cylinder 94 rod 88 would be engaged and translated from within the air cylinder 94 to that position where it is at a maximum position away from the air cylinder 94. This would translate the plunger block 90 from the first position 125 to the second position 127. As can be seen, the translation of the plunger block 90 into the second position 127 would forcibly eject the plant 38 from the tines 108 of the fork 92 and into the funnel 36 and ultimately into the soil 75 thereby planting the plant 38. Other methods of ejecting the plants 38 could also be utilized as noted.

Figure 12:
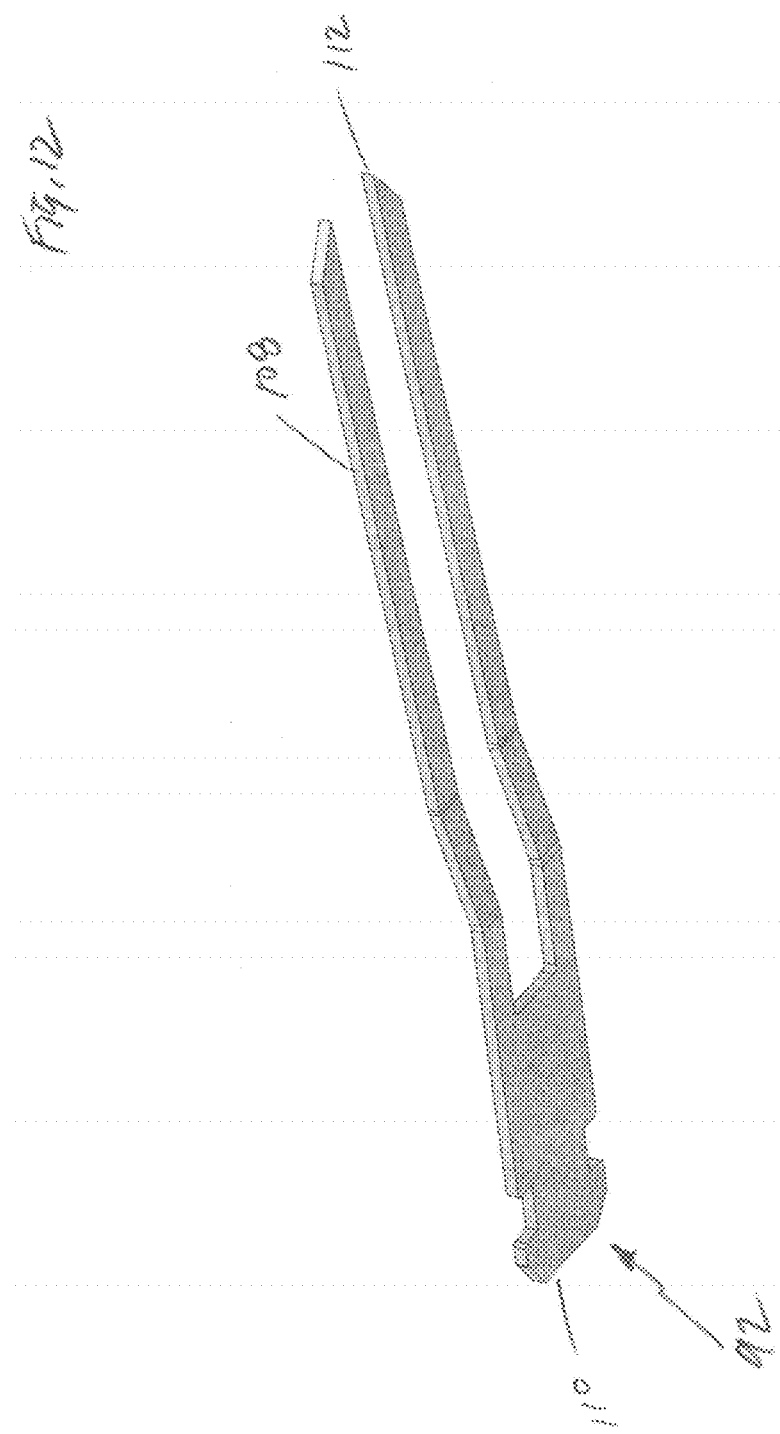
FIG. 12 shows a fork with tines which are used to grasp a plant or plant ball.

FIG. 12 shows a perspective view of one embodiment of a fork 92 having tines 108.

Figure 13:
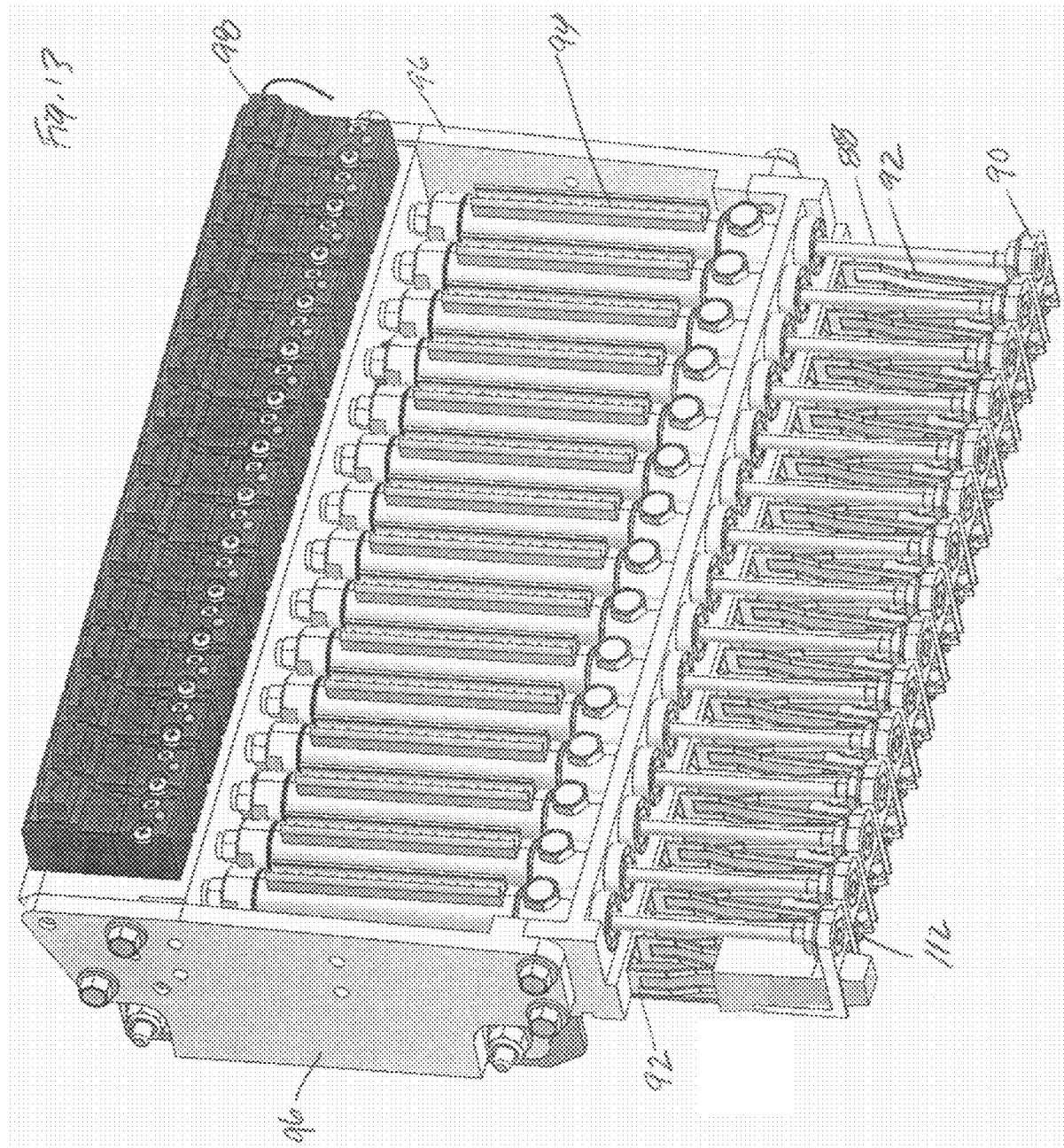
FIG. 13 shows a back side drawing of one embodiment of a grabber.

FIG. 13 shows one side of one embodiment of a grabber 30 showing the air cylinders 94 affixed to the frame 96. The air cylinders 94 have a rod 88 extending from the lower section. The rod 88 is affixed to a plunger block 90. Also affixed near the bottom of the air cylinder 94 is a fork 92.

As can be appreciated, the logic and programming of the operation of these elements can be optimized based on soil conditions, the size, shape and weight of the plants 38 that are being planted. This mechanical transplanter 18 can pluck and plant many plants 38 more consistently and with less variability than human labor.

Figure 14:
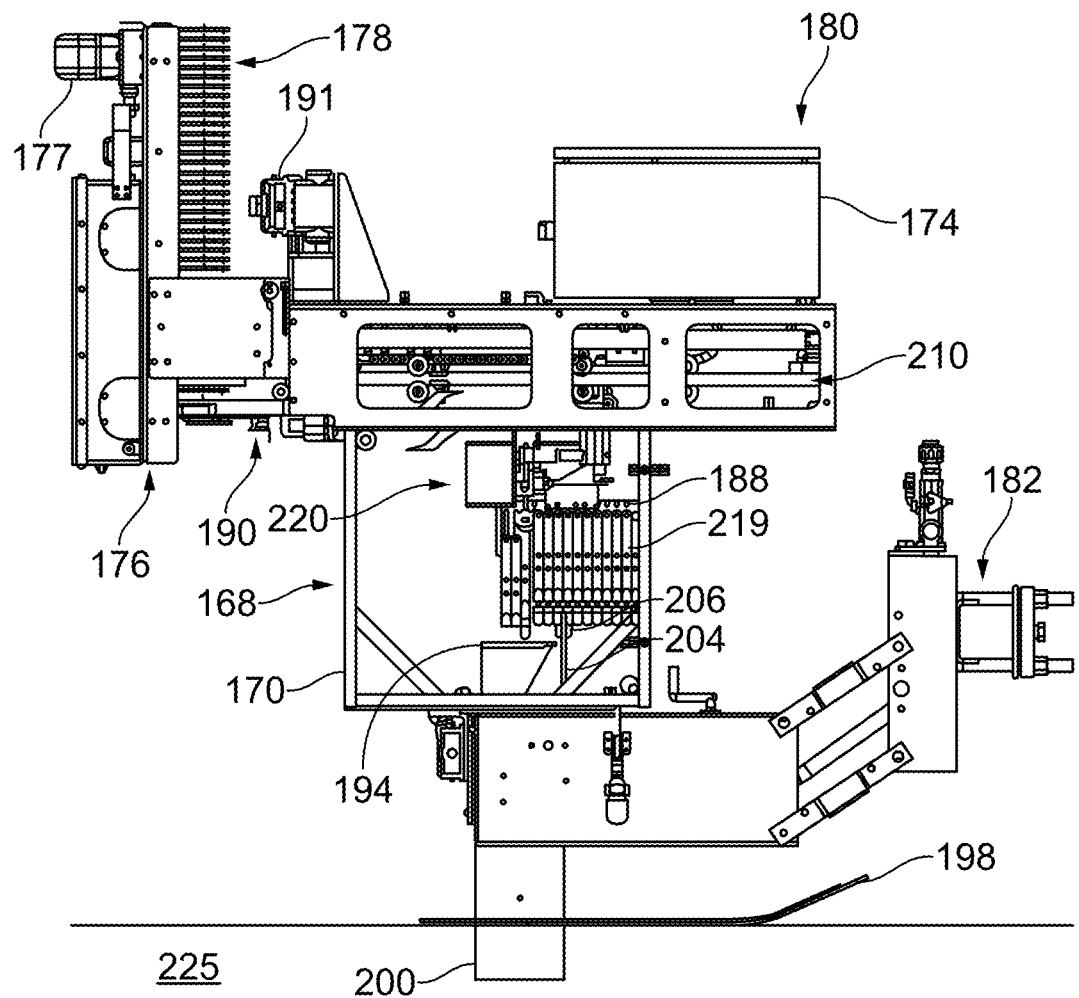
FIG. 14 shows a right side view of another embodiment of a mechanical transplanter.

FIG. 14 shows a second embodiment of the mechanical transplanter device 180. The transplanter 180 has several components, such as a feeder 176 which houses the loaded trays 178 containing plant balls 185. This is connected to the translation mechanism 210 which has a housing and grab control 191 and grab motors 192. The translation mechanism 210 is used to translate and rotate the right grabber 190 and left grabber 188. A housing 168 is located below the translation mechanism 210. The right and left grabbers 190, 188 move from inside the housing 168 to outside the housing 168 to grasp plant balls 185 from the feeder 176 tray 178.

FIG. 14 shows right grabber 190 engaging with the feeder 176 to obtain plant balls 185. Left grabber 188 has already engaged the plant balls 185 and is ejecting them into the funnel 194. From the funnel 194 the plant balls are forced through the shoe 200 and into the planting ground 225. As one plant ball 185 is ejected, the grabber 188 indexes on the translation mechanism 210 and the trigger mechanism 220 trigger 218 trips another ejector 219 to eject another plant ball 185 into the ground 225.

The mechanical transplanter 180 also has a control box 174 to control and coordinate the various elements that make up the transplanter 180. There is an electrical/mechanical connector 182 for affixing the mechanical transplanter 180 to a tractor or other device. The connector 182 can provide electrical power and mechanical power to the transplanter 180. Near the bottom of the transplanter 180 is located a ski 198. The ski 198 rides along the ground 225 to make a flat path in the ground 225 to allow the shoe 200 to direct the plant balls 185 from the ejecting grabber 188, 190.

The figures are arranged to allow better explanation of the functioning of the device as it is working planting plant balls 185 into the ground 225.

As noted FIG. 14 shows right grabber 190 engaging the feeder 176 tray 178 to engage plant balls 185. Left grabber 188 is ejecting plant balls 185 into the funnel 194, to the shoe 200 and into the ground 225. In this figure the left grabber 188 is indexing towards the left.

Figure 15:
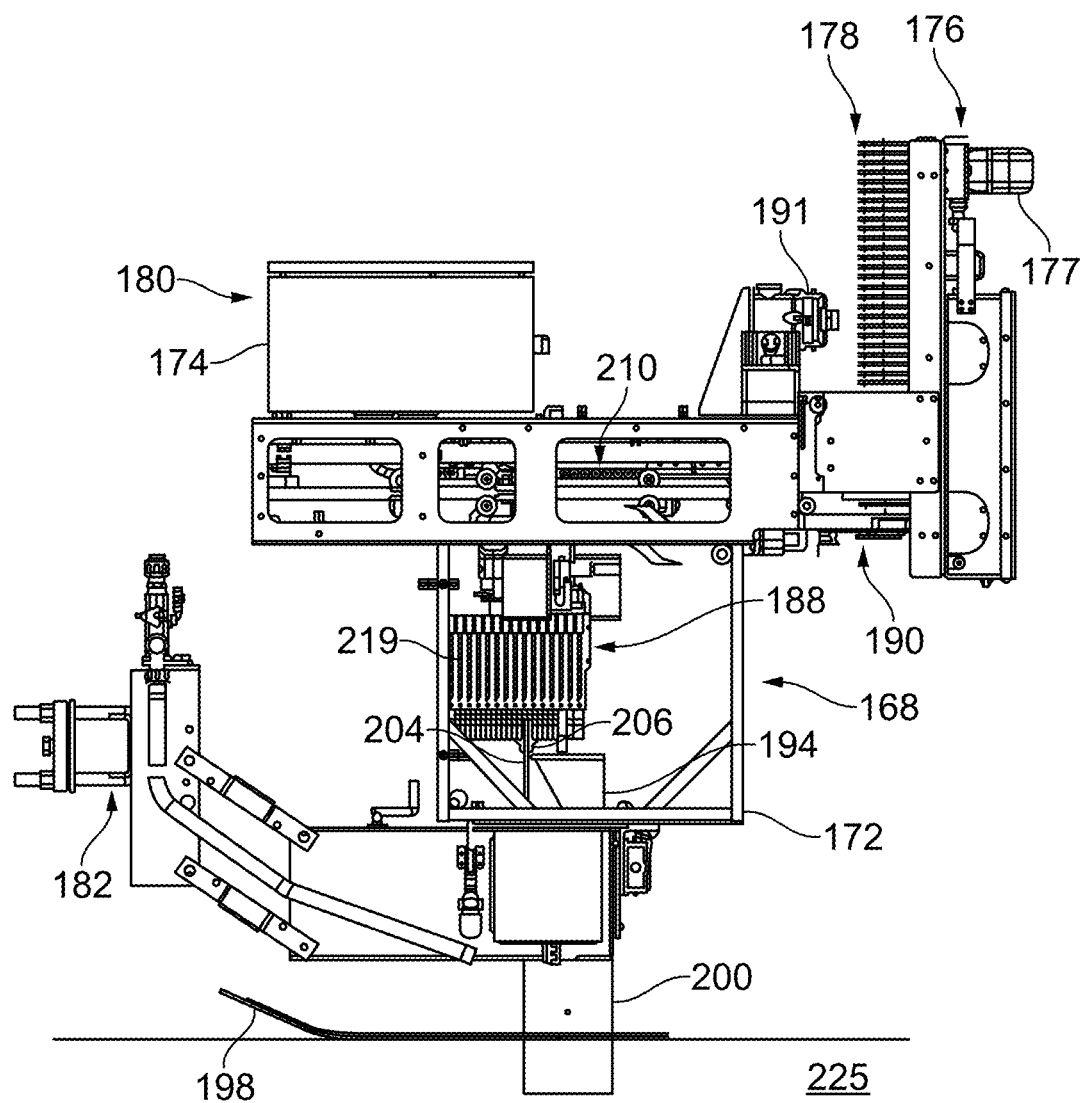
FIG. 15 shows a left side view of the embodiment of FIG. 14.

FIG. 15 shows a left side view of the mechanical transplanter 180 with the left and right grabbers 188, 190 indexed to the same position as that in FIG. 14. FIG. 15 shows the sensor plate 204 located in the housing 168 and near funnel 194. The sensor plate 204 is shaped like the capital letter E and affixed to the bottom of the housing 168 on it's long side so that the prongs of the E are upwards vertical. There are two sensor transmitters 205 located on the center post of the E and they point in opposite directions. Each exterior post of the E has a sensor receiver 206 corresponding to one sensor transmitter 205. The transmitters 205 and receivers 206 are for checking that the plant balls 185 when engaged by the grabbers 188, 190 during the cycle are present and have enough root growth to plant. This operation will be explained more fully infra.

Figure 16:
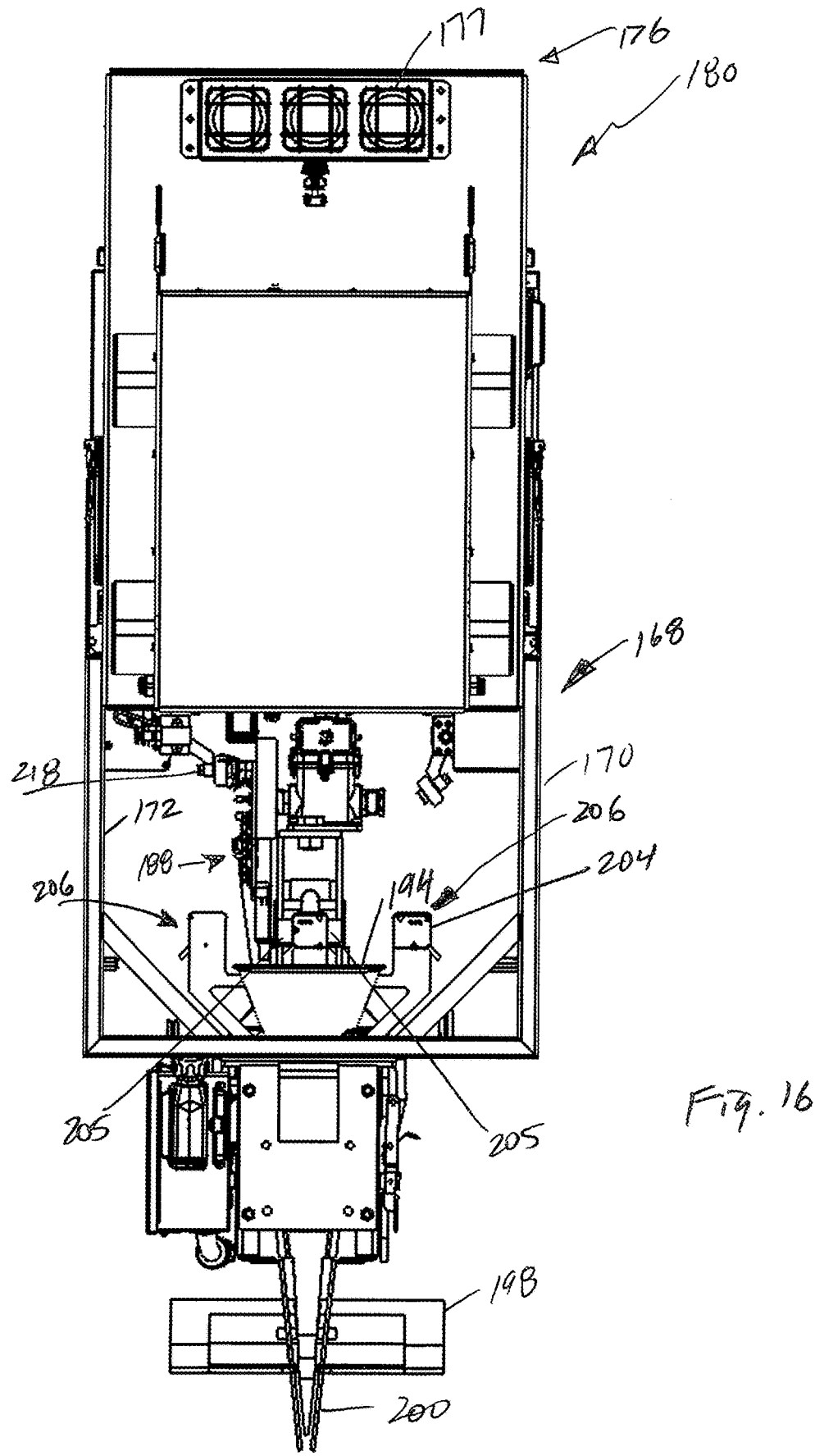
FIG. 16 shows a rear side view of the embodiment of FIG. 14.

FIG. 16 shows a rear view of the mechanical transplanter 180 with the grabbers 188, 190 in the same position as FIG. 14. This view better shows the sensor plate 204, sensor transmitters 205 and sensor receivers 206. In this view, the grabber 188 can be seen passing between the center post of the sensor plate 204 and the arm on the left which houses the sensor receiver 206. Also can be seen trigger 218 engaging the lever 216 near the top of left grabber 188.

Figure 17:
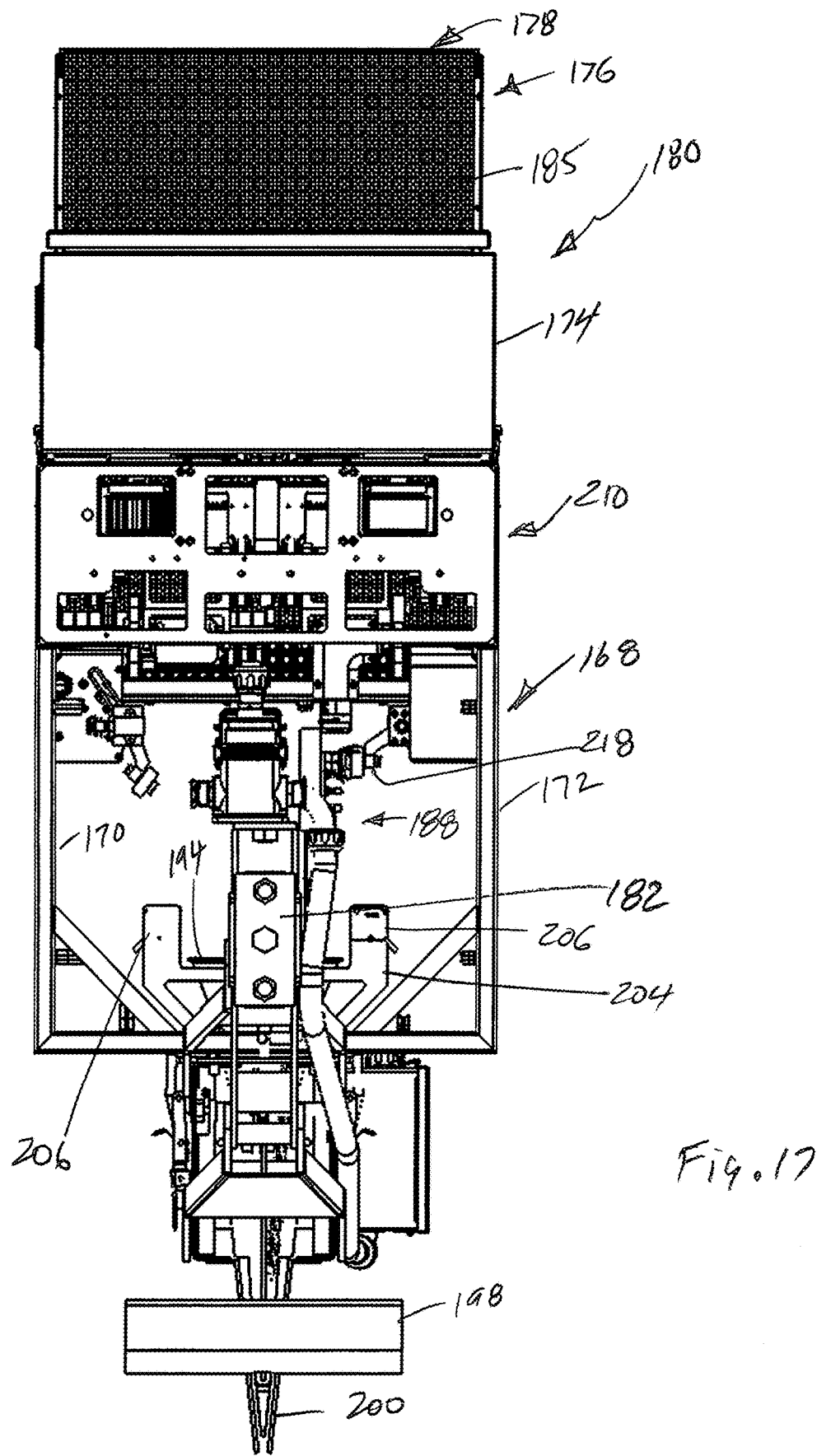
FIG. 17 shows a front side view of the embodiment of FIG. 14

FIG. 17 shows a front view of the mechanical transplanter 180 with the grabbers 188, 190 in the same position as FIG. 14. In this view, the control box 174 is more clearly shown on top of the translation mechanism 210 and the plant balls 185 can be seen located in the tray 178 of the feeder 176.

Figure 18:
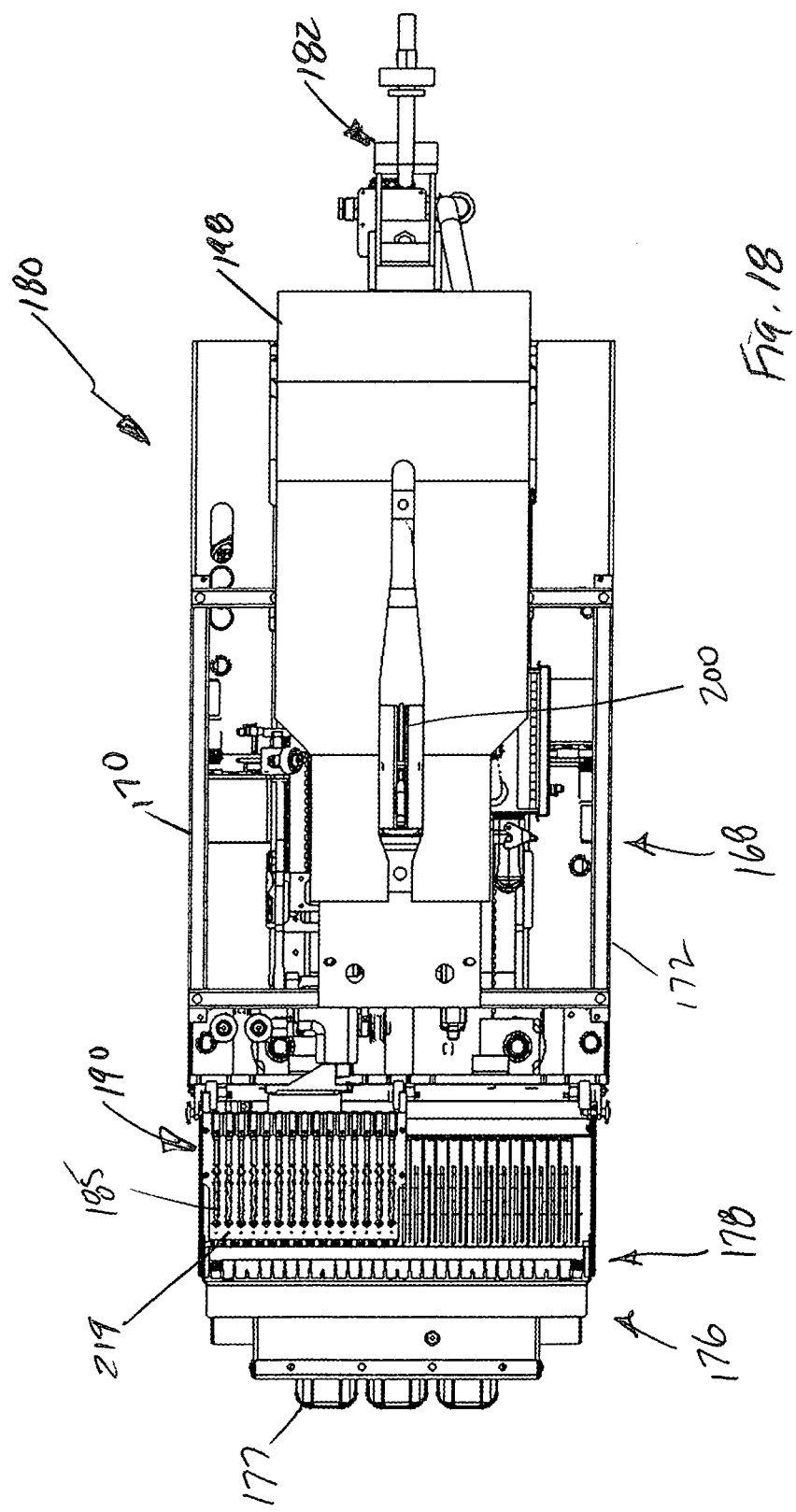
FIG. 18 shows a bottom view of the embodiment of FIG. 14.

FIG. 18 shows a bottom view of the mechanical transplanter 180 with the grabbers 188, 190 in the same position as FIG. 14. Right grabber 190 can be seen snatching plant balls 185 from the tray 178 of feeder 176.

Figure 19:
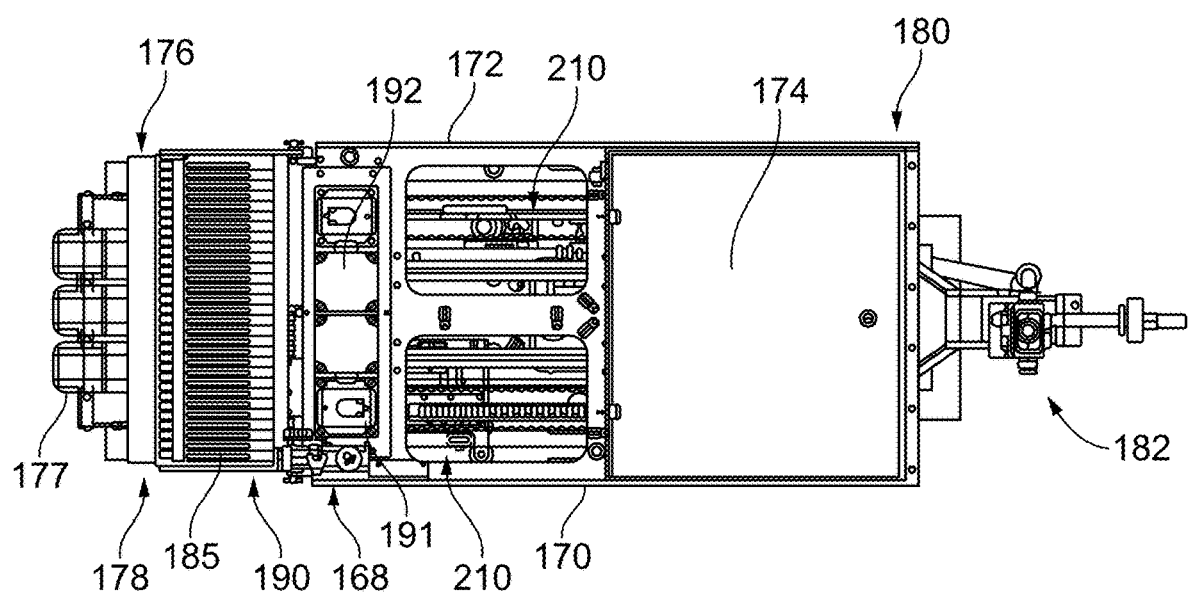
FIG. 19 shows a top view of the embodiment of FIG. 14.

FIG. 19 shows a top view of the mechanical transplanter 180 with the grabbers 188, 190 in the same position as FIG. 14. In this view can be seen the grab motors 192 for operating the translation mechanism 210 and the grab controller 191 for interfacing with the feed motor 177 of the feeder 176 and control box 174. The control box 174 controls the logic and operation for the mechanical and electrical elements of the device.

Figure 20:
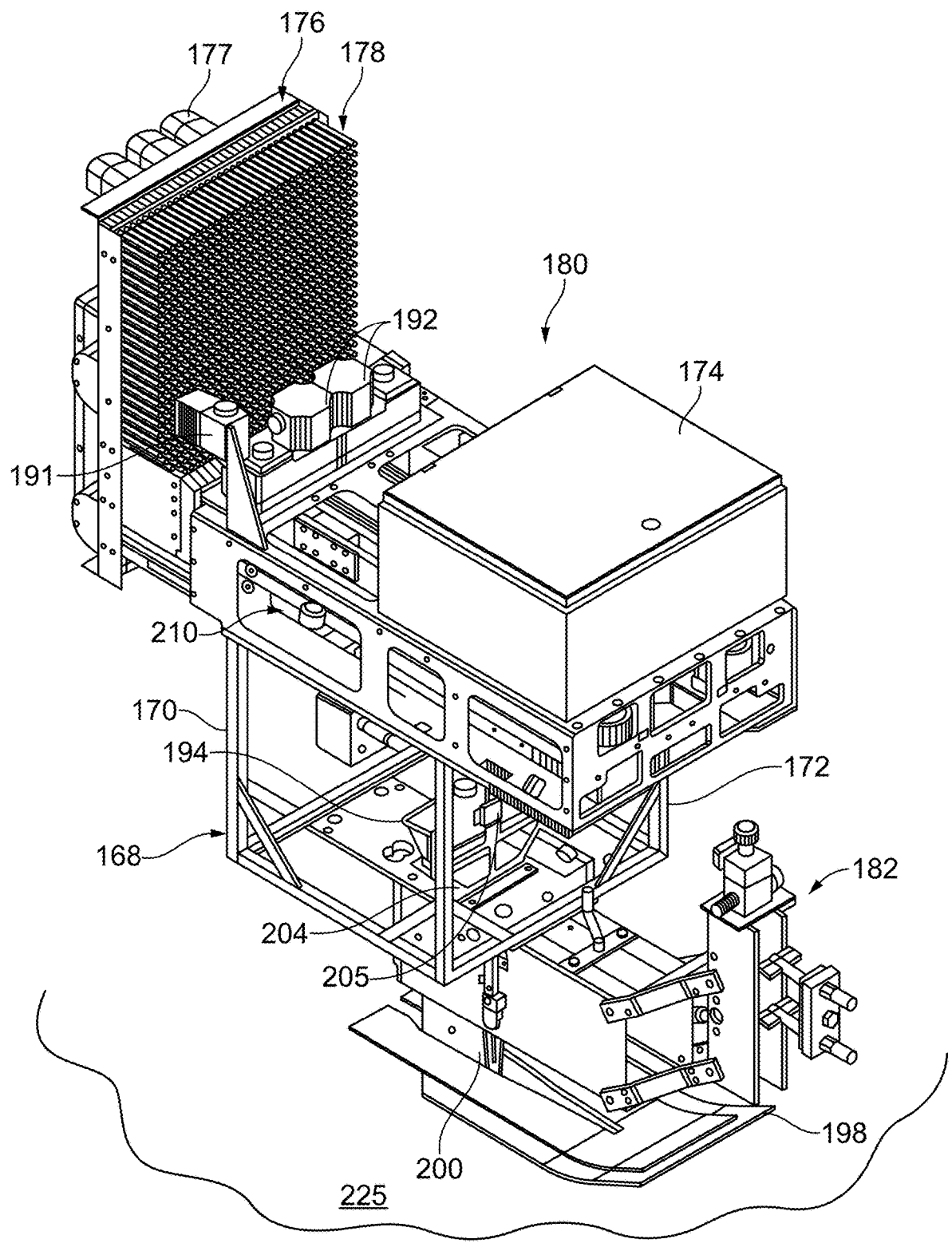
FIG. 20 shows a top front right side perspective view of the embodiment of FIG. 14.

FIG. 20 shows a top front perspective view of the mechanical transplanter 180 with the grabbers 188, 190 in the same position as FIG. 14. The housing 168 has a left frame 172 and a right frame 170.

Figure 21:
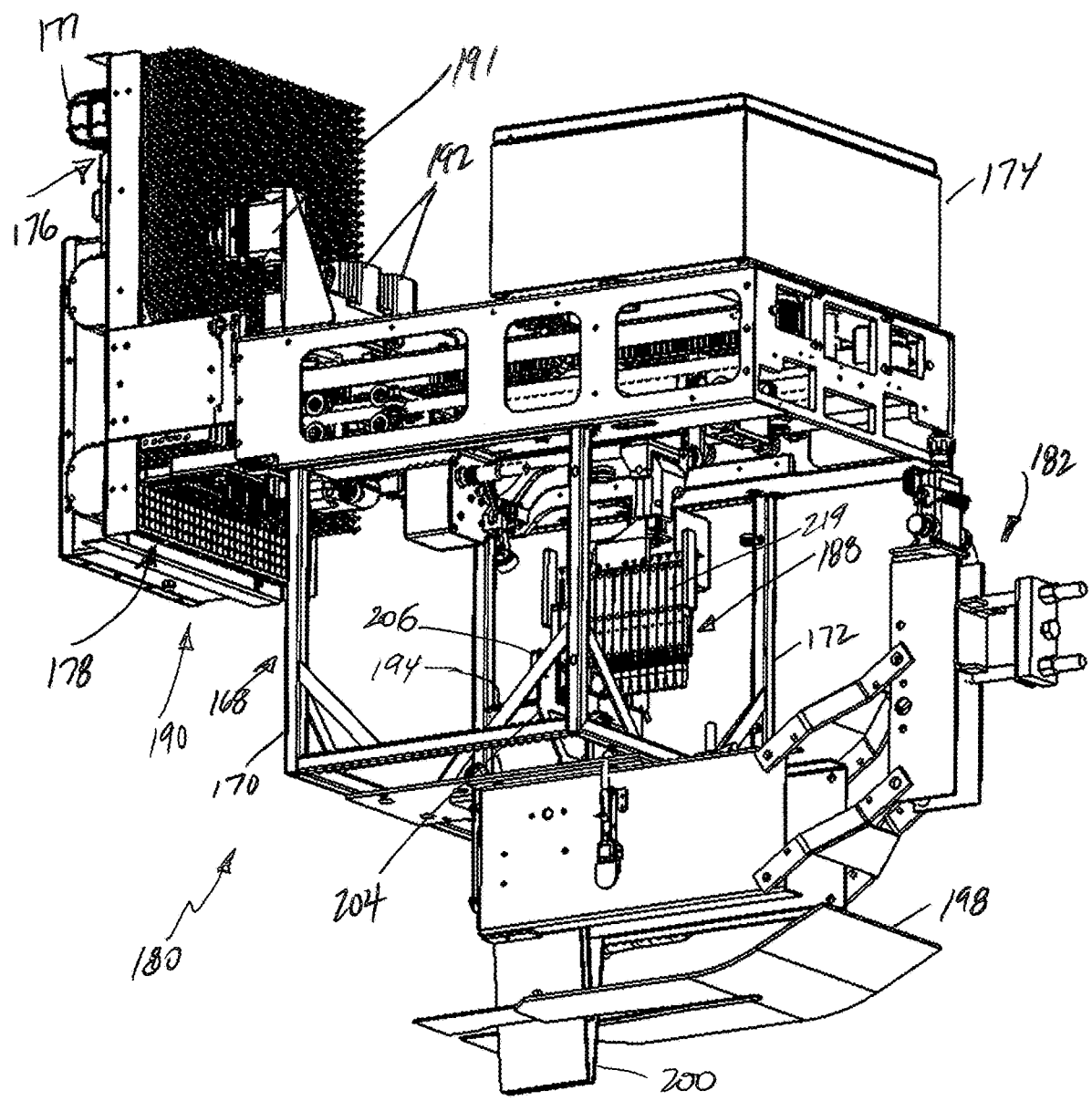
FIG. 21 shows a bottom right side perspective view of the embodiment of FIG. 14.

FIG. 21 shows a bottom right side perspective view of the mechanical transplanter 180. The left grabber 188 can be seen along with the sensor plate 204 and sensor receiver 206 for the right grabber 190.

Figure 22:
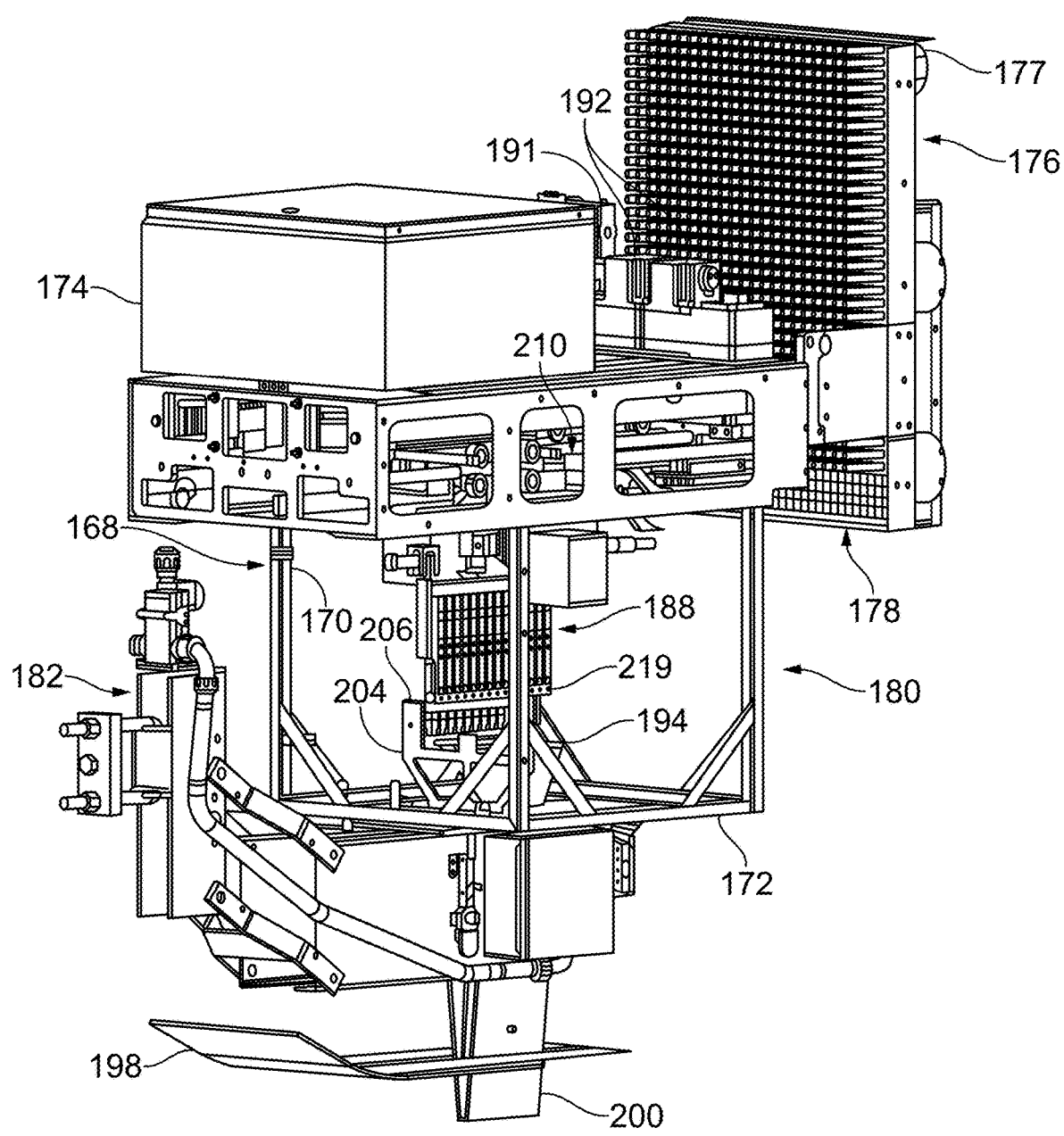
FIG. 22 shows a front left side perspective view of the embodiment of FIG. 14.

FIG. 22 shows a front left side perspective view of the mechanical transplanter 180. The left side of the left grabber 188 can be seen.

Figure 23:
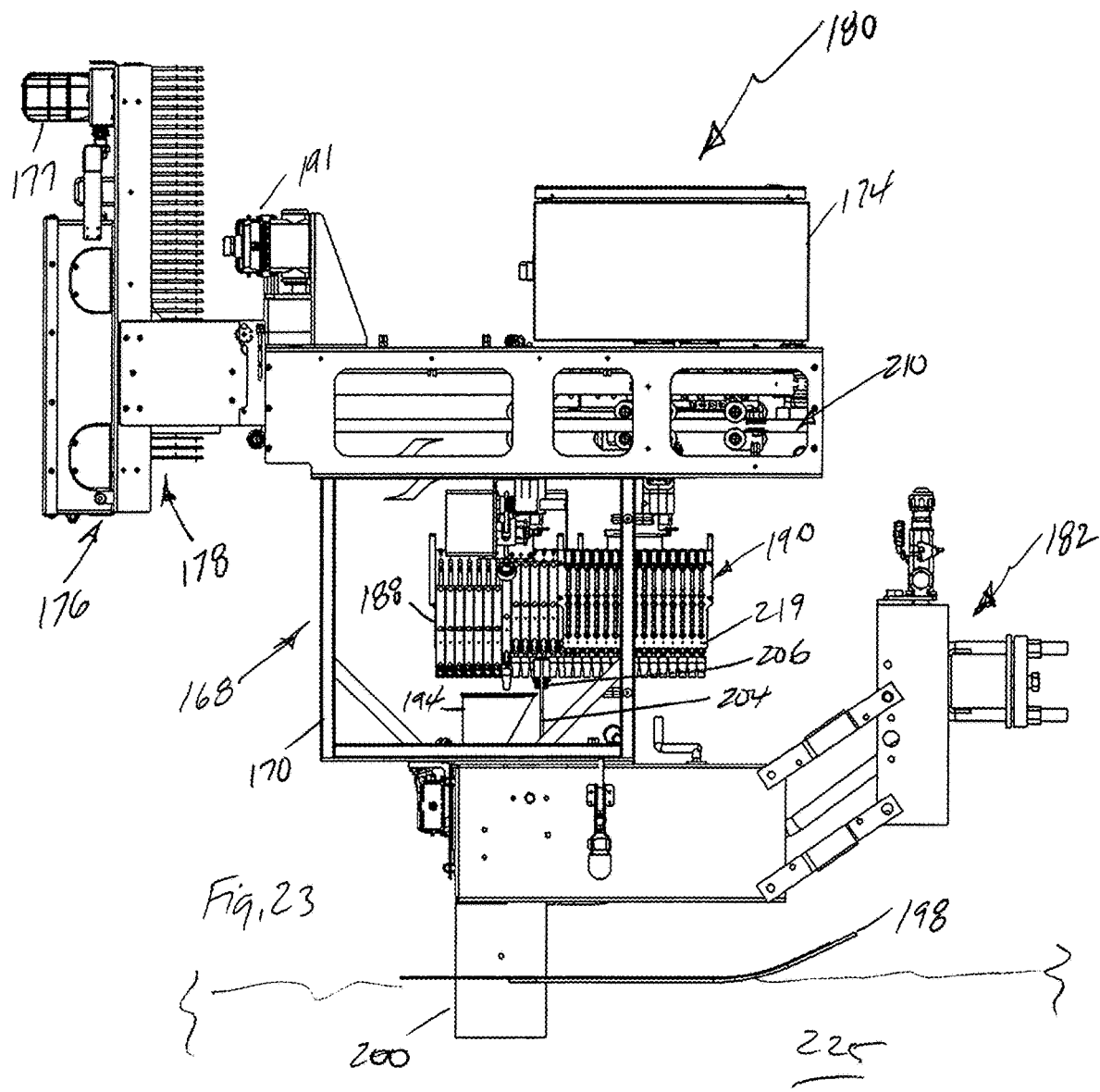
FIG. 23 shows a right side view of the embodiment of FIG. 14 with some elements in a different position.

FIG. 23 shows a right side view of the mechanical transplanter 180. In this figure, the left grabber 188 is ejecting plant balls 185 and is near empty. The right grabber 190 has been reloaded with plant balls 185 and has been indexed between the sensor transmitter 205. The sensor transmitter 205 is located on the center post of the sensor plate 204 and the sensor receiver 206, is located on the post nearest the right frame 170 of the sensor plate 204. As right grabber 190 indexes, a signal is transmitted from the sensor transmitter 205 in the direction of the right frame 170 towards the sensor receiver 206. If the signal is blocked, then this indicates that there is a plant ball 185 loaded. If the signal is mostly clear, this can indicate a bad plant ball 185 or no plant ball 185. The logic in the control box 174 then knows that this position should be skipped when the right grabber 190 indexes to the ejection position so that a good plant ball 185 is ejected at the planting position.

Figure 24:
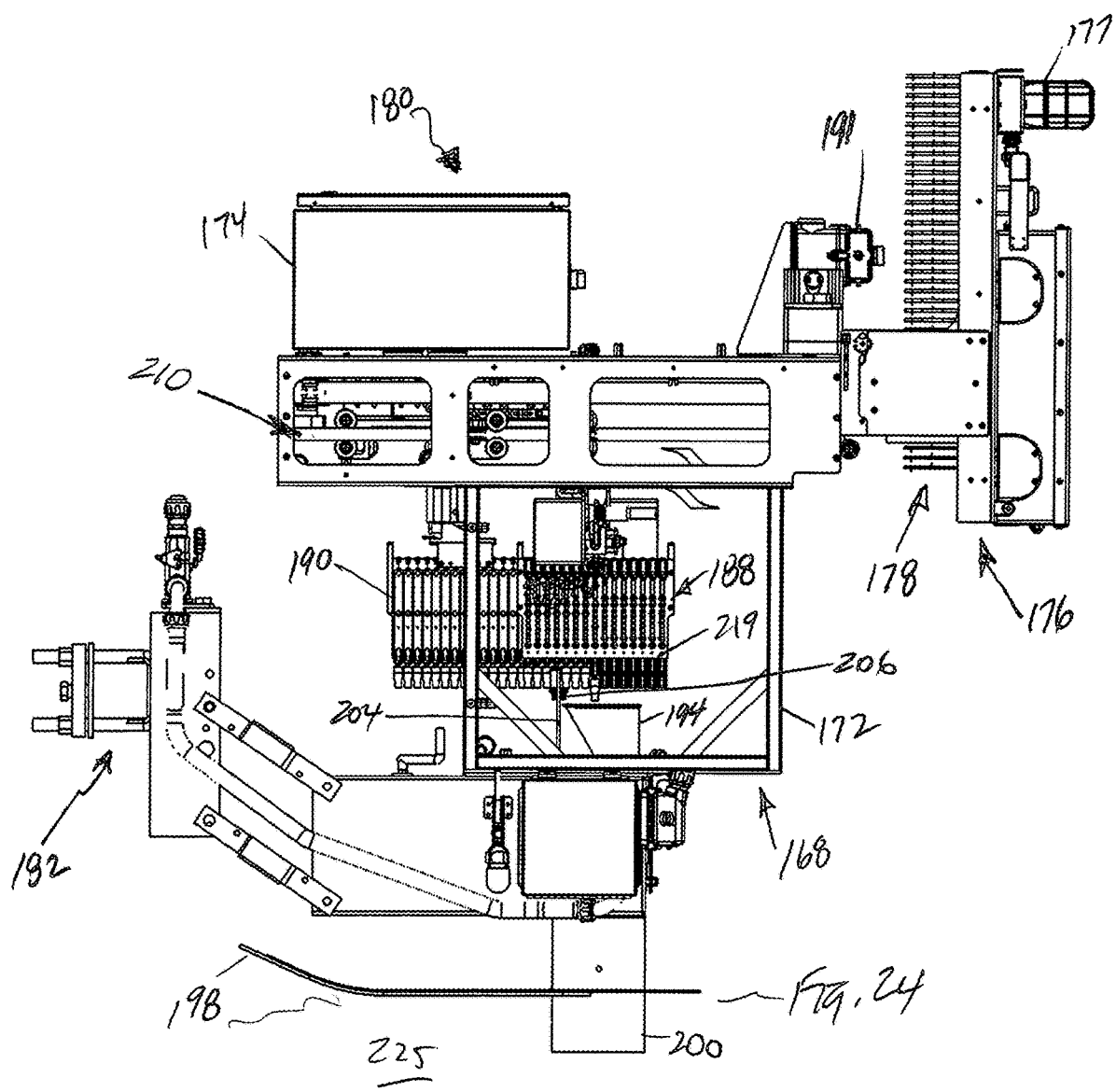
FIG. 24 shows a left side view of the embodiment of FIG. 14 with some elements in a different position.

FIG. 24 shows a left side view of the mechanical transplanter 180. In this figure, the left grabber 188 is ejecting plant balls 185 into the funnel 194 and to the ground 225. The right grabber 190 has been reloaded with plant balls 185 and is waiting to eject.

Figure 25:
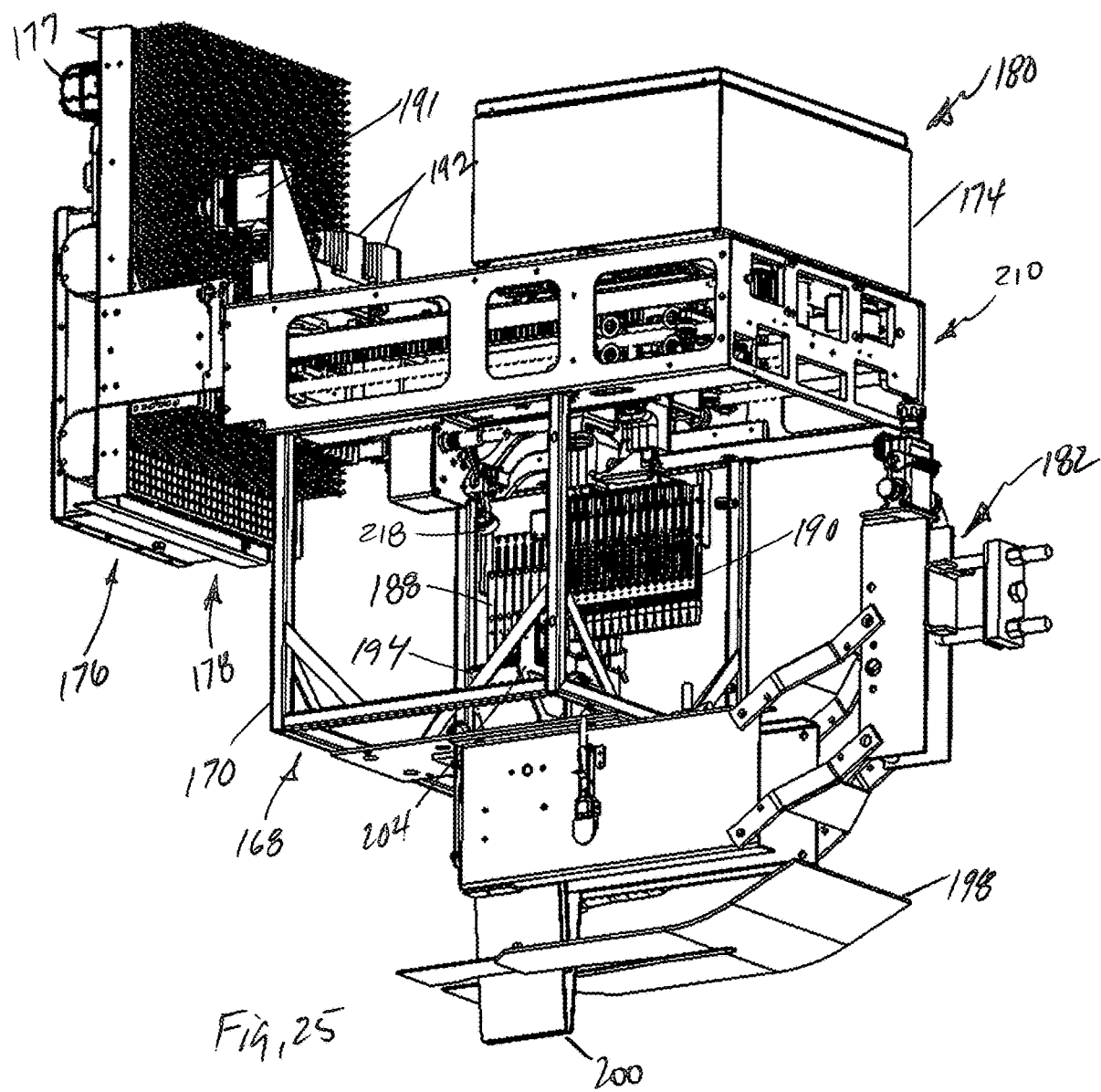
FIG. 25 shows a bottom right side perspective view of the embodiment of FIG. 14 with some elements in a different position.

FIG. 25 shows a right side perspective view of the mechanical planter 180. In this figure, the left grabber is ejecting plant balls 185 into the funnel 194 and into the ground 225. The right grabber 190 has been reloaded with plant balls 185 and is waiting to eject.

Figure 26:
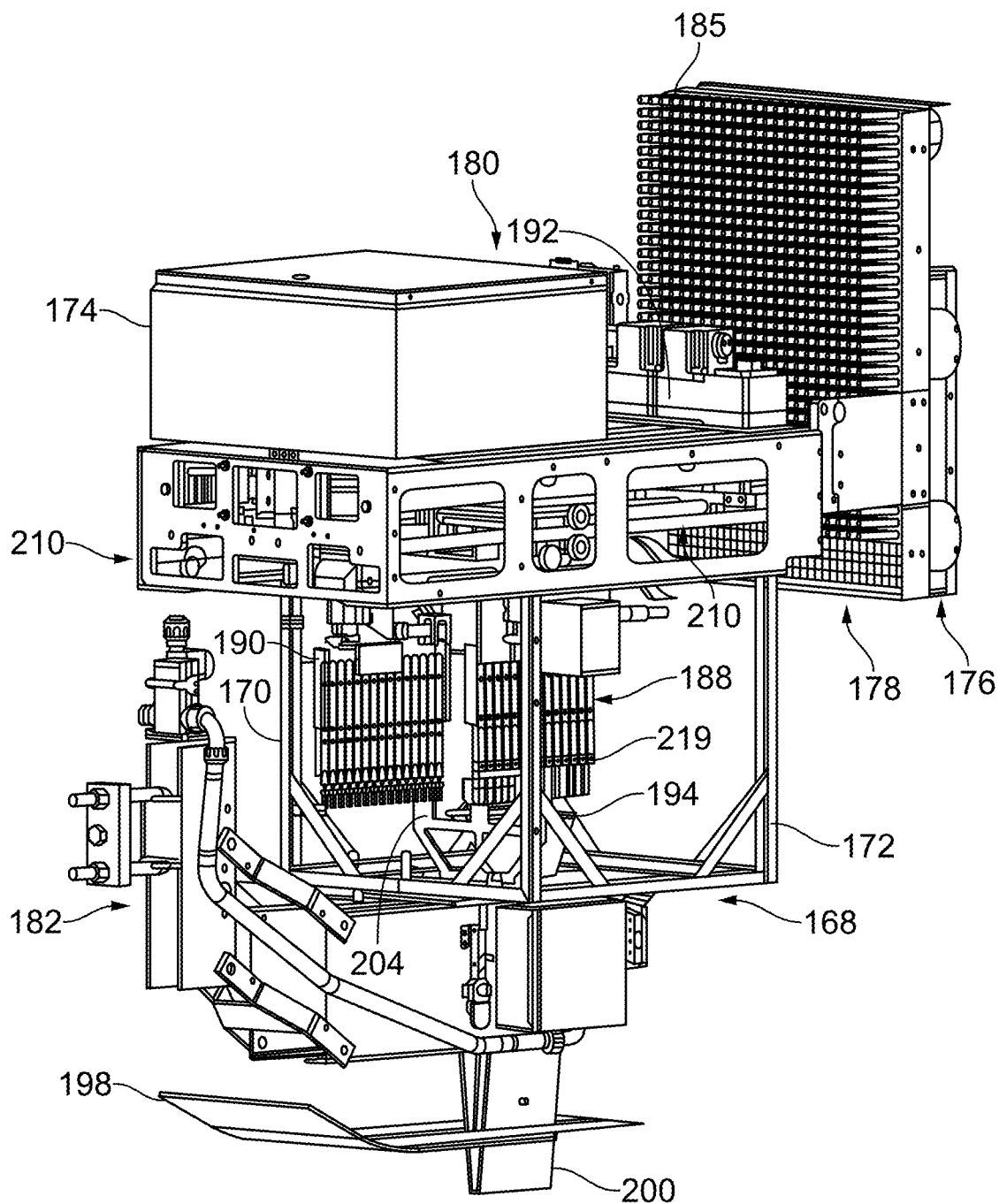
FIG. 26 shows a top left side perspective view of the embodiment of FIG. 14 with some elements in a different position.

FIG. 26 shows a left side perspective view of the mechanical transplanter 180. In this view, the left grabber 188 is dispensing or ejecting plant balls 185 and the right grabber 190 has been loaded with plant balls 185 and is ready to begin dispensing or ejecting.

Figure 27:
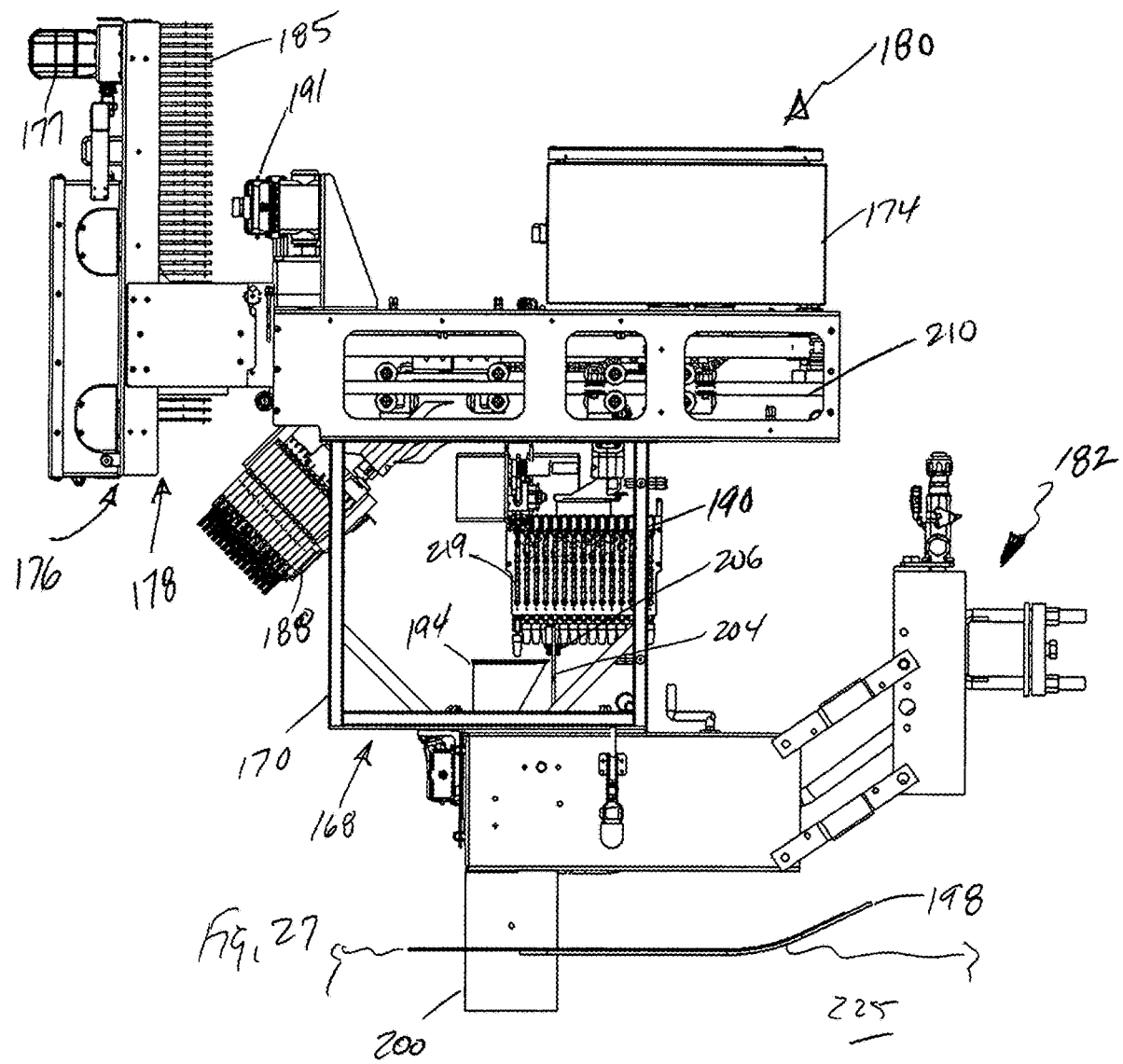
FIG. 27 shows a right side view of the embodiment of FIG. 14 with some elements in another position.

FIG. 27 shows a right side view of the mechanical transplanter 180. In this figure, the left grabber 188 has fully dispensed the plant balls 185 and is being translated towards the back of the transplanter 180 via the translation mechanism 210. As can be seen, the left grabber 188 is being rotated and translated such that it can engage the plant balls 185 and remove them from the tray 178 of the feeder 176. The right grabber 190 has indexed via the translation mechanism 210 over the funnel 194 and has begun ejecting the plant balls 185 into the funnel with force such that they are planted in the ground 225.

Figure 28:
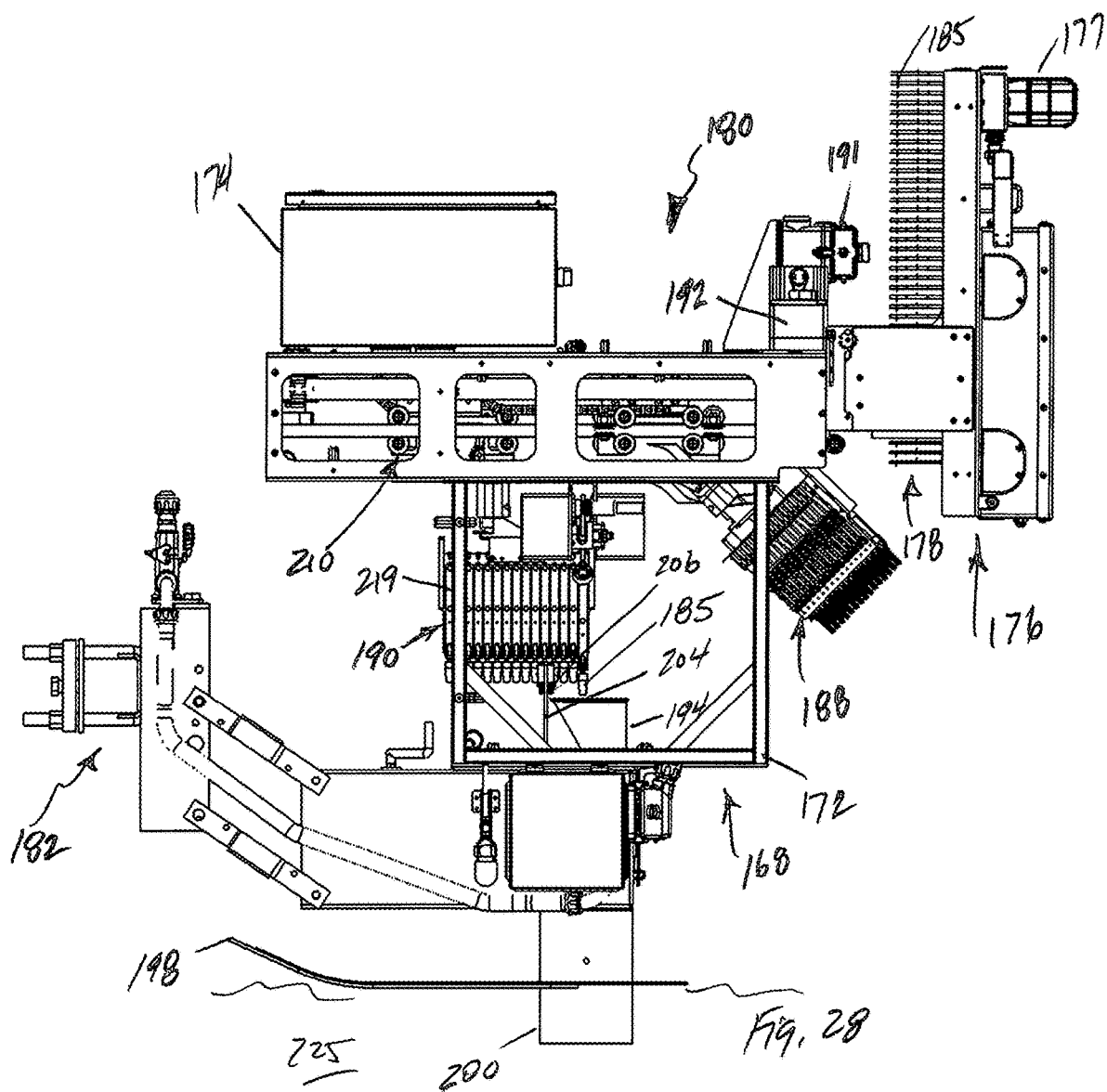
FIG. 28 shows a left side view of the embodiment of FIG. 14 with the some elements in another position.

FIG. 28 shows a left side view of the mechanical transplanter 180. The left and right grabbers 188, 190 are located in the same positions as those of FIG. 27. In this view, one can see the plant ball 185 being ejected into the funnel 194 for planting into the ground 225. The left grabber 188 can also be seen as it is moving to the position for loading plant balls 185 and cocking or loading the springs 215 of the ejectors 219. The ejectors 219 are spring loaded mechanisms that have a lever 216 located near the top of the ejectors 219 and forks or tines 211 located near the bottom. A pin 217 is engaged with the lever 216 to load the springs 215 of the ejectors 219. When the plant ball 185 is ejected, the trigger mechanism 220 moves the trigger 218 to engage the lever 216 which releases the pin 217 from the lever 216 allowing the spring 215 to return to the no tension position which ejects the plant ball 185 from the ejector 219 and into the funnel 194, better show in FIGS. 34, 35.

While this embodiment uses a mechanical spring system to obtain and eject the plant balls 185 it should be understood that several other types of systems could be utilized such as electrical systems, pneumatic systems and others.

Figure 29:
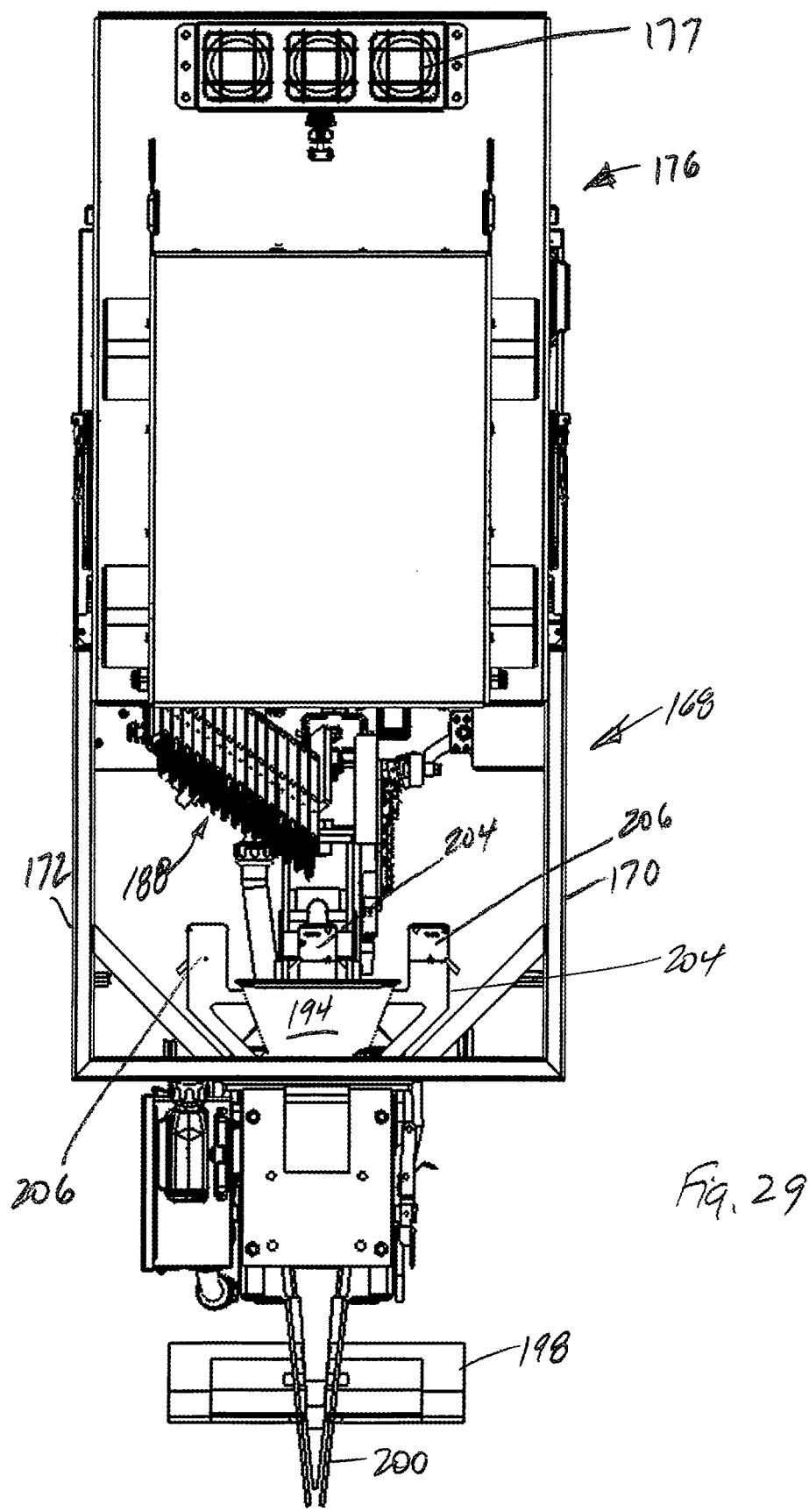
FIG. 29 shows a rear view of the embodiment of FIG. 14 with some elements in another position.

FIG. 29 shows a rear view of the mechanical transplanter 180. The grabbers 188, 190 are in the same position as those from FIG. 27.

Figure 30:
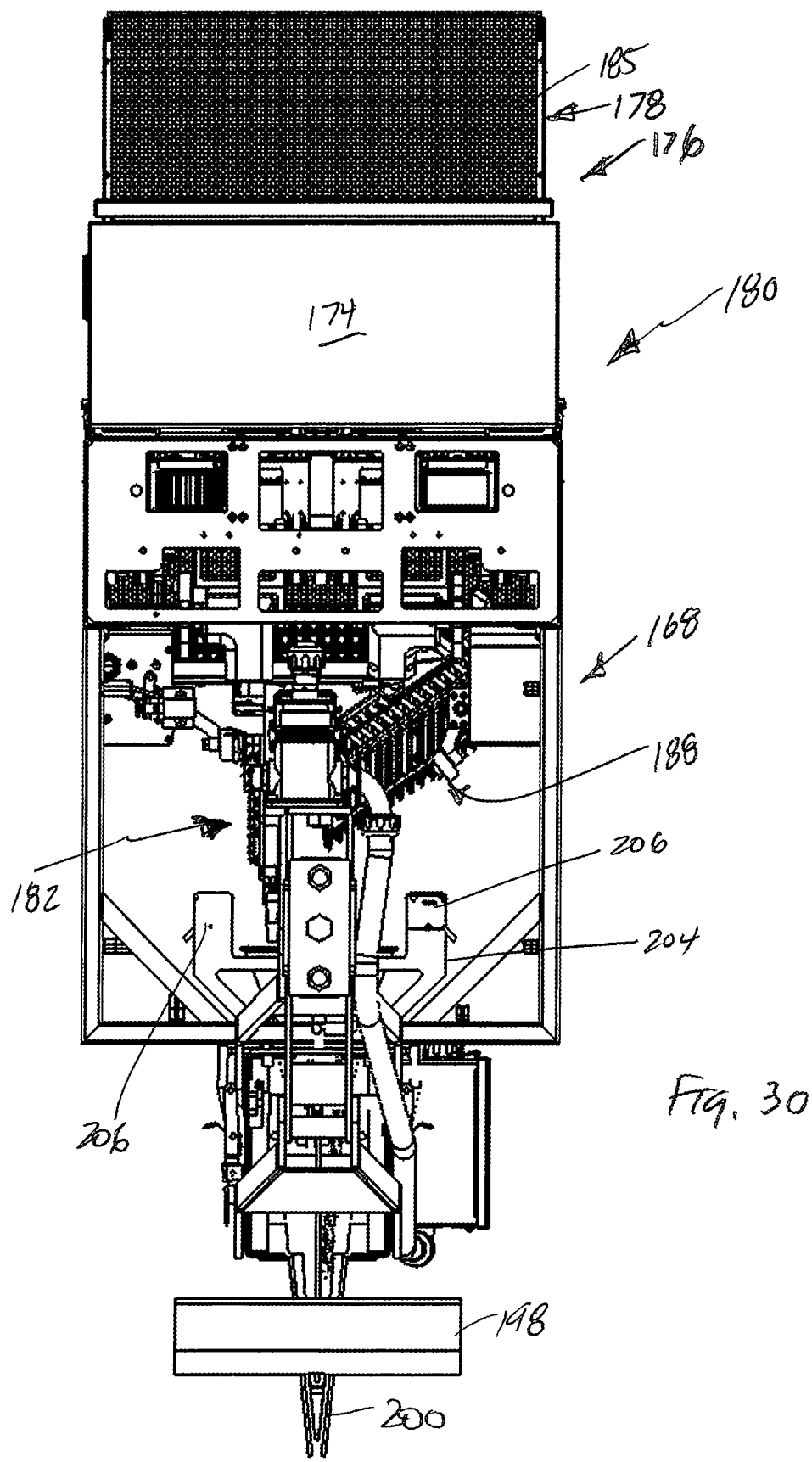
FIG. 30 shows a front view of the embodiment of FIG. 14 with some elements in another position.

FIG. 30 shows a front view of the mechanical transplanter 180. The grabbers 188, 190 are in the same position as those from FIG. 27.

Figure 31:
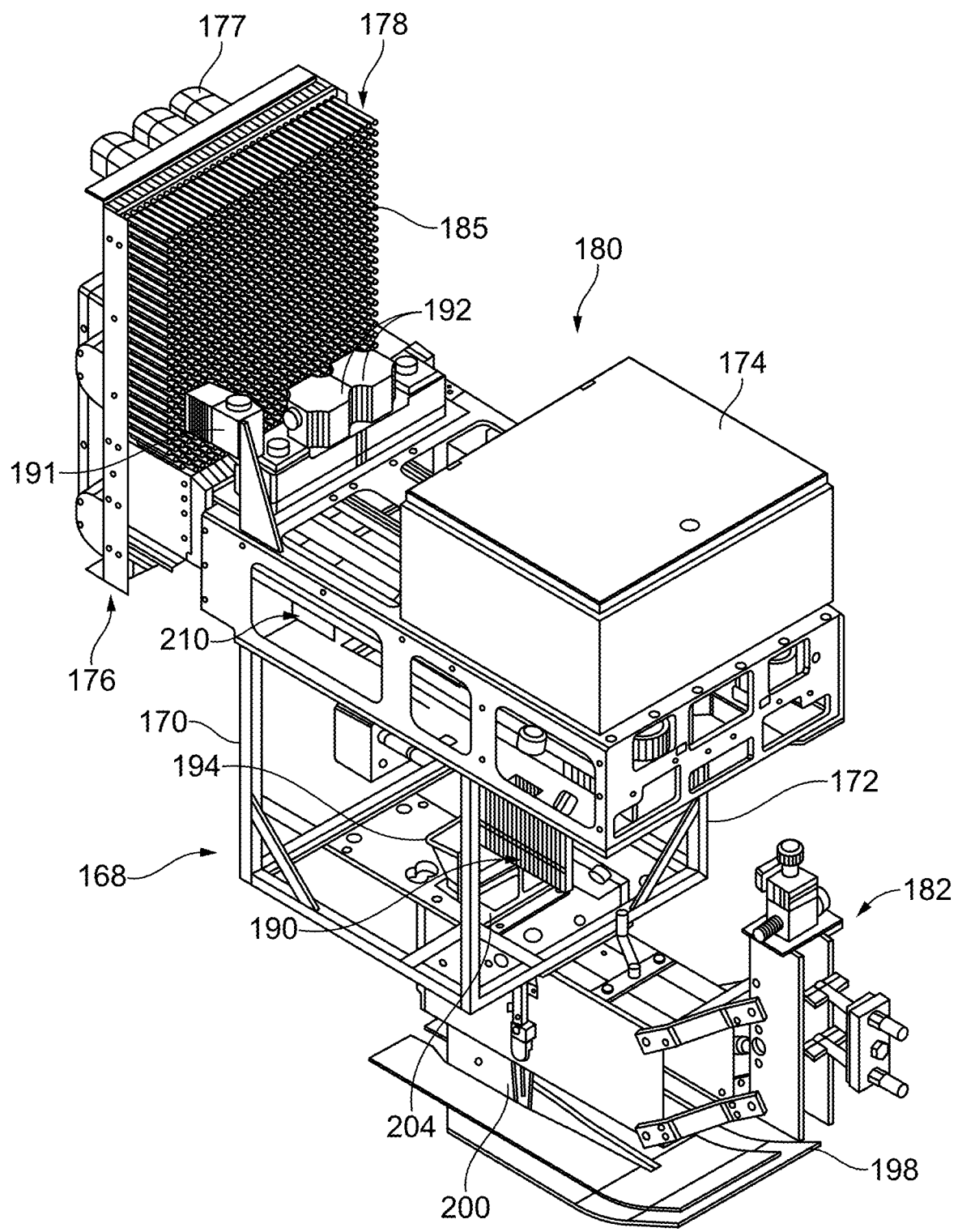
FIG. 31 shows a top right perspective view of the embodiment of FIG. 14 with some elements in another position.

FIG. 31 shows a top front perspective view of the mechanical transplanter 180. The grabbers 188, 190 are in the same position as those from FIG. 27.

Figure 32:
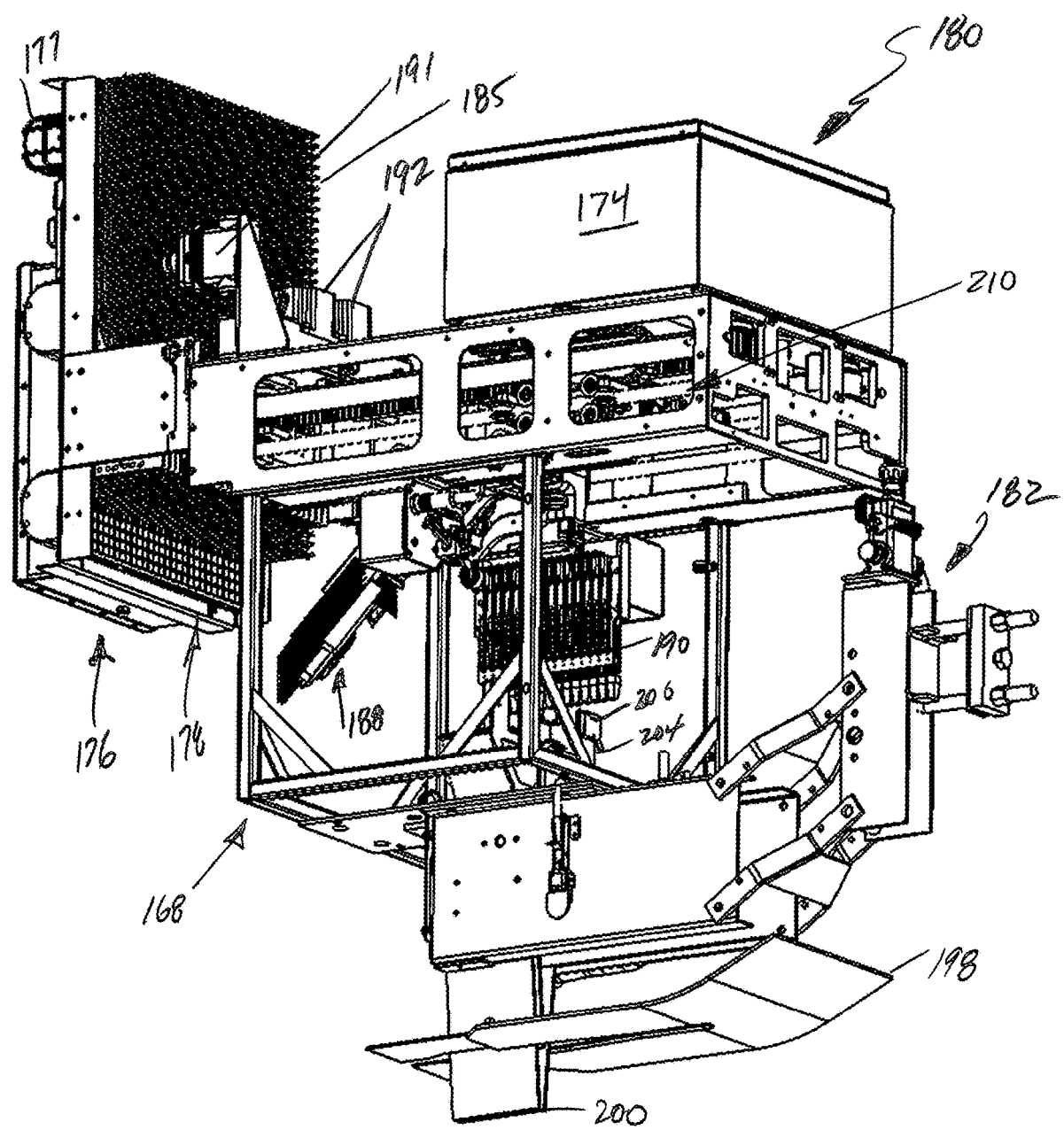
FIG. 32 shows a right bottom perspective view of the embodiment of FIG. 14 with some elements in another position.

FIG. 32 shows a bottom right side perspective view of the mechanical transplanter 180. The grabbers 188, 190 are in the same position as those from FIG. 27.

Figure 33:
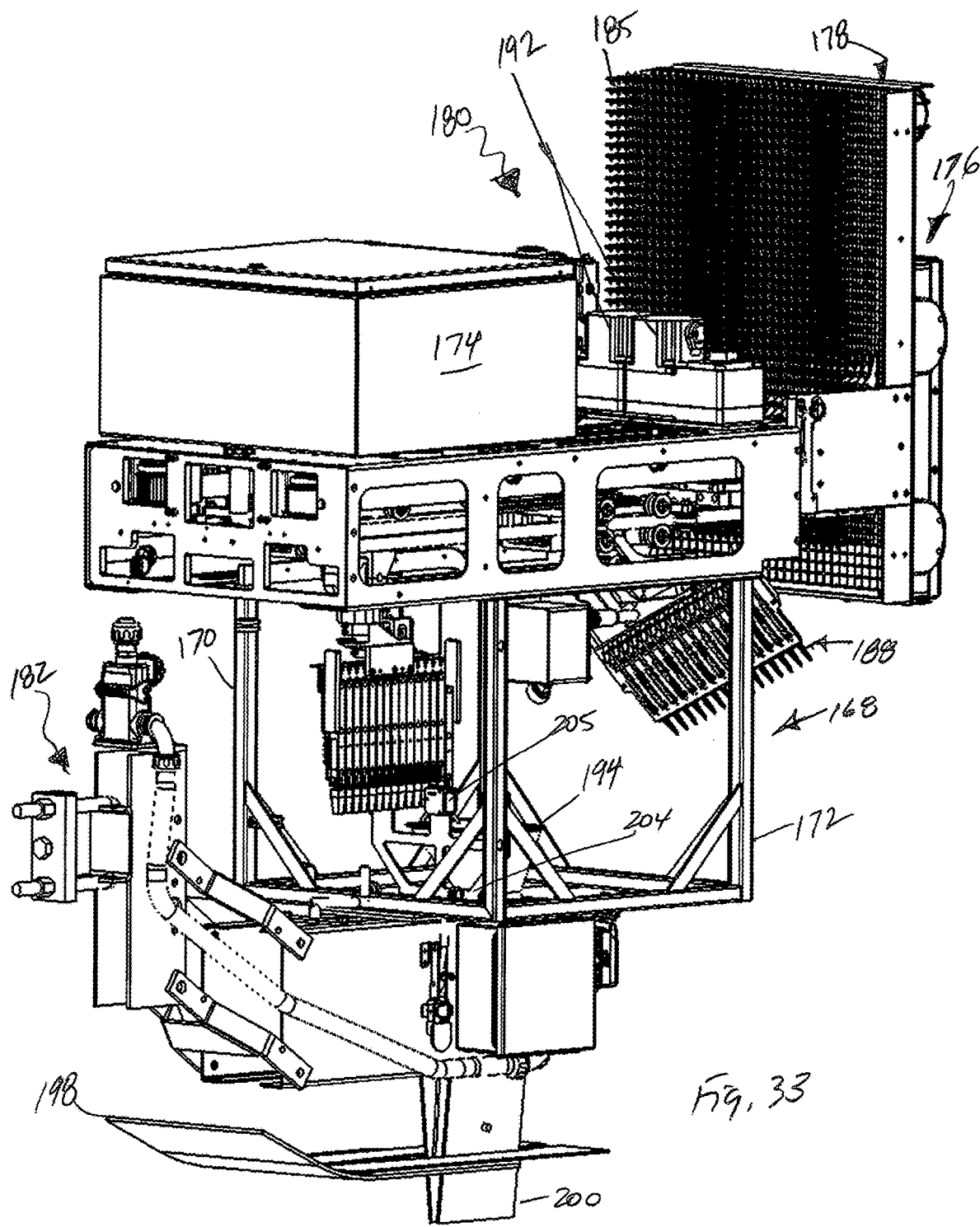
FIG. 33 shows a left top perspective view of the embodiments of FIG. 14 with some elements in another position.

FIG. 33 shows a left front perspective view of the mechanical transplanter 180. The grabbers 188, 190 are in the same position as those from FIG. 27.

Figure 34:
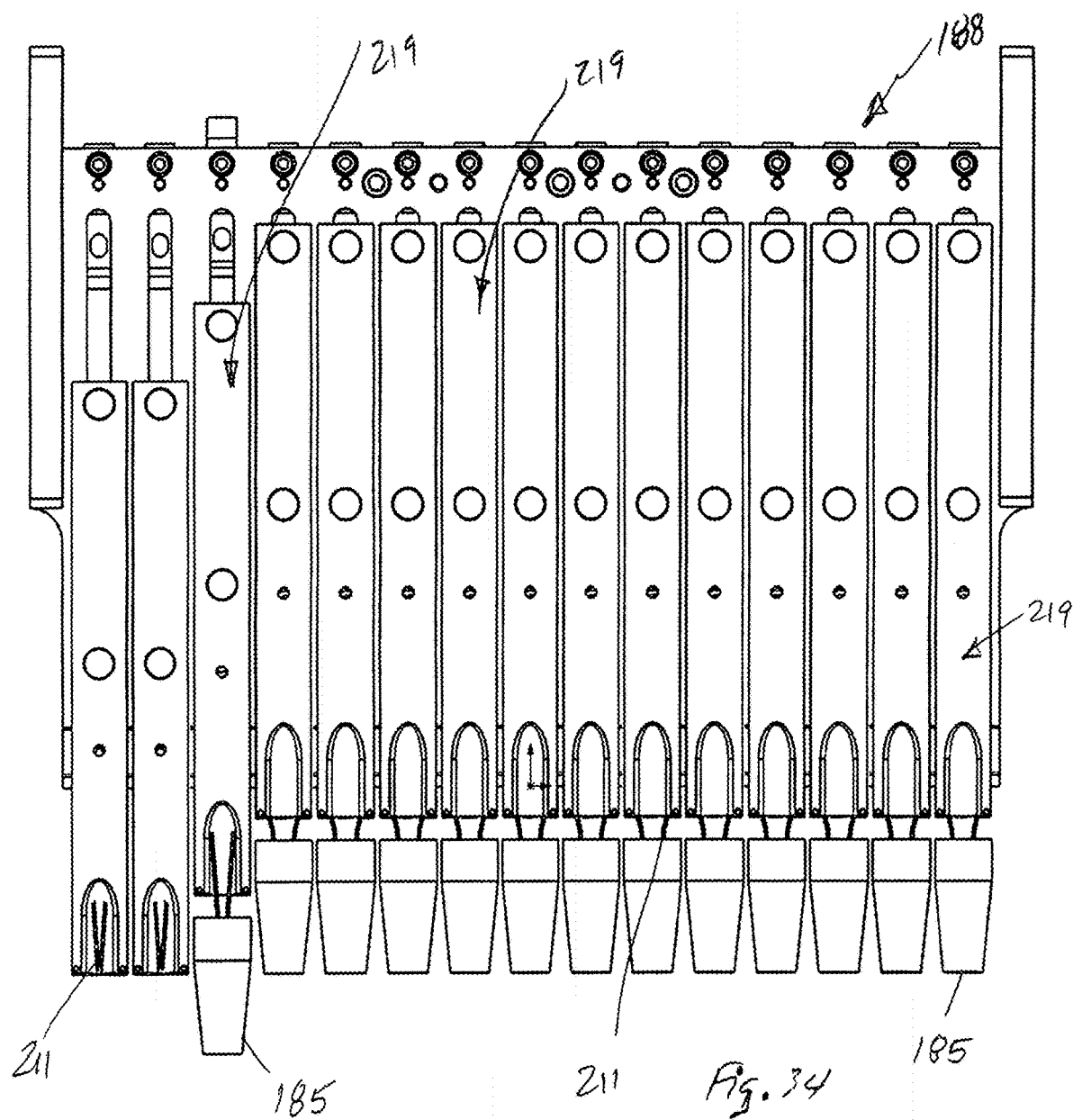
FIG. 34 shows one side of one embodiment of a grabber showing how the plant balls are retained and released.

FIG. 34 shows a first side detailed view of left grabber 188, in this embodiment the left grabber 188 is used to discuss the operation of this device, but it should be understood that right grabber 190 is a mirror image of left grabber 188.

In FIG. 34 can be seen the plant ball 185 affixed to the ejectors 219. The ejectors 219 are affixed to the left grabber 188. FIG. 34 shows that two of the plant balls 185 have been ejected and a third plant ball 185 is in the process of being ejected by the ejector 219.

Figure 35:
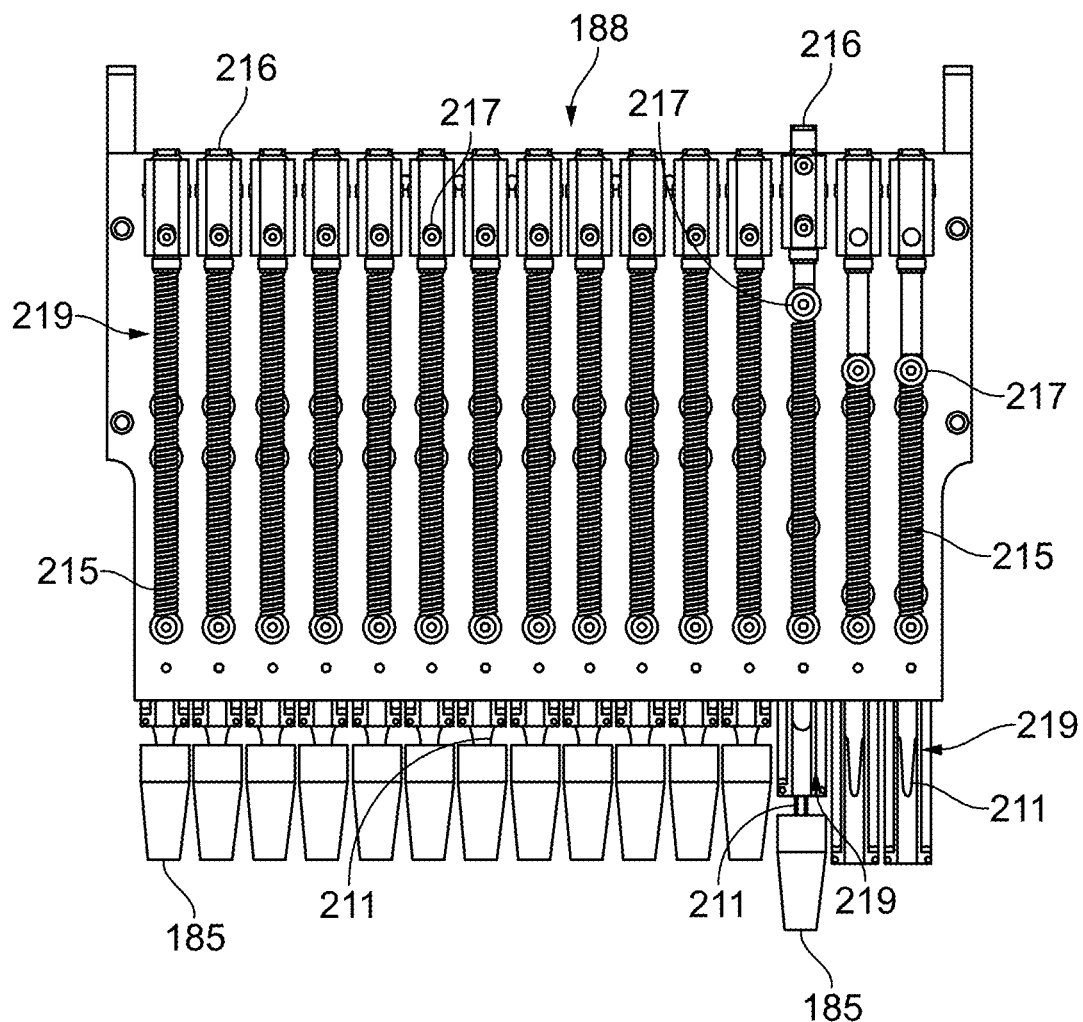
FIG. 35 shows a second side of one embodiment of a grabber to help explain how the spring driving system works.

FIG. 35 shows the second side of the left grabber 188 from FIG. 34. As can be seen, the plant ball 185 is almost ejected from the ejector 219 as the spring 215 is being released from the lever 216 near the top of the left grabber 188. In this figure the springs 215 on the right of the grabber 188 are shown in a loose or relaxed position. This indicates that these springs 215 for these ejectors 219 have been unloaded and the plant balls 185 have been fully ejected. The third ejector 219 from the right in this figure is only partially unloaded and the plant ball 185 is partially ejected.

The springs 215 to the left of the partially ejected plant ball 185 are fully extended or loaded and affixed to the pin 217 and retained by the lever 216.

To get from the loaded spring 215 position to the unloaded spring 215 position requires the trigger mechanism 220 trigger 218 to engage with the lever 216, causing the lever to rotate and when doing so, disengaging the pin 217 from the lever 216. The pin 217 retains one end of the spring 215.

When the lever 216 is rotated by the trigger 218, the pin 217 is released and the spring 215 is free to compress or release which ejects the plant ball 185 from the tines 211 of the ejector 219 and into the funnel 194 the shoe 200 and thereby forcefully into the ground 225.

Figure 36:
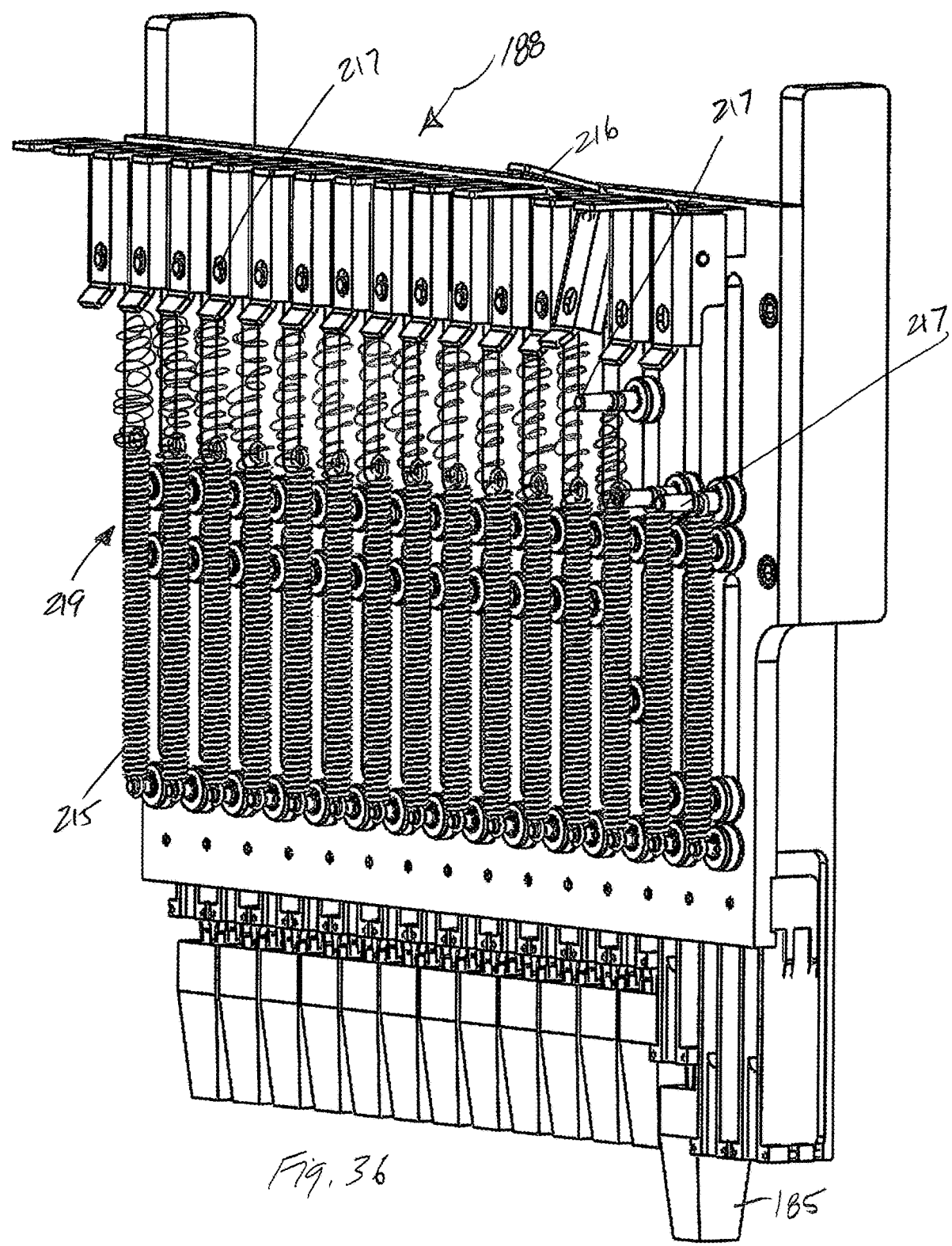
FIG. 36 shows a perspective view of the second side of the embodiment of FIG. 35.

FIG. 36 shows one side of the left grabber 188 where it can be more clearly seen the interaction of the pin 217, spring 215 and lever 216. It should be noted that the right two springs 215 are in the fully relaxed position, the third spring 215 from the right is in a partially relaxed position and the springs 215 to the left of the third spring from the right are fully extended or loaded position.

Figure 37:
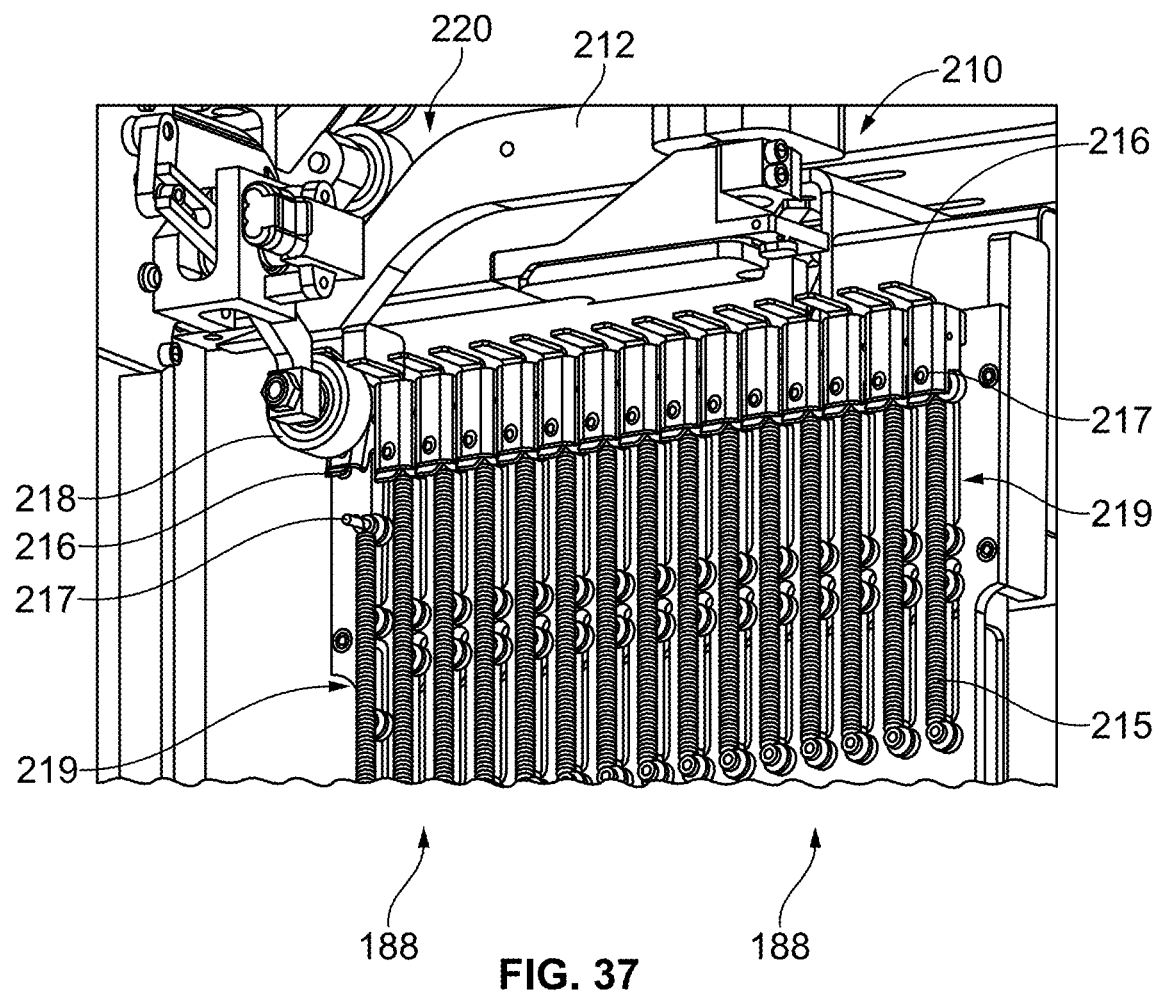
FIG. 37 shows one embodiment of a partial second side perspective view of the grabber and interaction with a partial view of the trigger mechanism and partial view of the translation mechanism.

FIG. 37 shows a side view of an example of the left grabber 188 and the interaction with the trigger mechanism 220 and trigger 218. It should be noted that only the left most spring 215 is partially released position, the springs 215 to the right of this are in the fully extended or loaded position.

As can be seen the ejector 219 has had the pin 217 released from the lever 216 by the trigger 218 pressing on the lever 216 causing the lever 216 to rotate and thereby releasing the pin 217 such that the spring 215 compresses and ejects the plant ball 185 from the tines 211 of the ejector 219 and into the funnel 194, some elements not shown this fig.

Figure 38:
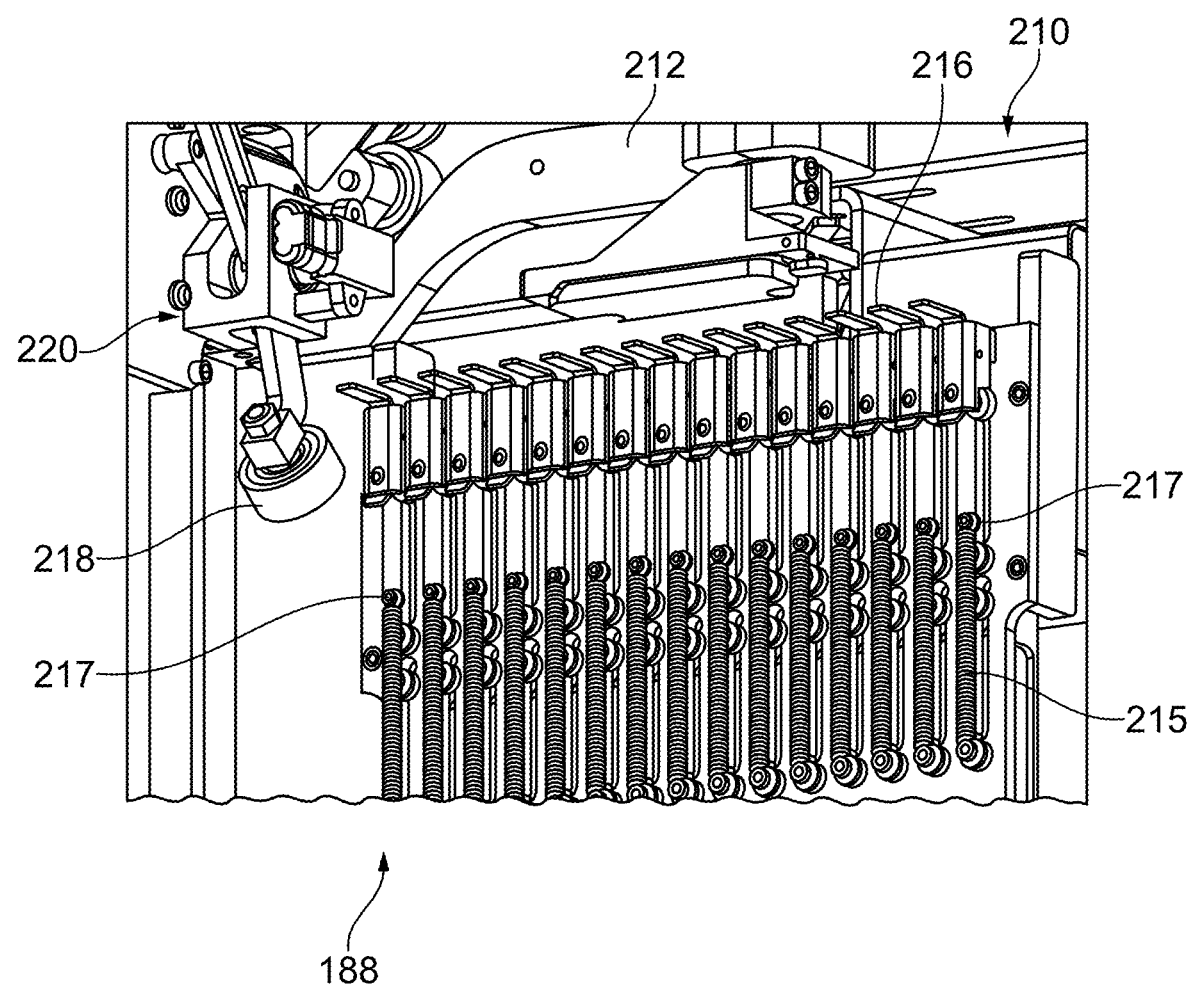
FIG. 38 shows one embodiment of a partial second side perspective view of the grabber and interaction with a partial view of the trigger mechanism in a different position and partial view of the translation mechanism.

FIG. 38 shows the same side view of an example of the left grabber 188 where the trigger 218 is in the clearance position. The clearance position is used when the grabber 188 is fully loaded and it is passing through the arms of the sensor plate 204 such that the sensor transmitter 205 and sensor receiver 206 can "read" to see if plant balls 185 are loaded before ejection into the funnel 194.

Figure 39:
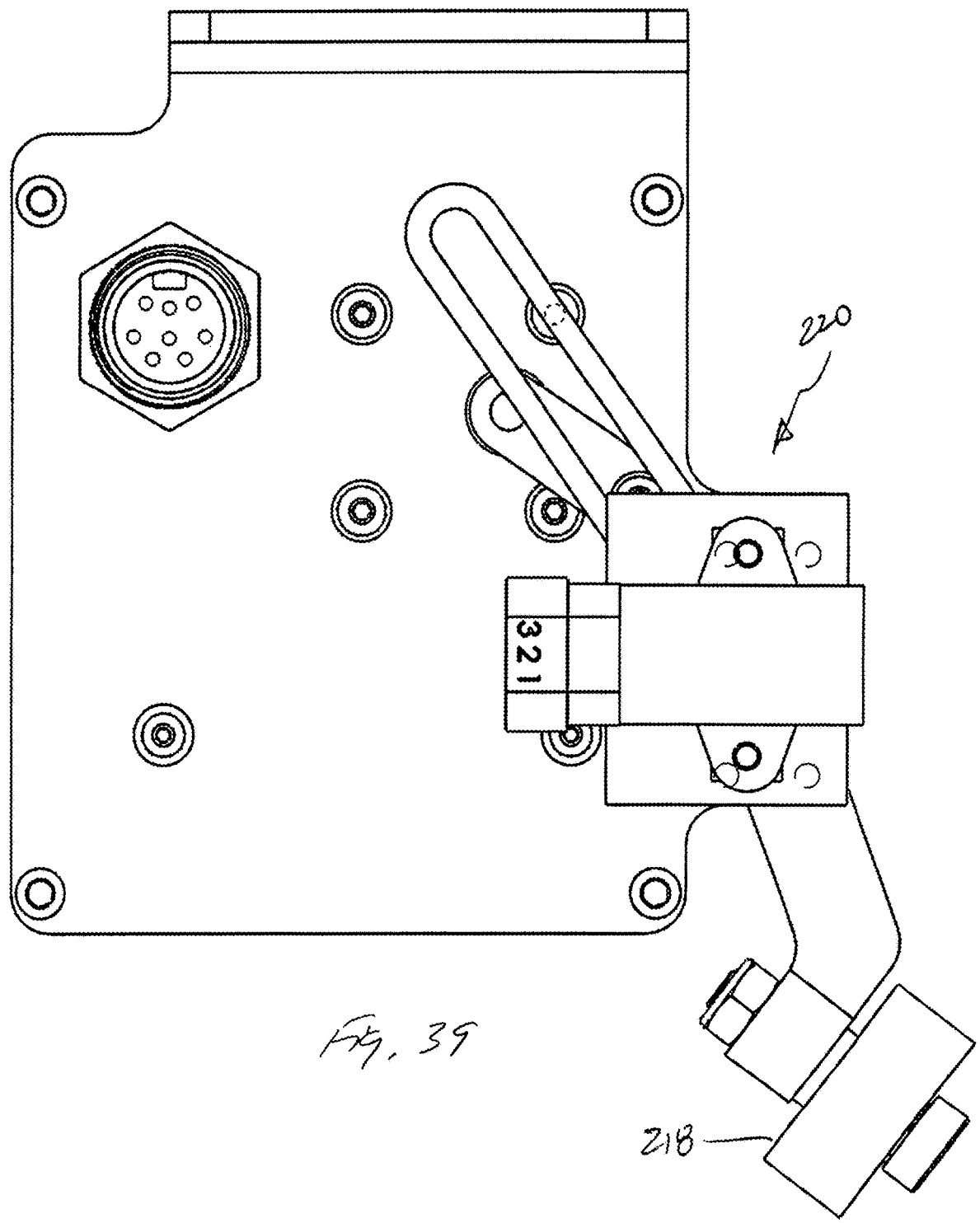
FIG. 39 shows one side of one embodiment of the trigger mechanism with trigger in the non-active position.

FIG. 39 is a detailed side view of one embodiment of the trigger mechanism 220 with the trigger 219 in the unloaded position.

Figure 40:
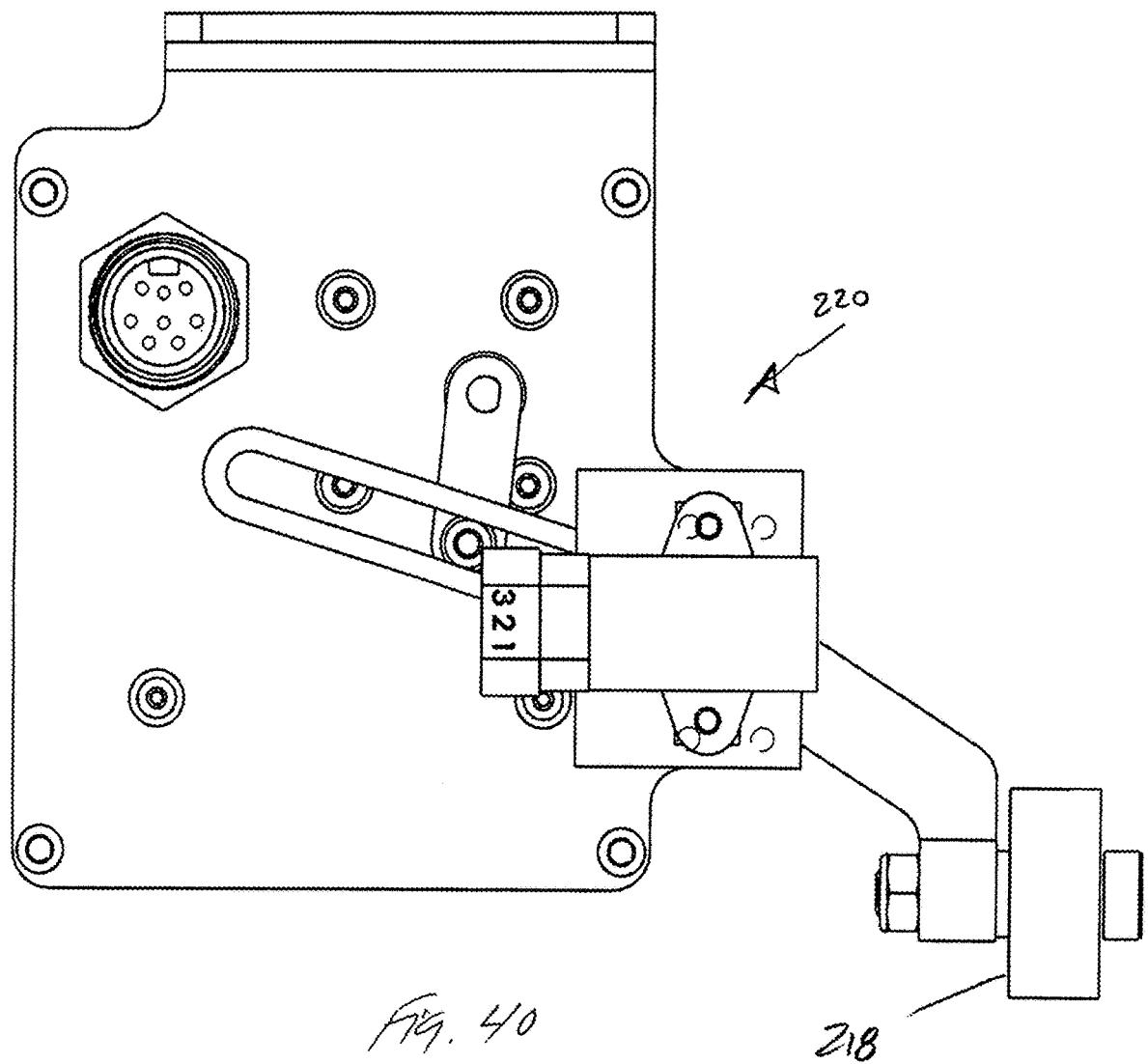
FIG. 40 shows one side of one embodiment of the trigger mechanism with the trigger in the active position.

FIG. 40 is a detailed side view of one embodiment of the trigger mechanism 220 with the trigger 219 in the releasing position.

Figure 41:
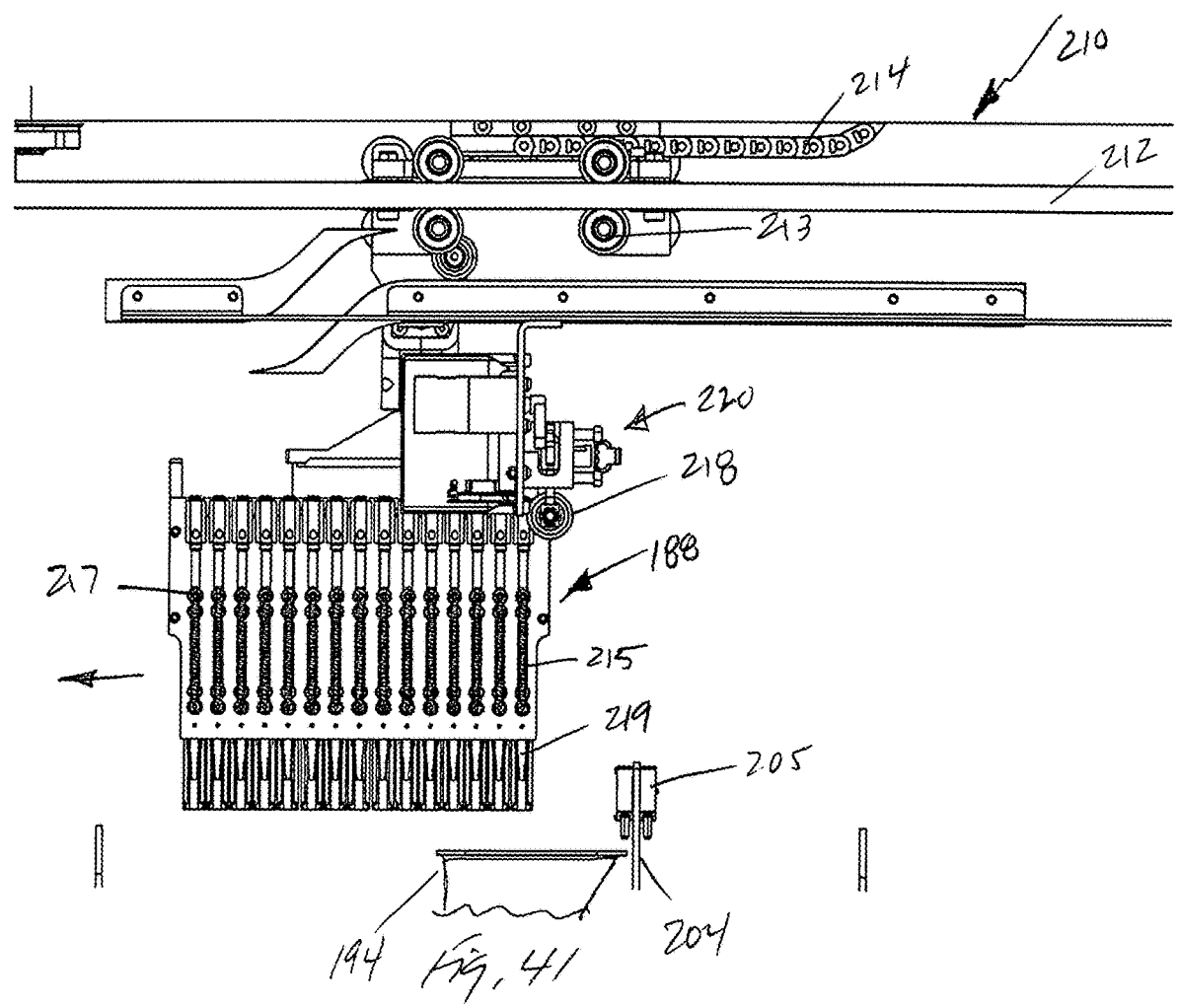
FIG. 41 shows one side of one embodiment of a grabber in one position and interaction with partial views of the funnel, sensor, trigger, trigger mechanism and translation mechanism.

FIG. 41 shows a side cutaway view of the left grabber 188 and interaction between the sensor plate 205 sensor transmitter 205, translation mechanism 210, trigger mechanism 220 and trigger 219. In this view, the grabber 188 has completed ejecting plant balls 185 forcefully into the funnel 194 and is returning to the loading position adjacent to the feeder 176, not show.

Figure 42:
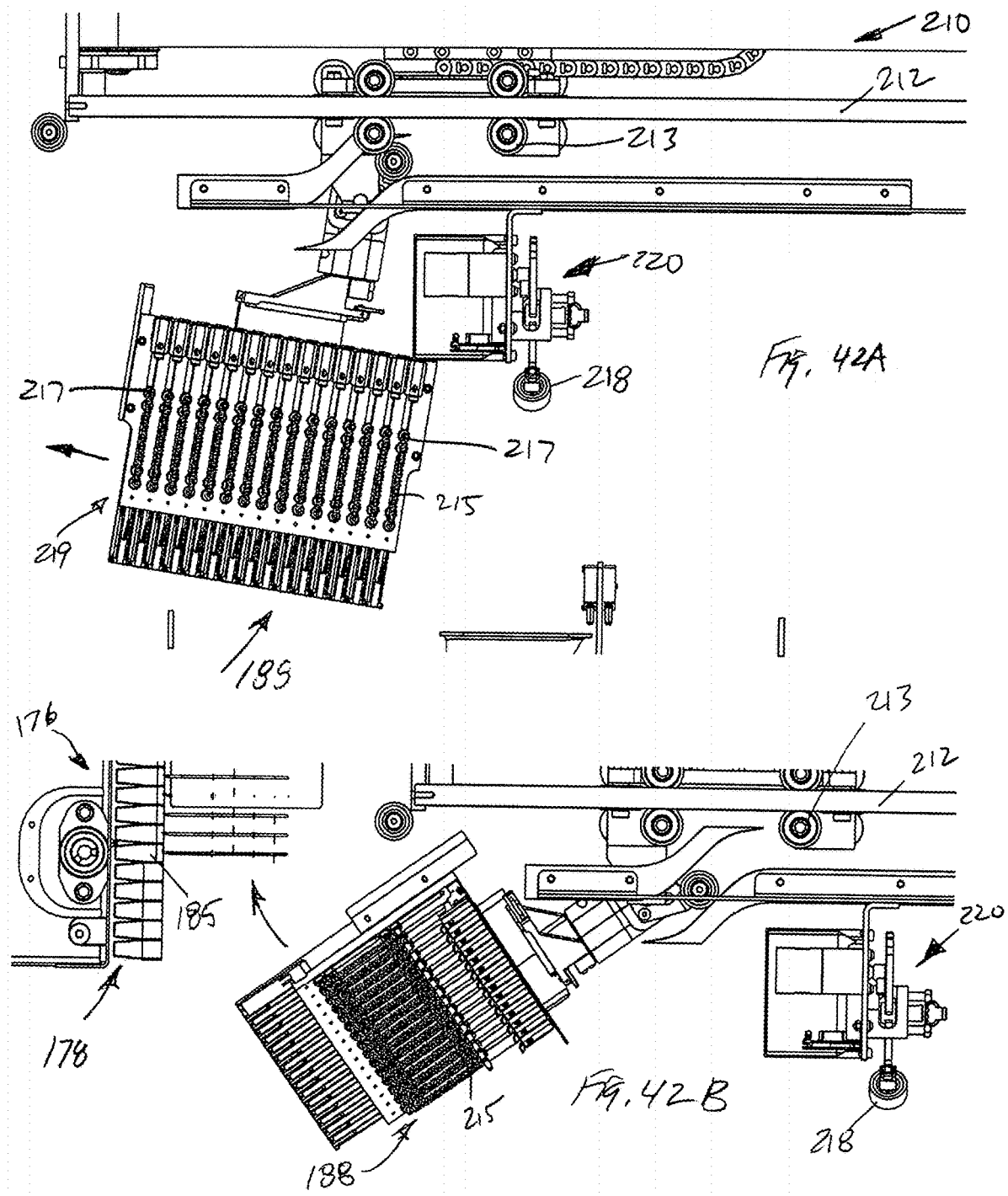
FIG. 42A one side of one embodiment of a grabber in another position and interaction with partial views of the funnel, sensor, trigger mechanism and translation mechanism FIG. 42B one side of one embodiment of a grabber in another position and interaction with partial views of the trigger mechanism, translation mechanism and feeder.

FIG. 42A shows a side cutaway view of the left grabber 188 as it begins to rotate from a primarily vertical position to a horizontal position.

FIG. 42B shows a side cutaway view of the left grabber 188 as it get closer to the horizontal position near the feeder 176.

Figure 43:
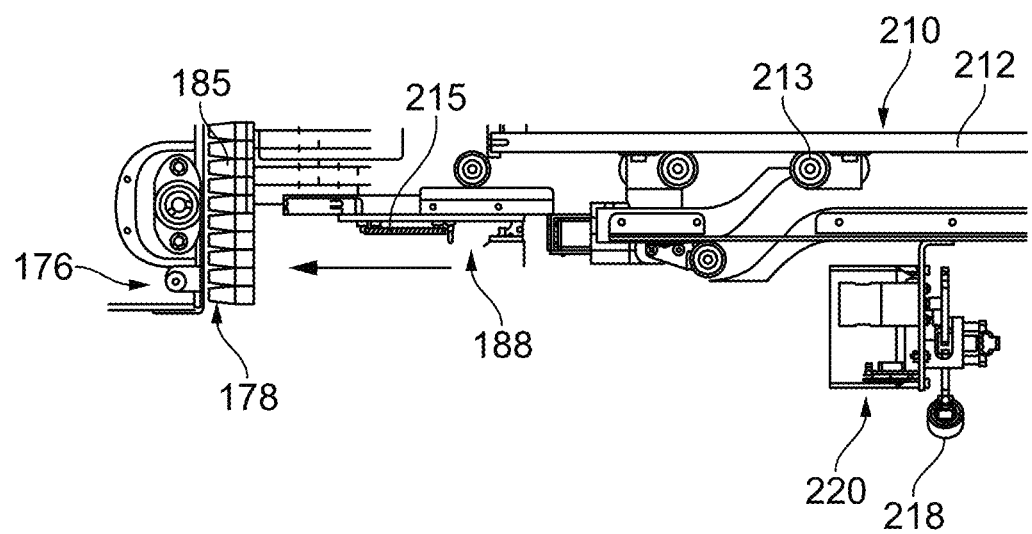
FIG. 43 shows one side of one embodiment of a grabber in a pre-loading position and interaction with partial views of the trigger, trigger mechanism, translation mechanism and feeder.

FIG. 43 shows a side cutaway view of the left grabber 188 as it engages the feeder 176 to grab plant balls 185. As the left grabber 188 is pushed against the tray 178 the tines 211 engage the root ball of the plant ball 185 and as they do so, the ejector 219 is pushed into the grabber 188 such that the pins 217 of each ejector 219 translate to the lever 216, causing the lever 216 to rotate and pin 217 to become engaged in the lever 216. The spring 215 is in the extended or loaded position at this point. As this is completed, the plant ball 185 is engaged by the tines 211 of the ejector 219, the pin 217 is engaged in the lever 216 and the grabber 188 is ready to rotate and translate back to near the funnel 194 for ejection of the plant balls 185.

Figure 44:
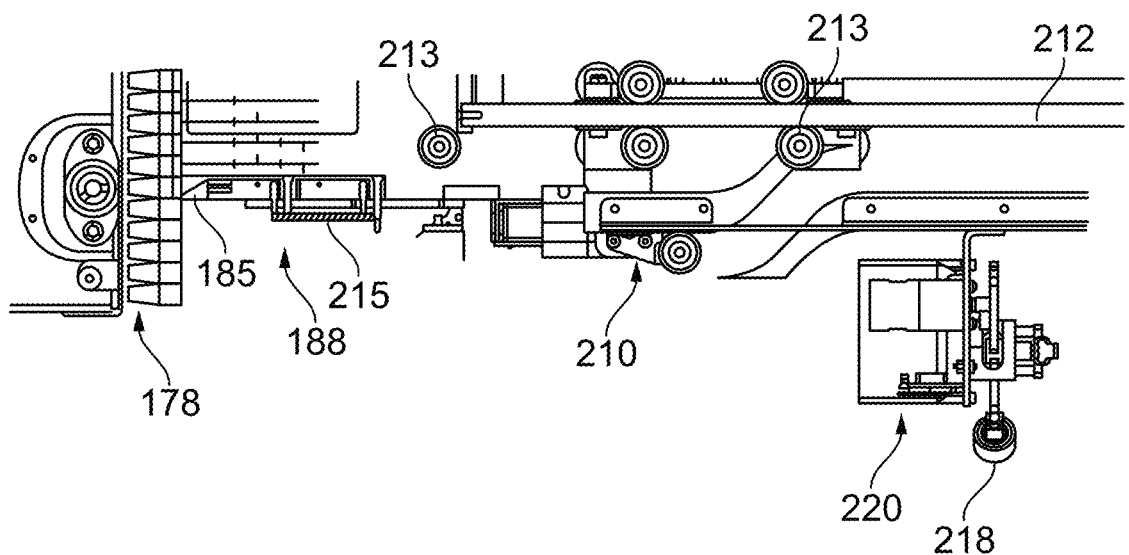
FIG. 44 shows one side of one embodiment of a grabber in a beginning loading position and interaction with partial views of the translation mechanism and feeder.

FIG. 44 shows the grabber 188 in the fully engaged position such that the ejectors 219 are loaded with plant balls 185 and springs 215 are fully extended.

Figure 45:
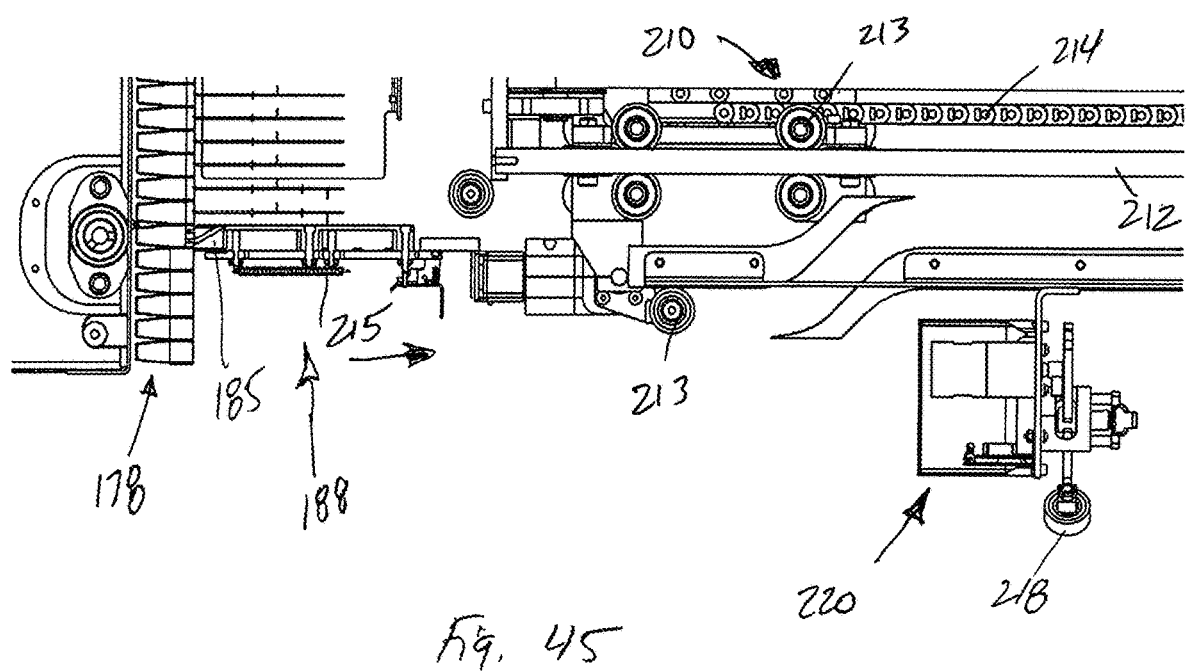
FIG. 45 shows one side of one embodiment of a grabber in a loaded position and interaction with partial views of the translation mechanism and feeder.

FIG. 45 shows the grabber 188 as it is being translated from near the feeder 176.

Figure 46:
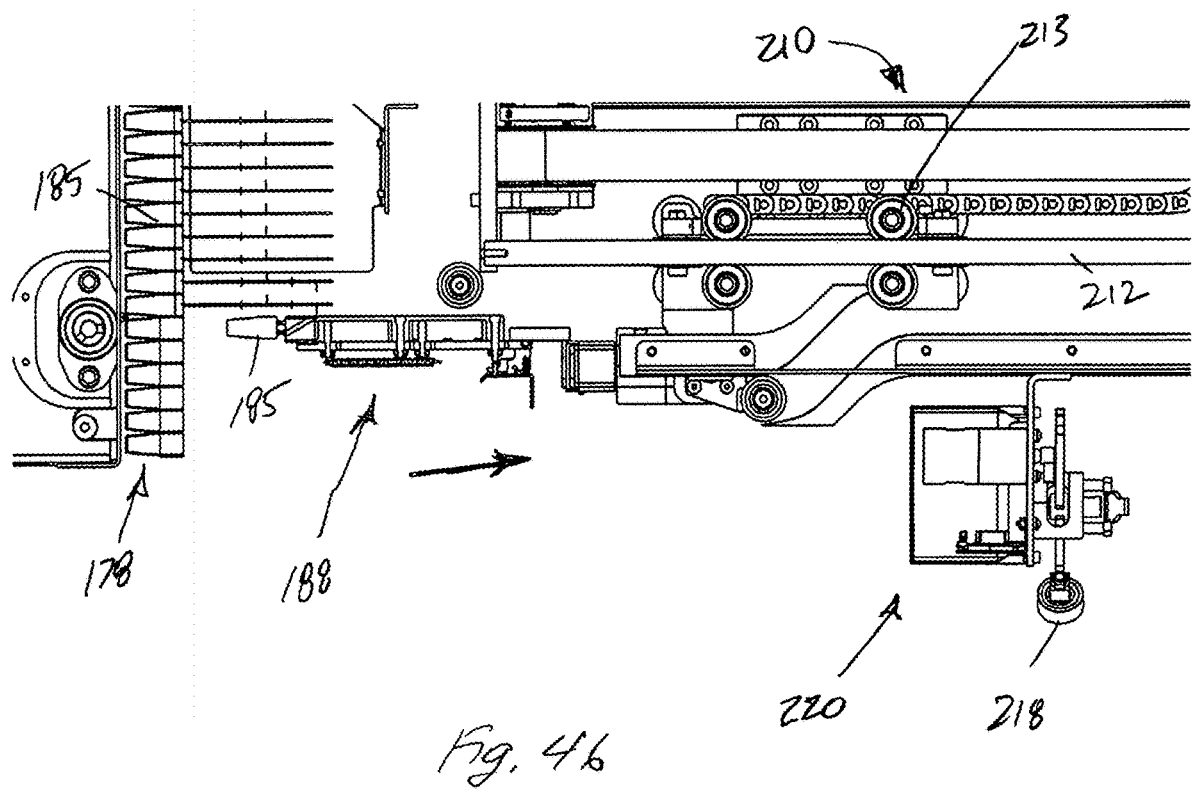
FIG. 46 shows one side of one embodiment of a grabber in a beginning return position and interaction with partial views of the translation mechanism and feeder.

FIG. 46 shows the grabber 188 further from the feeder 176 position.

Figure 47:
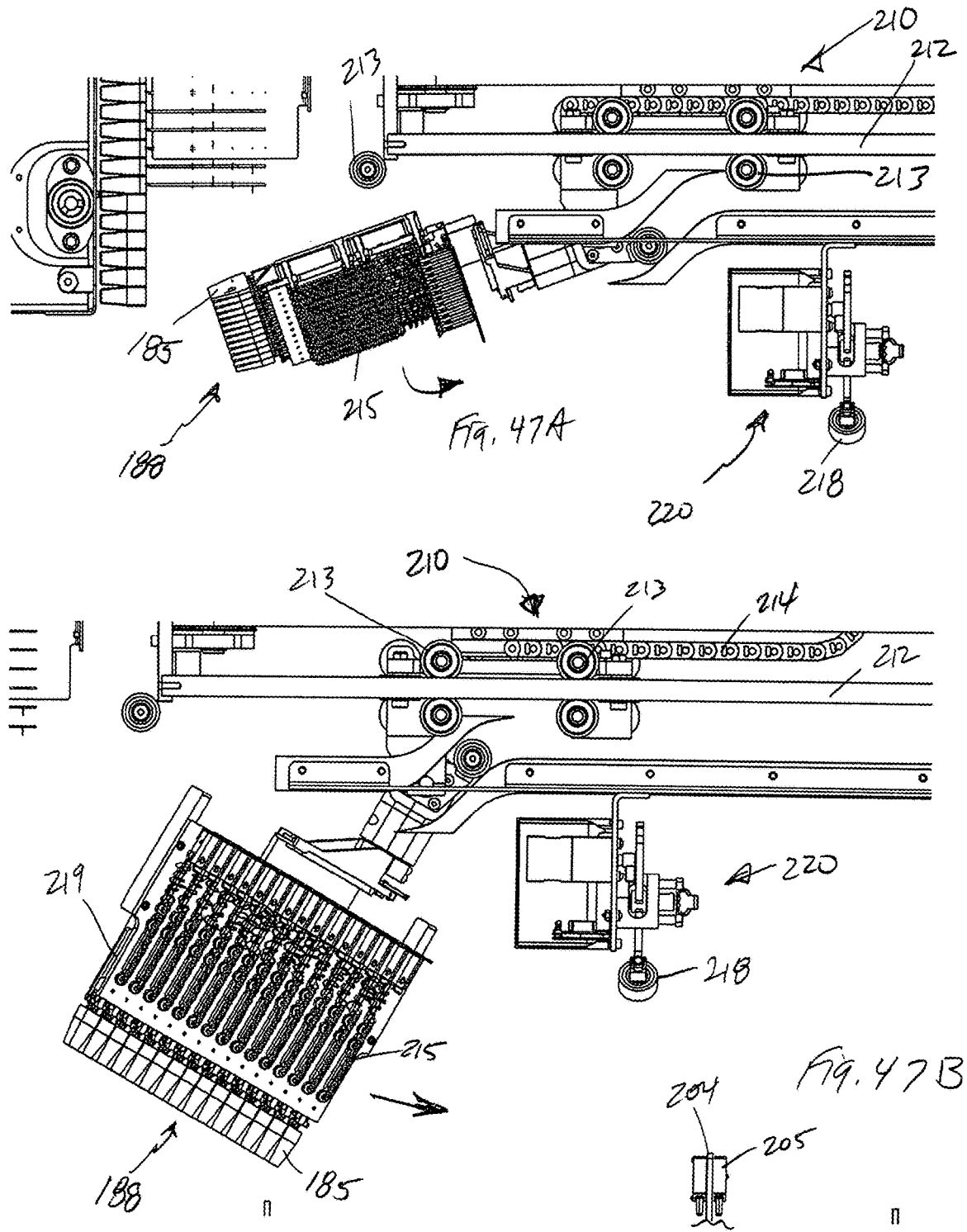
FIG. 47A shows one side of one embodiment of a grabber in a returning position and interaction with partial views of the trigger, trigger mechanism and translation mechanism.
FIG. 47B shows one side of one embodiment of a grabber in a returning position and interaction with partial views of the sensor, trigger, trigger mechanism and translation mechanism.

FIG. 47A shows the grabber 188 as it begins to rotate from the horizontal position to the vertical position.

FIG. 47B shows the grabber 188 as it gets closer to the vertical position.

Figure 48:
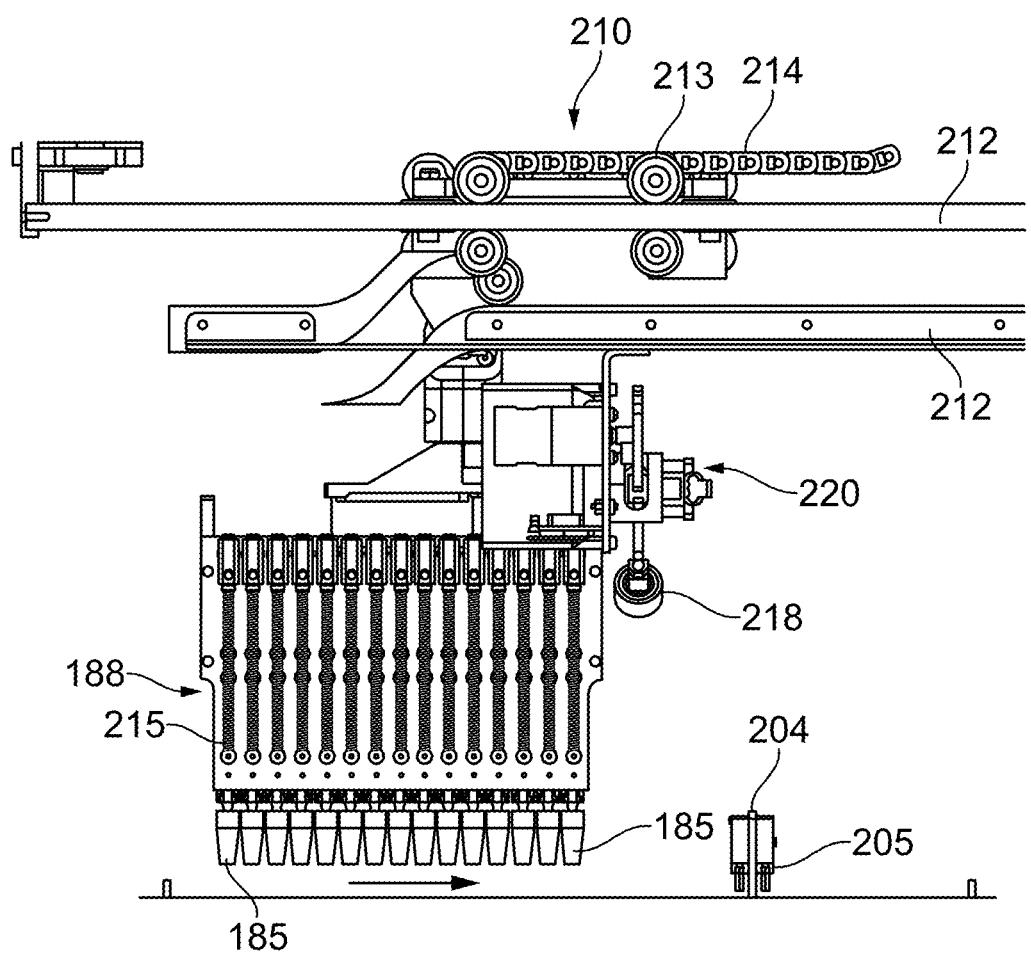
FIG. 48 shows one side of one embodiment of a grabber nearing the sensor position and interaction with partial views of the sensor, trigger, trigger mechanism and translation mechanism.

FIG. 48 shows the grabber 188 in the fully vertical position as it get close the sensor plate 204 so that the sensor transmitter 205 and sensor receiver 206 can sense if a plant ball 185 was engaged and so report to the control box 174.

Figure 49:
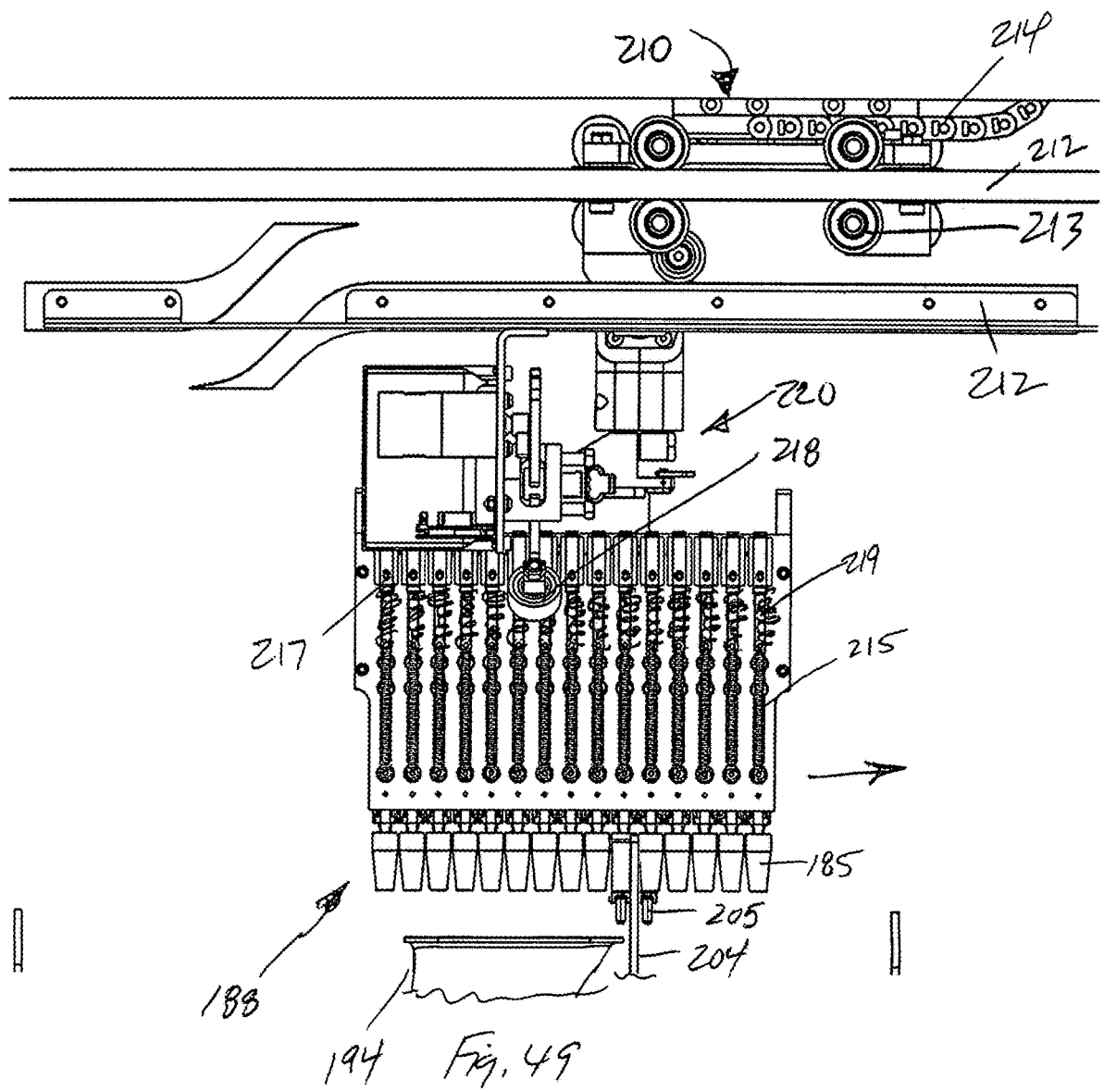
FIG. 49 shows one side of one embodiment of a grabber in a sensing position and interaction with partial views of the funnel, sensor, trigger, trigger mechanism and translation mechanism.

FIG. 49 shows the grabber 188 and plant balls 185 passing between the sensor transmitters 205 and sensor receiver 206 of the sensor plate 204 and inspecting for complete plant ball 185 engagement.

Figure 50:
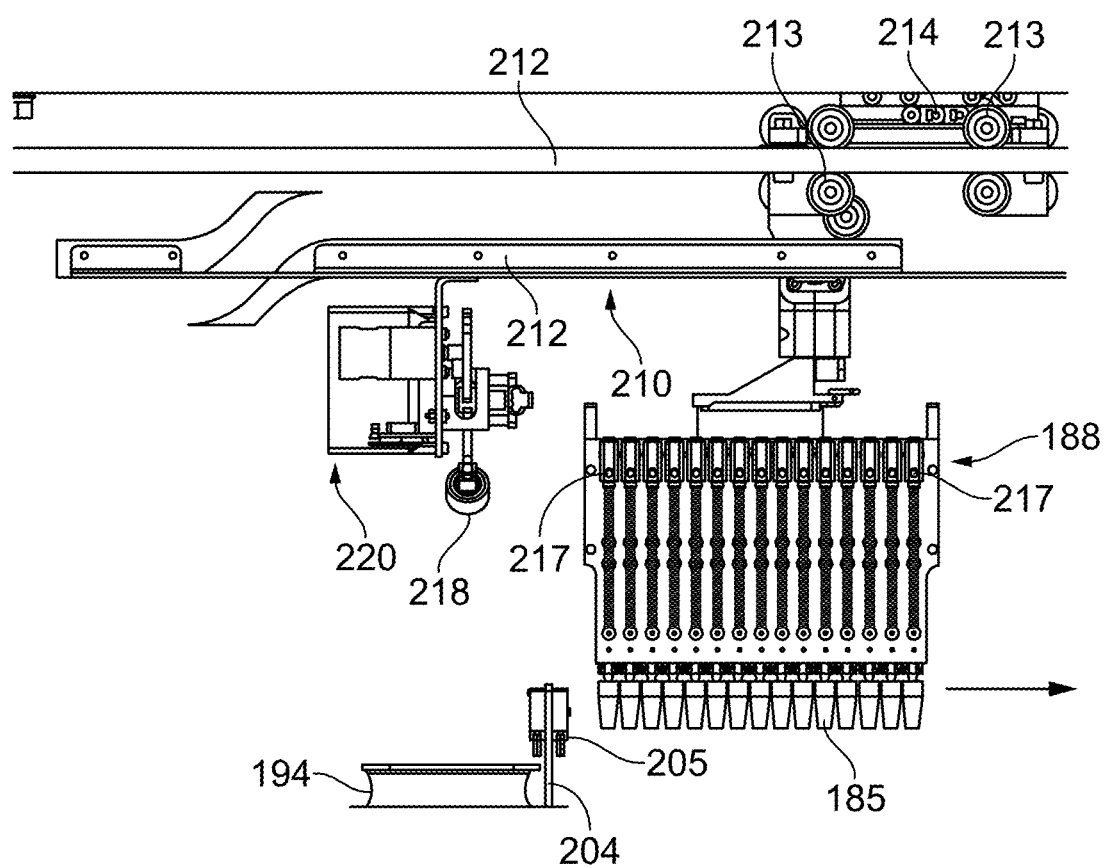
FIG. 50 shows one side of one embodiment of a grabber in a post sensing position and interaction with partial views of the funnel, sensor, trigger, trigger mechanism and translation mechanism.

FIG. 50 shows the grabber 188 and plant balls 185 post inspection by the sensor transmitter 205 and sensor receiver 206. In this position, the logic recognizes if there is or if there is not a plant ball 185 on the tines 211 of the ejector 219 and will adjust the position of the grabber 188 over the funnel 194 so that a plant ball 185 is ejected from the ejector 219 at the proper timing to then be forcefully ejected into the funnel 194 and ground 225.

Figure 51:
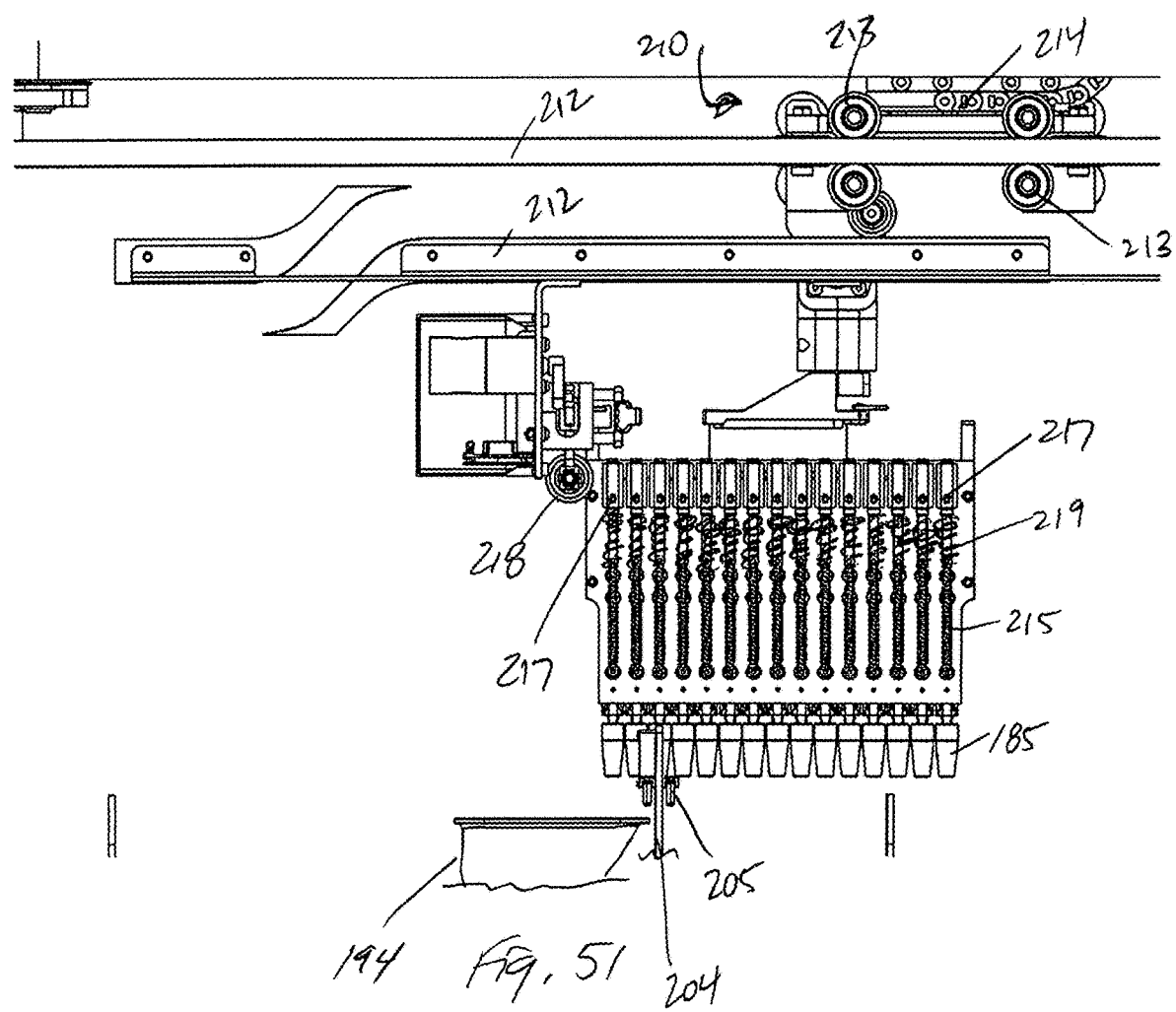
FIG. 51 shows one side of one embodiment of a grabber in a pre-dispensing position and interaction with partial views of the funnel, sensor, trigger, trigger mechanism and translation mechanism.

FIG. 51 shows the grabber 188 and plant balls 185 translating towards the funnel 194 where the trigger 218 is getting close to engaging the lever 216 of the ejector 219. When the trigger 218 engages the lever 216 this causes the lever 216 to rotate, disengaging the pin 217 from the lever 216, releasing the spring 215 and causing the plant ball 185 to be ejected from the ejector 219 into the funnel 194 and the ground 225.

Figure 52:
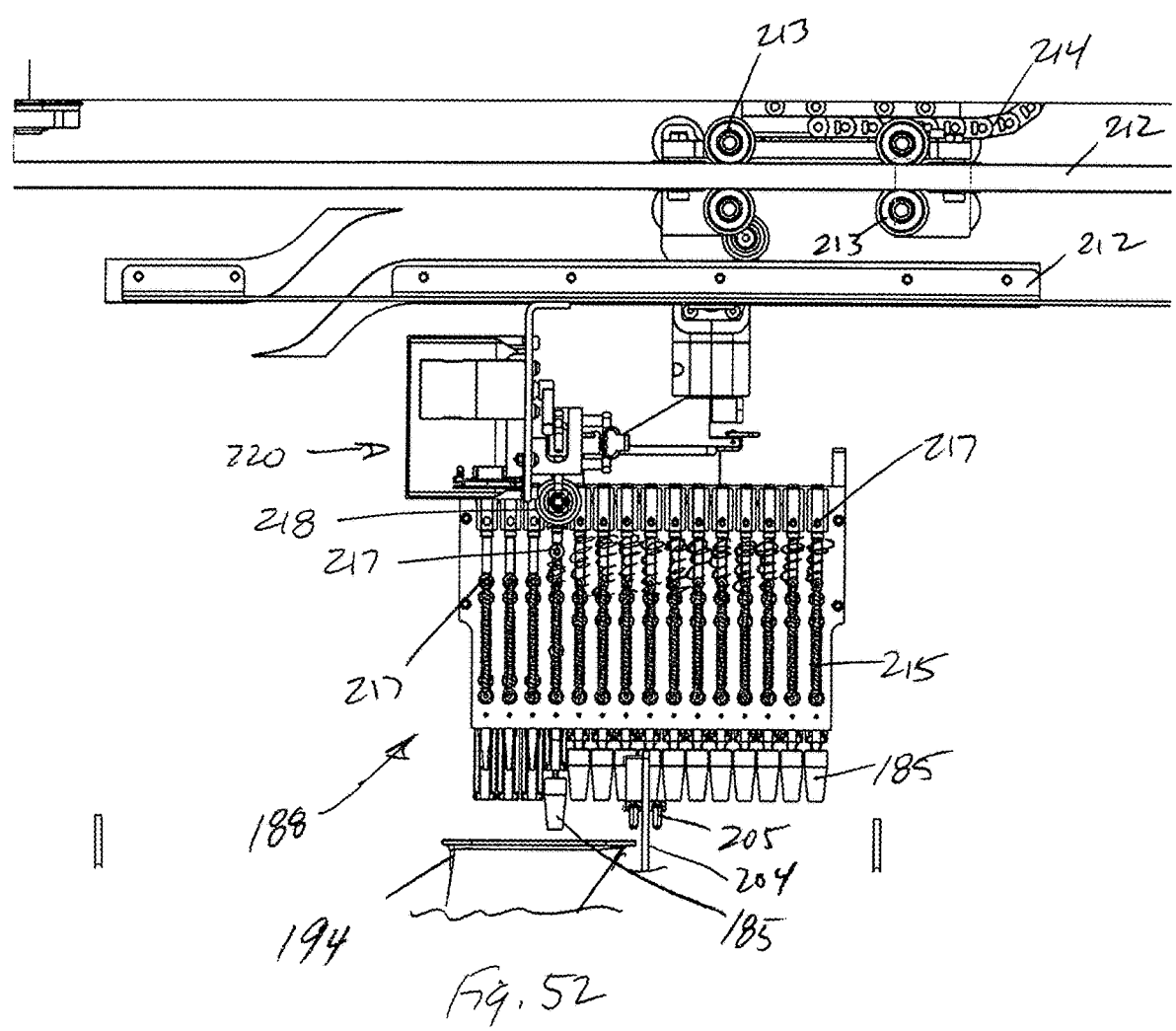
FIG. 52 shows one side of one embodiment of a grabber in a partial un-loaded position and interaction with partial views of the funnel, sensor, trigger, trigger mechanism and translation mechanism.

FIG. 52 shows the grabber 188 has ejected two plant balls 185 and is continuing to index via the translation mechanism 210 to forcefully eject more plant balls 185 into the funnel 194.

Figure 53:
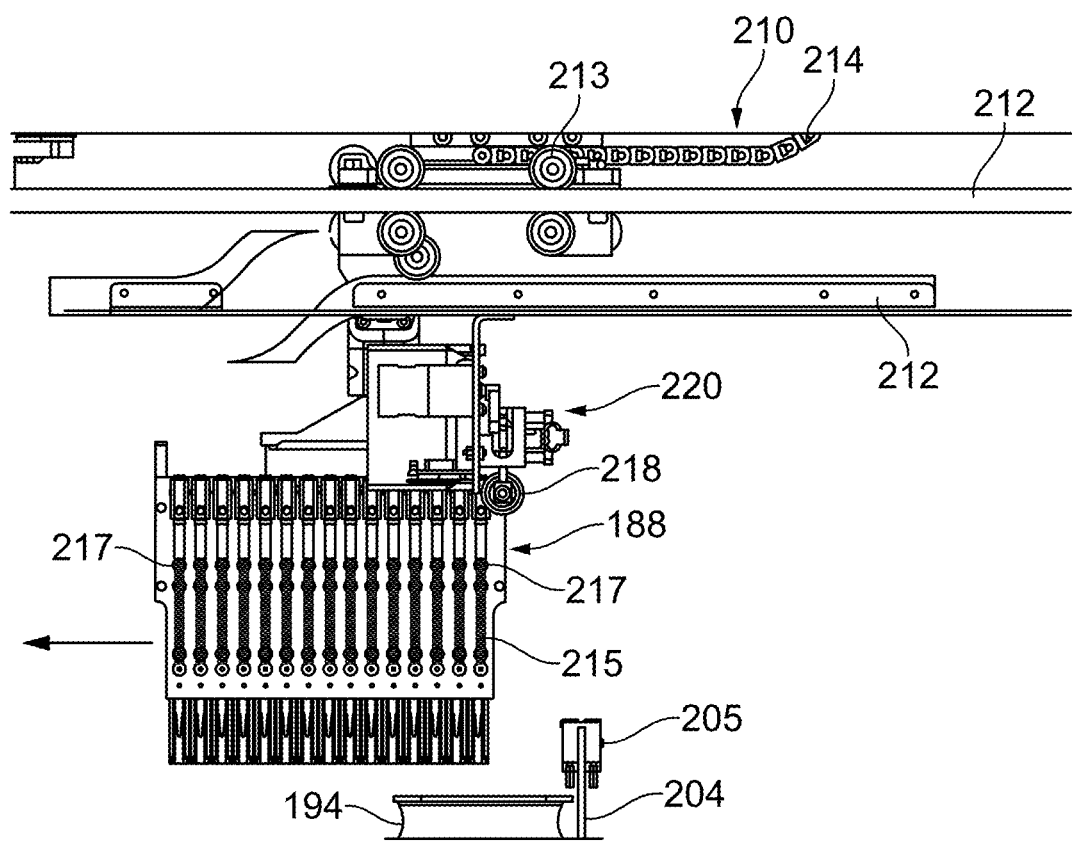
FIG. 53 shows one side of one embodiment of a grabber in a post dispensing position and interaction with partial views of the funnel, sensor, trigger, trigger mechanism and translation mechanism.

FIG. 53 shows the grabber 188 fully unloaded and ready to be refilled with plant balls 185.

It will now be apparent to those skilled in the art that other embodiments, improvements, details and uses can be made consistent with the letter and spirit of the foregoing disclosure and within the scope of this application and claims.

The invention claimed is:

1. A mechanical transplanter device, the device comprising:
a feeder, the feeder having a feeder tray, the feeder tray for receiving and dispensing a plant ball;
the feeder having a motor and controls for indexing the feeder tray;
the feeder attached to a translation mechanism, the translation mechanism providing lateral and vertical movement to a grabber;
the translation mechanism having motors and controls for controlling operation of the grabber;
a trigger mechanism, the trigger mechanism having a trigger;
a control box, the control box affixed to the top of the translation mechanism, the control box providing and coordinating relative movement of the feeder, the translation mechanism, the trigger mechanism and the grabber;
a housing, the housing affixed to the bottom of the translation mechanism;
a sensor plate affixed to the housing, a sensor transmitter affixed to the sensor plate, a sensor receiver affixed to the sensor plate;
the trigger adjustable from an operating position to a non-operating position;
a funnel, the funnel located near the bottom of the housing and near the sensor plate;
a shoe, the shoe affixed to the funnel, the funnel and the shoe providing a co-linear pathway for plant balls ejected into the ground;
the grabber having a means for grasping the plant ball from the feeder tray and a means for ejecting the plant balls into the ground and;
the means for ejecting the plant ball comprising a plurality of ejectors, each ejector having a pin and a spring, the spring affixed to the pin on one end and the opposite end of the spring affixed to the grabber, the pin interacting with a lever, the ejectors having a fork, the fork having tines, the tines for engaging and retaining the plant balls, whereby the ejector is loaded by engaging the pin into the lever and unloaded by removing the pin from the lever, where the plant ball is forcibly removed from the tines and into the funnel and shoe and the ground.

2. A mechanical transplanter device, the device comprising:
a feeder, the feeder having a feeder tray, the feeder tray for growing and retaining a plant ball;
the feeder having a motor and controls, the motor and controls for indexing the feeder tray and interacting with a control box;
the feeder attached to a translation mechanism, the translation mechanism affixed to a pair of grabbers, the translation mechanism providing lateral and vertical movement to the grabbers, the translation mechanism controlling a trigger mechanism;
the translation mechanism having motors and controls for controlling operation of the grabber and the trigger mechanism;
the trigger mechanism having a trigger, the trigger movable from a non-operating position to an operating position and back;
the control box affixed to the top of the translation mechanism, the control box providing and coordinating relative movement and operation of the feeder, the translation mechanism, the trigger mechanism and the grabber;
a housing, the housing affixed to the bottom of the translation mechanism;
a sensor plate affixed to the housing, a sensor transmitter affixed to the sensor plate, a sensor receiver affixed to the sensor plate, the sensor transmitter and sensor receiver for providing information to the control box;
a funnel, the funnel located near the bottom of the housing and near the sensor plate;
a shoe, the shoe affixed to the funnel, the funnel and the shoe providing a co-linear pathway for plant balls ejected into the ground; and
each grabber having a plurality of ejectors, each ejector having a pin and a spring, the spring affixed to the pin on one end and the opposite end of the spring affixed to the grabber, the pin interacting with a lever, the ejectors having a fork, the fork having tines, the tines for engaging and retaining the plant balls, whereby the ejector is loaded by engaging the pin into the lever and unloaded by removing the pin from the lever, where the plant ball is forcibly removed from the tines and into the funnel and shoe and the ground with the spring.

* * * * *